(12) United States Patent
Sakuyama et al.

(10) Patent No.: US 7,450,768 B2
(45) Date of Patent: Nov. 11, 2008

(54) APPARATUS AND METHOD FOR PROCESSING IMAGE DATA BASED ON OBJECT MOVEMENT SPEED WITHIN A FRAME

(75) Inventors: Hiroyuki Sakuyama, Tokyo (JP); Tooru Suino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 738 days.

(21) Appl. No.: 10/678,696

(22) Filed: Oct. 2, 2003

(65) Prior Publication Data
US 2004/0126020 A1  Jul. 1, 2004

(30) Foreign Application Priority Data

| Oct. 2, 2002 | (JP) | ............................. 2002-289867 |
| Oct. 15, 2002 | (JP) | ............................. 2002-300468 |
| Oct. 15, 2002 | (JP) | ............................. 2002-300476 |
| Nov. 13, 2002 | (JP) | ............................. 2002-329553 |
| Dec. 12, 2002 | (JP) | ............................. 2002-360809 |

(51) Int. Cl.
*G06K 9/36* (2006.01)

(52) U.S. Cl. .............. 382/232; 375/240.11; 375/240.19

(58) Field of Classification Search .................. 382/232, 382/248; 348/398.1, 403.1; 375/240.11, 375/240.19
See application file for complete search history.

(56) References Cited

U.S. PATENT DOCUMENTS

| 5,543,845 A * | 8/1996 | Asamura et al. ........ 375/240.02 |
| 6,359,928 B1 * | 3/2002 | Wang et al. ............. 375/240.05 |
| 6,847,736 B2 * | 1/2005 | Itokawa ..................... 382/240 |
| 7,050,640 B1 * | 5/2006 | Acharya et al. ............. 382/240 |

FOREIGN PATENT DOCUMENTS

| JP | 63-148790 | 6/1988 |
| JP | 08-186816 | 7/1996 |
| JP | 10-136352 | 5/1998 |
| JP | 2001-275119 | 10/2001 |
| JP | 2001-309381 | 11/2001 |
| JP | 2001-326936 | 11/2001 |

OTHER PUBLICATIONS

Vandendorpe et al., "Human Visual Weighted Quantization for Transform/Subband Image Coding Revisited for Interlaced Pictures," IEEE Trans. on Image Proc., v. 7 n. 2, pp. 222-225, Feb. 1998.*

(Continued)

*Primary Examiner*—Andrew W. Johns
*Assistant Examiner*—Jeffrey S Smith
(74) *Attorney, Agent, or Firm*—Blakely, Sokoloff, Taylor & Zafman LLP

(57) ABSTRACT

An apparatus for processing a non-interlaced image includes a wavelet transform part and a determination part. The wavelet transform part performs two-dimensional discrete wavelet transform of a level higher than or equal to level one on the data of the non-interlaced image. The determination part determines the movement speed of an object within the non-interlaced image based on at least the values of the wavelet coefficients of a 1LH sub-band of the wavelet coefficients obtained by the wavelet transform unit.

9 Claims, 69 Drawing Sheets

OTHER PUBLICATIONS

Shogo Muramatsu et al., "A Design Method of Invertible De-Interlacer with Sampling Density Preservation," IEEE 2002.*

Tetsuro Kuge, Wavelet Picture Coding and its Several Problems of the Application to the Interlace HDTV and the Ultra-High Definition Images, IEEE 2002.*

English language abstract of Japanese Patent No. JP02004350034A, by Fukuhara et al., published Dec. 2004.*

Taubman, et al., "JPEG2000: Image Compression Fundamentals, Standards and Practice," The Kluwer International Series in Engineering and Computer Science, ISBN 0-792307519-X, Kluwer Academic Publishers, 2002.

Japanese Notice of Rejection for JP Appln No. JP 2002-329553, Issue date May 16, 2007.(2 Pages).

* cited by examiner

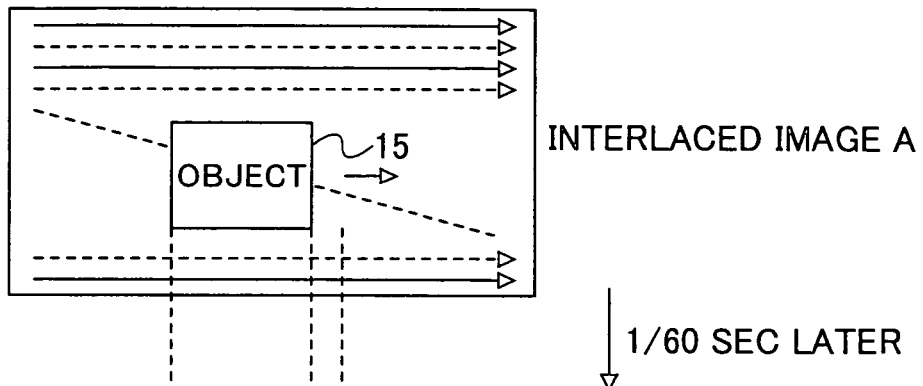
FIG.3A  INTERLACED IMAGE A
1/60 SEC LATER
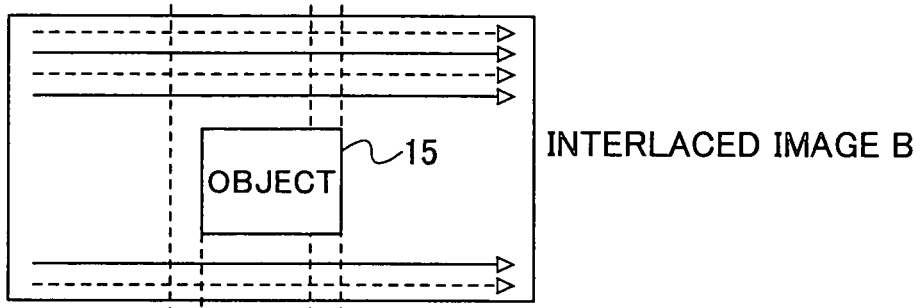
FIG.3B  INTERLACED IMAGE B
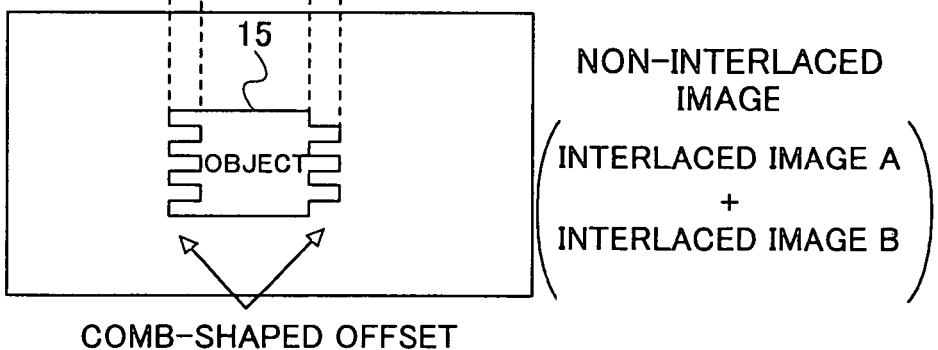
FIG.3C  NON-INTERLACED IMAGE
(INTERLACED IMAGE A + INTERLACED IMAGE B)
COMB-SHAPED OFFSET
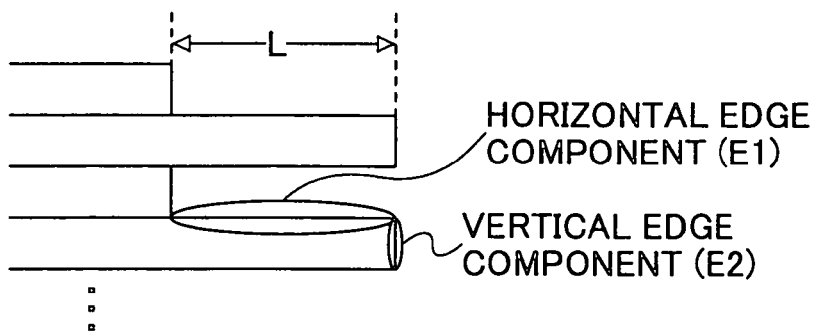
FIG.3D  HORIZONTAL EDGE COMPONENT (E1)
VERTICAL EDGE COMPONENT (E2)

WRITING DATA OF INTERLACE IMAGE A (FIELD)

1/60 SEC LATER

WRITING DATA OF INTERLACE IMAGE B (FIELD)

COMPLETION OF DATA OF NON-INTERLACED IMAGE (FRAME)
(INTERLACED IMAGE A + INTERLACED IMAGE B)

COMB-SHAPED OFFSET

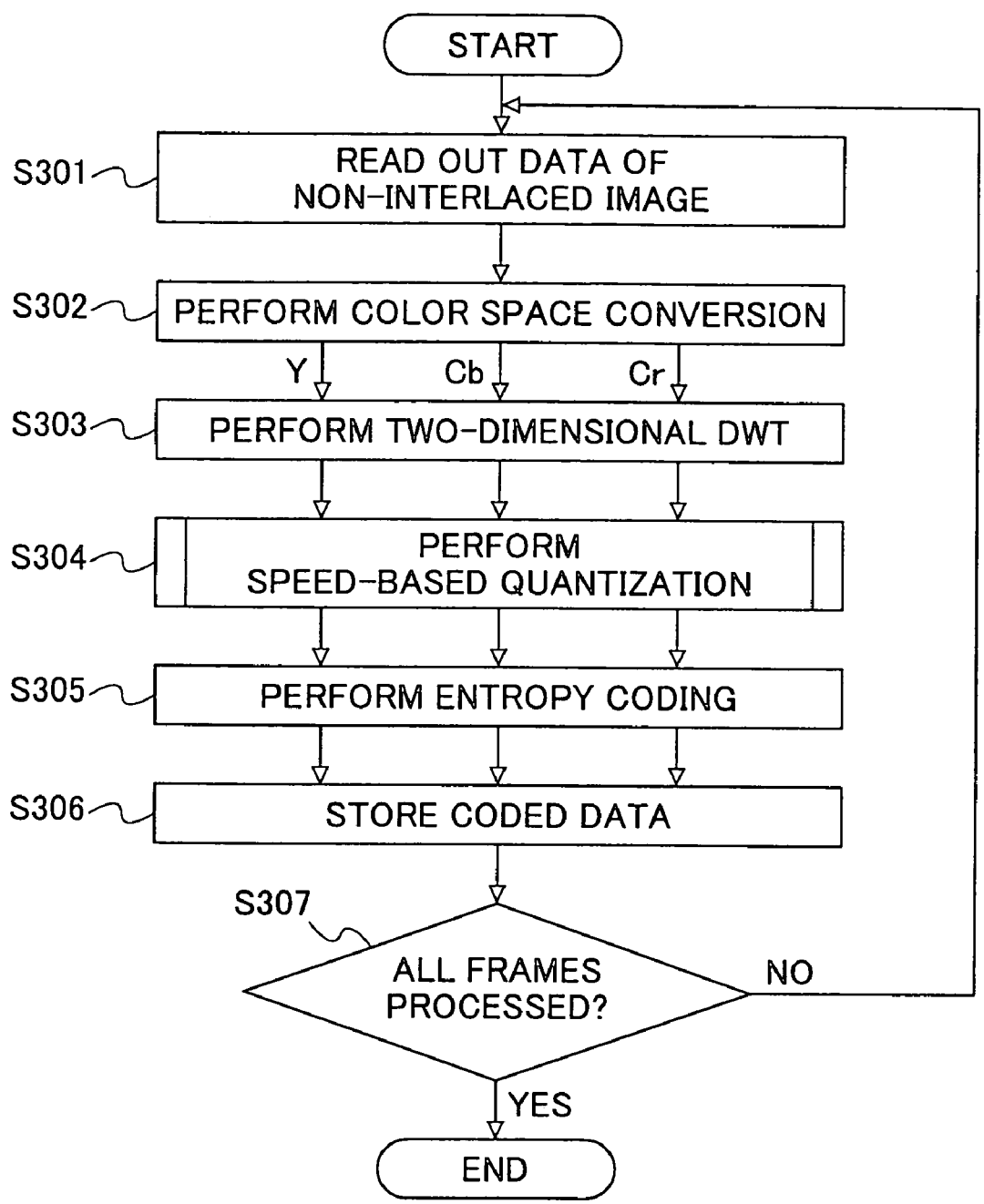

| | DECOMPOSITION LEVEL | | | | |
|---|---|---|---|---|---|
| | 5 | 4 | 3 | 2 | 1 |
| LL | 0.03 | | | | |
| HL | 0.07 | 0.14 | 0.28 | 0.58 | 1.14 |
| LH | 0.07 | 0.14 | 0.28 | 0.58 | 1.14 |
| HH | 0.13 | 0.27 | 0.56 | 1.19 | 2.22 |

| | DECOMPOSITION LEVEL | | | | |
|---|---|---|---|---|---|
| | 5 | 4 | 3 | 2 | 1 |
| LL | 0.03 | | | | |
| HL | 0.06 | 0.13 | 0.26 | 0.55 | 1.10 |
| LH | 0.06 | 0.13 | 0.26 | 0.55 | 1.10 |
| HH | 0.13 | 0.26 | 0.53 | 1.15 | 2.13 |

| | DECOMPOSITION LEVEL | | | | |
|---|---|---|---|---|---|
| | 5 | 4 | 3 | 2 | 1 |
| LL | 0.04 | | | | |
| HL | 0.07 | 0.15 | 0.30 | 0.64 | 1.26 |
| LH | 0.07 | 0.15 | 0.30 | 0.64 | 1.26 |
| HH | 0.15 | 0.30 | 0.61 | 1.31 | 2.44 |

| | DECOMPOSITION LEVEL | | | | |
|---|---|---|---|---|---|
| | 5 | 4 | 3 | 2 | 1 |
| LL | 1.00 | | | | |
| HL | 1.00 | 1.00 | 1.00 | 1.00 | 0.76 |
| LH | 1.00 | 1.00 | 1.00 | 1.00 | 0.76 |
| HH | 1.00 | 1.00 | 1.00 | 1.00 | 0.57 |

| | DECOMPOSITION LEVEL | | | | |
|---|---|---|---|---|---|
| | 5 | 4 | 3 | 2 | 1 |
| LL | 1.00 | | | | |
| HL | 0.88 | 0.79 | 0.65 | 0.45 | 0.23 |
| LH | 0.88 | 0.79 | 0.65 | 0.45 | 0.23 |
| HH | 0.83 | 0.71 | 0.53 | 0.31 | 0.11 |

| | DECOMPOSITION LEVEL | | | | |
|---|---|---|---|---|---|
| | 5 | 4 | 3 | 2 | 1 |
| LL | 1.00 | | | | |
| HL | 0.91 | 0.84 | 0.73 | 0.55 | 0.34 |
| LH | 0.91 | 0.84 | 0.73 | 0.55 | 0.34 |
| HH | 0.87 | 0.78 | 0.63 | 0.42 | 0.20 |

| | DECOMPOSITION LEVEL | | | | |
|---|---|---|---|---|---|
| | 5 | 4 | 3 | 2 | 1 |
| LL | 0.03 | | | | |
| HL | 0.07 | 0.14 | 0.28 | 0.58 | 1.51 |
| LH | 0.07 | 0.14 | 0.28 | 0.58 | 1.51 |
| HH | 0.13 | 0.27 | 0.56 | 1.20 | 3.87 |

| | DECOMPOSITION LEVEL | | | | |
|---|---|---|---|---|---|
| | 5 | 4 | 3 | 2 | 1 |
| LL | 0.03 | | | | |
| HL | 0.07 | 0.16 | 0.41 | 1.23 | 4.75 |
| LH | 0.07 | 0.16 | 0.41 | 1.23 | 4.75 |
| HH | 0.15 | 0.36 | 1.00 | 3.71 | 18.72 |

| | DECOMPOSITION LEVEL | | | | |
|---|---|---|---|---|---|
| | 5 | 4 | 3 | 2 | 1 |
| LL | 0.04 | | | | |
| HL | 0.08 | 0.18 | 0.42 | 1.15 | 3.74 |
| LH | 0.08 | 0.18 | 0.42 | 1.15 | 3.74 |
| HH | 0.17 | 0.38 | 0.98 | 3.14 | 12.19 |

| | \multicolumn{5}{c}{DECOMPOSITION LEVEL} |
|---|---|---|---|---|---|
| | 5 | 4 | 3 | 2 | 1 |
| LL | 1.00 | | | | |
| HL | 1.00 | 1.00 | 1.00 | 0.86 | 0.31 |
| LH | 1.00 | 1.00 | 1.00 | 0.86 | 0.31 |
| HH | 1.00 | 1.00 | 1.00 | 0.74 | 0.11 |

| | \multicolumn{5}{c}{DECOMPOSITION LEVEL} |
|---|---|---|---|---|---|
| | 5 | 4 | 3 | 2 | 1 |
| LL | 1.00 | | | | |
| HL | 0.82 | 0.69 | 0.50 | 0.28 | 0.10 |
| LH | 0.82 | 0.69 | 0.50 | 0.28 | 0.10 |
| HH | 0.75 | 0.58 | 0.36 | 0.15 | 0.03 |

| | \multicolumn{5}{c}{DECOMPOSITION LEVEL} |
|---|---|---|---|---|---|
| | 5 | 4 | 3 | 2 | 1 |
| LL | 1.00 | | | | |
| HL | 0.86 | 0.76 | 0.60 | 0.39 | 0.18 |
| LH | 0.86 | 0.76 | 0.60 | 0.39 | 0.18 |
| HH | 0.80 | 0.67 | 0.47 | 0.25 | 0.08 |

| | DECOMPOSITION LEVEL | | | | |
|---|---|---|---|---|---|
| | 5 | 4 | 3 | 2 | 1 |
| LL | 0.03 | | | | |
| HL | 0.07 | 0.14 | 0.28 | 0.67 | 3.72 |
| LH | 0.07 | 0.14 | 0.28 | 0.67 | 3.72 |
| HH | 0.13 | 0.27 | 0.56 | 1.61 | 20.38 |

| | DECOMPOSITION LEVEL | | | | |
|---|---|---|---|---|---|
| | 5 | 4 | 3 | 2 | 1 |
| LL | 0.03 | | | | |
| HL | 0.08 | 0.19 | 0.53 | 1.98 | 11.20 |
| LH | 0.08 | 0.19 | 0.53 | 1.98 | 11.20 |
| HH | 0.17 | 0.44 | 1.47 | 7.52 | 68.31 |

| | DECOMPOSITION LEVEL | | | | |
|---|---|---|---|---|---|
| | 5 | 4 | 3 | 2 | 1 |
| LL | 0.04 | | | | |
| HL | 0.09 | 0.20 | 0.51 | 1.64 | 7.08 |
| LH | 0.09 | 0.20 | 0.51 | 1.64 | 7.08 |
| HH | 0.18 | 0.44 | 1.30 | 5.29 | 31.68 |

| | DECOMPOSITION LEVEL | | | | |
|---|---|---|---|---|---|
| | 5 | 4 | 3 | 2 | 1 |
| LL | 1.00 | | | | |
| HL | 1.00 | 1.00 | 0.92 | 0.41 | 0.04 |
| LH | 1.00 | 1.00 | 0.92 | 0.41 | 0.04 |
| HH | 1.00 | 1.00 | 0.85 | 0.18 | 0.00 |

| | DECOMPOSITION LEVEL | | | | |
|---|---|---|---|---|---|
| | 5 | 4 | 3 | 2 | 1 |
| LL | 1.00 | | | | |
| HL | 0.72 | 0.54 | 0.32 | 0.12 | 0.02 |
| LH | 0.72 | 0.54 | 0.32 | 0.12 | 0.02 |
| HH | 0.61 | 0.40 | 0.19 | 0.04 | 0.00 |

| | DECOMPOSITION LEVEL | | | | |
|---|---|---|---|---|---|
| | 5 | 4 | 3 | 2 | 1 |
| LL | 1.00 | | | | |
| HL | 0.78 | 0.63 | 0.43 | 0.21 | 0.06 |
| LH | 0.78 | 0.63 | 0.43 | 0.21 | 0.06 |
| HH | 0.70 | 0.51 | 0.29 | 0.10 | 0.01 |

| | \multicolumn{5}{c|}{DECOMPOSITION LEVEL} |
| --- | --- | --- | --- | --- | --- |
| | 5 | 4 | 3 | 2 | 1 |
| LL | 0.03 | | | | |
| HL | 0.07 | 0.14 | 0.30 | 1.41 | 29.66 |
| LH | 0.07 | 0.14 | 0.30 | 1.41 | 29.66 |
| HH | 0.13 | 0.27 | 0.65 | 6.53 | 721.86 |

| | \multicolumn{5}{c|}{DECOMPOSITION LEVEL} |
| --- | --- | --- | --- | --- | --- |
| | 5 | 4 | 3 | 2 | 1 |
| LL | 0.03 | | | | |
| HL | 0.09 | 0.24 | 0.83 | 4.47 | 47.00 |
| LH | 0.09 | 0.24 | 0.83 | 4.47 | 47.00 |
| HH | 0.21 | 0.64 | 2.87 | 25.62 | 624.05 |

| | \multicolumn{5}{c|}{DECOMPOSITION LEVEL} |
| --- | --- | --- | --- | --- | --- |
| | 5 | 4 | 3 | 2 | 1 |
| LL | 0.04 | | | | |
| HL | 0.09 | 0.24 | 0.71 | 3.01 | 20.85 |
| LH | 0.09 | 0.24 | 0.71 | 3.01 | 20.85 |
| HH | 0.21 | 0.58 | 2.13 | 13.06 | 163.15 |

| | DECOMPOSITION LEVEL | | | | |
|---|---|---|---|---|---|
| | 5 | 4 | 3 | 2 | 1 |
| LL | 1.00 | | | | |
| HL | 1.00 | 1.00 | 1.00 | 1.00 | 0.76 |
| LH | 1.00 | 1.00 | 1.00 | 1.00 | 1.00 |
| HH | 1.00 | 1.00 | 1.00 | 1.00 | 0.57 |

| | DECOMPOSITION LEVEL | | | | |
|---|---|---|---|---|---|
| | 5 | 4 | 3 | 2 | 1 |
| LL | 1.00 | | | | |
| HL | 0.88 | 0.79 | 0.65 | 0.45 | 0.23 |
| LH | 0.88 | 0.79 | 0.65 | 0.53 | 0.45 |
| HH | 0.83 | 0.71 | 0.53 | 0.31 | 0.11 |

| | DECOMPOSITION LEVEL | | | | |
|---|---|---|---|---|---|
| | 5 | 4 | 3 | 2 | 1 |
| LL | 1.00 | | | | |
| HL | 0.91 | 0.84 | 0.73 | 0.55 | 0.34 |
| LH | 0.91 | 0.84 | 0.73 | 0.63 | 0.55 |
| HH | 0.87 | 0.78 | 0.63 | 0.42 | 0.20 |

FIG.37A

| Y | DECOMPOSITION LEVEL | | | | |
|---|---|---|---|---|---|
| | 5 | 4 | 3 | 2 | 1 |
| LL | 0.03 | | | | |
| HL | 0.07 | 0.14 | 0.28 | 0.58 | 1.51 |
| LH | 0.07 | 0.14 | 0.28 | 0.58 | 1.14 |
| HH | 0.13 | 0.27 | 0.56 | 1.20 | 3.87 |

FIG.37B

| Cb | DECOMPOSITION LEVEL | | | | |
|---|---|---|---|---|---|
| | 5 | 4 | 3 | 2 | 1 |
| LL | 0.03 | | | | |
| HL | 0.07 | 0.16 | 0.41 | 1.23 | 4.75 |
| LH | 0.07 | 0.16 | 0.41 | 1.04 | 2.43 |
| HH | 0.15 | 0.36 | 1.00 | 3.71 | 18.72 |

FIG.37C

| Cr | DECOMPOSITION LEVEL | | | | |
|---|---|---|---|---|---|
| | 5 | 4 | 3 | 2 | 1 |
| LL | 0.04 | | | | |
| HL | 0.08 | 0.18 | 0.42 | 1.15 | 3.74 |
| LH | 0.08 | 0.18 | 0.42 | 1.02 | 2.27 |
| HH | 0.17 | 0.38 | 0.98 | 3.14 | 12.19 |

| | DECOMPOSITION LEVEL | | | | |
|---|---|---|---|---|---|
| | 5 | 4 | 3 | 2 | 1 |
| LL | 1.00 | | | | |
| HL | 1.00 | 1.00 | 1.00 | 0.86 | 0.31 |
| LH | 1.00 | 1.00 | 1.00 | 1.00 | 0.86 |
| HH | 1.00 | 1.00 | 1.00 | 0.74 | 0.11 |

| | DECOMPOSITION LEVEL | | | | |
|---|---|---|---|---|---|
| | 5 | 4 | 3 | 2 | 1 |
| LL | 1.00 | | | | |
| HL | 0.82 | 0.69 | 0.50 | 0.28 | 0.10 |
| LH | 0.82 | 0.69 | 0.50 | 0.36 | 0.28 |
| HH | 0.75 | 0.58 | 0.36 | 0.15 | 0.03 |

| | DECOMPOSITION LEVEL | | | | |
|---|---|---|---|---|---|
| | 5 | 4 | 3 | 2 | 1 |
| LL | 1.00 | | | | |
| HL | 0.86 | 0.76 | 0.60 | 0.39 | 0.18 |
| LH | 0.86 | 0.76 | 0.60 | 0.47 | 0.39 |
| HH | 0.80 | 0.67 | 0.47 | 0.25 | 0.08 |

| | DECOMPOSITION LEVEL | | | | |
|---|---|---|---|---|---|
| | 5 | 4 | 3 | 2 | 1 |
| LL | 0.03 | | | | |
| HL | 0.07 | 0.14 | 0.28 | 0.67 | 3.72 |
| LH | 0.07 | 0.14 | 0.28 | 0.58 | 1.32 |
| HH | 0.13 | 0.27 | 0.56 | 1.61 | 20.38 |

| | DECOMPOSITION LEVEL | | | | |
|---|---|---|---|---|---|
| | 5 | 4 | 3 | 2 | 1 |
| LL | 0.03 | | | | |
| HL | 0.08 | 0.19 | 0.53 | 1.98 | 11.20 |
| LH | 0.08 | 0.19 | 0.53 | 1.53 | 3.91 |
| HH | 0.17 | 0.44 | 1.47 | 7.52 | 68.31 |

| | DECOMPOSITION LEVEL | | | | |
|---|---|---|---|---|---|
| | 5 | 4 | 3 | 2 | 1 |
| LL | 0.04 | | | | |
| HL | 0.09 | 0.20 | 0.51 | 1.64 | 7.08 |
| LH | 0.09 | 0.20 | 0.51 | 1.35 | 3.23 |
| HH | 0.18 | 0.44 | 1.30 | 5.29 | 31.68 |

| | DECOMPOSITION LEVEL | | | | |
|---|---|---|---|---|---|
| | 5 | 4 | 3 | 2 | 1 |
| LL | 1.00 | | | | |
| HL | 1.00 | 1.00 | 0.92 | 0.41 | 0.04 |
| LH | 1.00 | 1.00 | 0.92 | 0.85 | 0.41 |
| HH | 1.00 | 1.00 | 0.85 | 0.18 | 0.00 |

| | DECOMPOSITION LEVEL | | | | |
|---|---|---|---|---|---|
| | 5 | 4 | 3 | 2 | 1 |
| LL | 1.00 | | | | |
| HL | 0.72 | 0.54 | 0.32 | 0.12 | 0.02 |
| LH | 0.72 | 0.54 | 0.32 | 0.19 | 0.12 |
| HH | 0.61 | 0.40 | 0.19 | 0.04 | 0.00 |

| | DECOMPOSITION LEVEL | | | | |
|---|---|---|---|---|---|
| | 5 | 4 | 3 | 2 | 1 |
| LL | 1.00 | | | | |
| HL | 0.78 | 0.63 | 0.43 | 0.21 | 0.06 |
| LH | 0.78 | 0.63 | 0.43 | 0.29 | 0.21 |
| HH | 0.70 | 0.51 | 0.29 | 0.10 | 0.01 |

| | DECOMPOSITION LEVEL | | | | |
|---|---|---|---|---|---|
| | 5 | 4 | 3 | 2 | 1 |
| LL | 0.03 | | | | |
| HL | 0.07 | 0.14 | 0.30 | 1.41 | 29.66 |
| LH | 0.07 | 0.14 | 0.30 | 0.68 | 2.78 |
| HH | 0.13 | 0.27 | 0.65 | 6.53 | 721.86 |

| | DECOMPOSITION LEVEL | | | | |
|---|---|---|---|---|---|
| | 5 | 4 | 3 | 2 | 1 |
| LL | 0.03 | | | | |
| HL | 0.09 | 0.24 | 0.83 | 4.47 | 47.00 |
| LH | 0.09 | 0.24 | 0.83 | 2.99 | 8.83 |
| HH | 0.21 | 0.64 | 2.87 | 25.62 | 624.05 |

| | DECOMPOSITION LEVEL | | | | |
|---|---|---|---|---|---|
| | 5 | 4 | 3 | 2 | 1 |
| LL | 0.04 | | | | |
| HL | 0.09 | 0.24 | 0.71 | 3.01 | 20.85 |
| LH | 0.09 | 0.24 | 0.71 | 2.21 | 5.93 |
| HH | 0.21 | 0.58 | 2.13 | 13.06 | 163.15 |

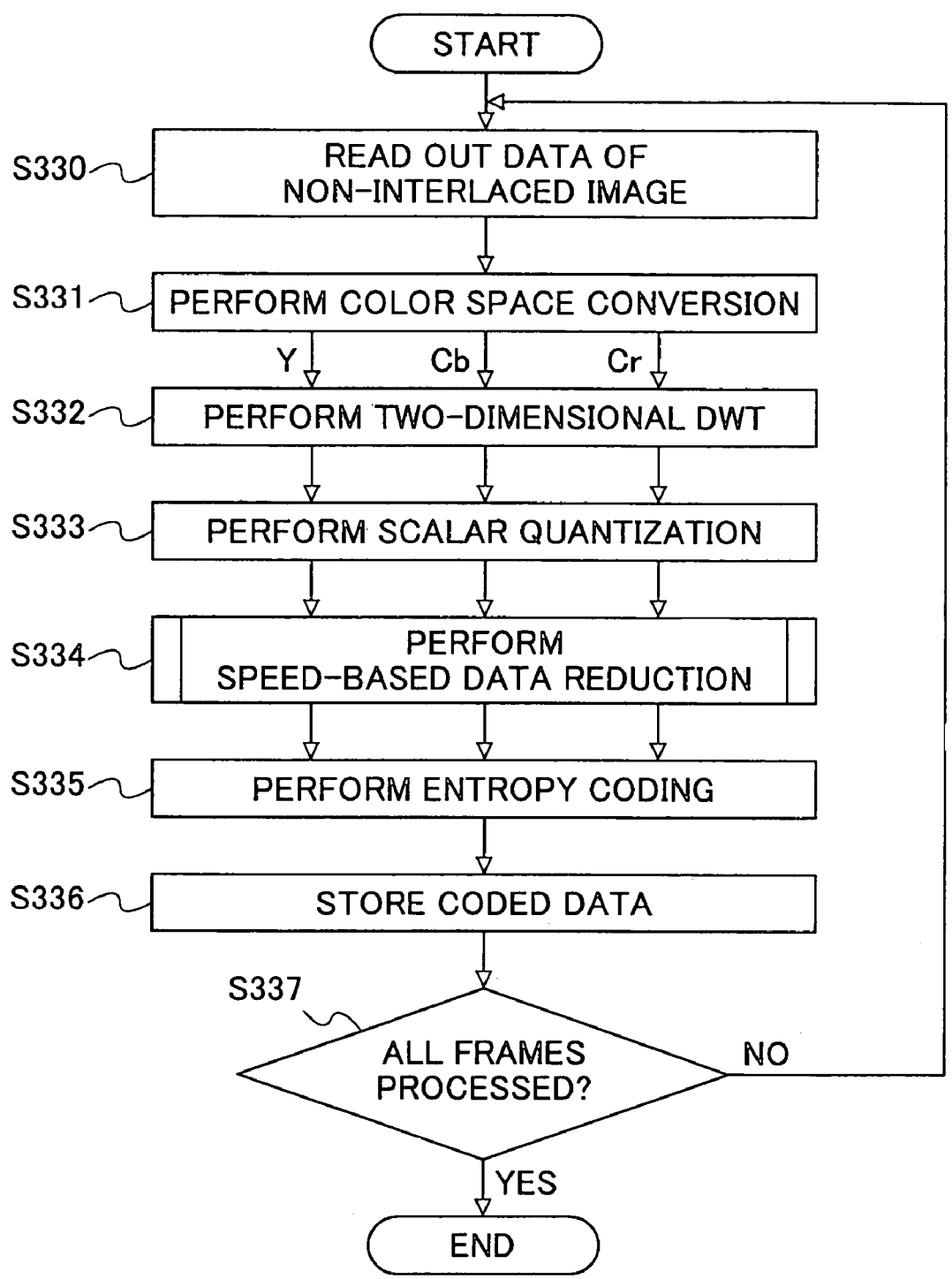

FIG.45A

| Y | DECOMPOSITION LEVEL | | | | |
|---|---|---|---|---|---|
| | 5 | 4 | 3 | 2 | 1 |
| LL | 0 | | | | |
| HL | 0 | 0 | 0 | 0 | 0 |
| LH | 0 | 0 | 0 | 0 | 0 |
| HH | 0 | 0 | 0 | 0 | 1 |

FIG.45B

| Cb | DECOMPOSITION LEVEL | | | | |
|---|---|---|---|---|---|
| | 5 | 4 | 3 | 2 | 1 |
| LL | 0 | | | | |
| HL | 0 | 0 | 1 | 1 | 2 |
| LH | 0 | 0 | 1 | 1 | 2 |
| HH | 0 | 0 | 1 | 2 | 3 |

FIG.45C

| Cr | DECOMPOSITION LEVEL | | | | |
|---|---|---|---|---|---|
| | 5 | 4 | 3 | 2 | 1 |
| LL | 0 | | | | |
| HL | 0 | 0 | 0 | 1 | 2 |
| LH | 0 | 0 | 0 | 1 | 2 |
| HH | 0 | 0 | 1 | 1 | 2 |

| | \multicolumn{5}{c}{DECOMPOSITION LEVEL} |
|---|---|---|---|---|---|
| | 5 | 4 | 3 | 2 | 1 |
| LL | 0 | | | | |
| HL | 0 | 0 | 0 | 0 | 2 |
| LH | 0 | 0 | 0 | 0 | 2 |
| HH | 0 | 0 | 0 | 0 | 3 |

| | \multicolumn{5}{c}{DECOMPOSITION LEVEL} |
|---|---|---|---|---|---|
| | 5 | 4 | 3 | 2 | 1 |
| LL | 0 | | | | |
| HL | 0 | 1 | 1 | 2 | 3 |
| LH | 0 | 1 | 1 | 2 | 3 |
| HH | 0 | 1 | 1 | 3 | 5 |

| | \multicolumn{5}{c}{DECOMPOSITION LEVEL} |
|---|---|---|---|---|---|
| | 5 | 4 | 3 | 2 | 1 |
| LL | 0 | | | | |
| HL | 0 | 0 | 1 | 1 | 2 |
| LH | 0 | 0 | 1 | 1 | 2 |
| HH | 0 | 1 | 1 | 2 | 4 |

| | DECOMPOSITION LEVEL | | | | |
|---|---|---|---|---|---|
| | 5 | 4 | 3 | 2 | 1 |
| LL | 0 | | | | |
| HL | 0 | 0 | 0 | 1 | 5 |
| LH | 0 | 0 | 0 | 1 | 5 |
| HH | 0 | 0 | 0 | 2 | 8 |

| | DECOMPOSITION LEVEL | | | | |
|---|---|---|---|---|---|
| | 5 | 4 | 3 | 2 | 1 |
| LL | 0 | | | | |
| HL | 0 | 1 | 2 | 3 | 5 |
| LH | 0 | 1 | 2 | 3 | 5 |
| HH | 1 | 1 | 2 | 4 | 8 |

| | DECOMPOSITION LEVEL | | | | |
|---|---|---|---|---|---|
| | 5 | 4 | 3 | 2 | 1 |
| LL | 0 | | | | |
| HL | 0 | 1 | 1 | 2 | 4 |
| LH | 0 | 1 | 1 | 2 | 4 |
| HH | 1 | 1 | 2 | 3 | 6 |

| | DECOMPOSITION LEVEL | | | | |
|---|---|---|---|---|---|
| | 5 | 4 | 3 | 2 | 1 |
| LL | 0 | | | | |
| HL | 0 | 0 | 0 | 0 | 0 |
| LH | 0 | 0 | 0 | 0 | 0 |
| HH | 0 | 0 | 0 | 0 | 1 |

| | DECOMPOSITION LEVEL | | | | |
|---|---|---|---|---|---|
| | 5 | 4 | 3 | 2 | 1 |
| LL | 0 | | | | |
| HL | 0 | 0 | 1 | 1 | 2 |
| LH | 0 | 0 | 1 | 1 | 1 |
| HH | 0 | 0 | 1 | 2 | 3 |

| | DECOMPOSITION LEVEL | | | | |
|---|---|---|---|---|---|
| | 5 | 4 | 3 | 2 | 1 |
| LL | 0 | | | | |
| HL | 0 | 0 | 0 | 1 | 2 |
| LH | 0 | 0 | 0 | 1 | 1 |
| HH | 0 | 0 | 1 | 1 | 2 |

| | DECOMPOSITION LEVEL | | | | |
|---|---|---|---|---|---|
| | 5 | 4 | 3 | 2 | 1 |
| LL | 0 | | | | |
| HL | 0 | 0 | 0 | 0 | 2 |
| LH | 0 | 0 | 0 | 0 | 0 |
| HH | 0 | 0 | 0 | 0 | 3 |

| | DECOMPOSITION LEVEL | | | | |
|---|---|---|---|---|---|
| | 5 | 4 | 3 | 2 | 1 |
| LL | 0 | | | | |
| HL | 0 | 1 | 1 | 2 | 3 |
| LH | 0 | 1 | 1 | 1 | 2 |
| HH | 0 | 1 | 1 | 3 | 5 |

| | DECOMPOSITION LEVEL | | | | |
|---|---|---|---|---|---|
| | 5 | 4 | 3 | 2 | 1 |
| LL | 0 | | | | |
| HL | 0 | 0 | 1 | 1 | 2 |
| LH | 0 | 0 | 1 | 1 | 1 |
| HH | 0 | 1 | 1 | 2 | 4 |

| | DECOMPOSITION LEVEL | | | | |
|---|---|---|---|---|---|
| | 5 | 4 | 3 | 2 | 1 |
| LL | 0 | | | | |
| HL | 0 | 0 | 0 | 1 | 5 |
| LH | 0 | 0 | 0 | 0 | 1 |
| HH | 0 | 0 | 0 | 2 | 8 |

| | DECOMPOSITION LEVEL | | | | |
|---|---|---|---|---|---|
| | 5 | 4 | 3 | 2 | 1 |
| LL | 0 | | | | |
| HL | 0 | 1 | 2 | 3 | 5 |
| LH | 0 | 1 | 2 | 2 | 3 |
| HH | 1 | 1 | 2 | 4 | 8 |

| | DECOMPOSITION LEVEL | | | | |
|---|---|---|---|---|---|
| | 5 | 4 | 3 | 2 | 1 |
| LL | 0 | | | | |
| HL | 0 | 1 | 1 | 2 | 4 |
| LH | 0 | 1 | 1 | 2 | 2 |
| HH | 1 | 1 | 2 | 3 | 6 |

FIG.60
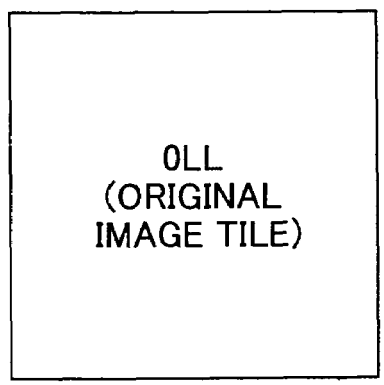
DECOMPOSITION_LEVEL_0
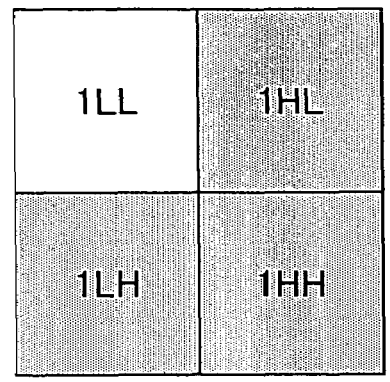
DECOMPOSITION_LEVEL_1
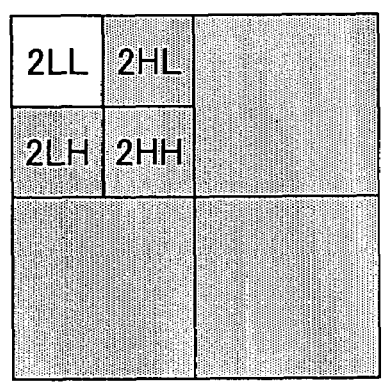
DECOMPOSITION_LEVEL_2
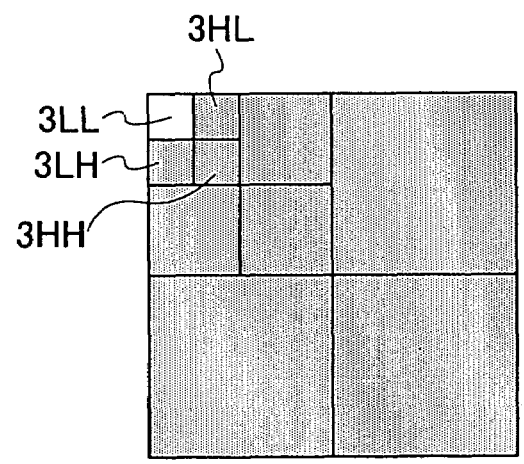
DECOMPOSITION_LEVEL_3

FIG.69
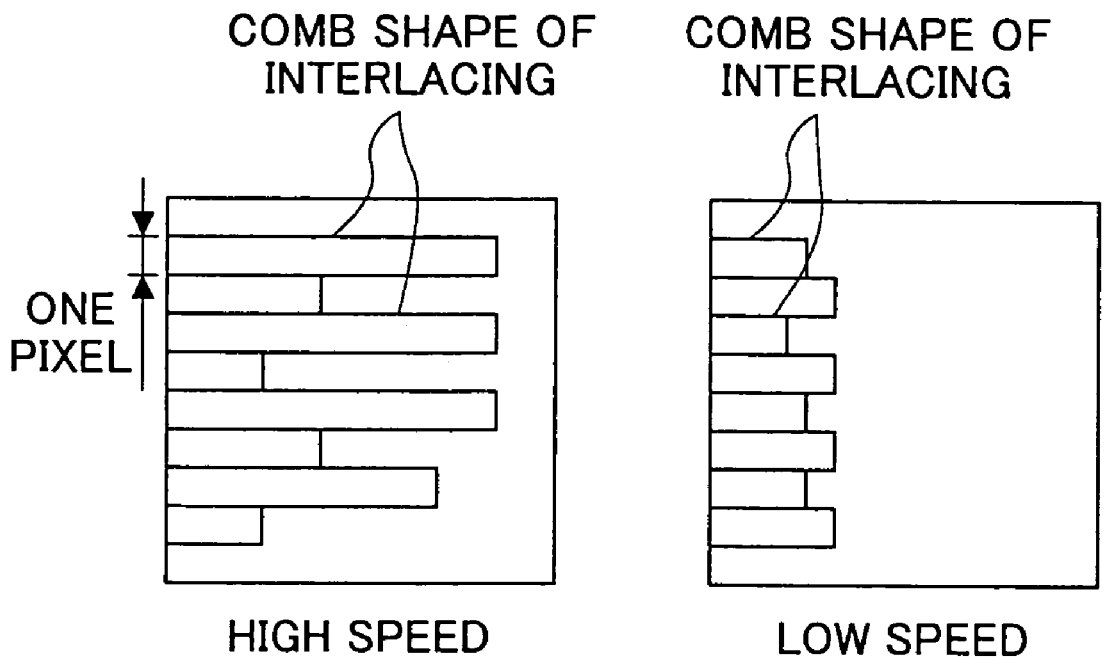
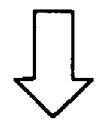
CODE BLOCK OF HIGHER SPEED
HAS LONGER HORIZONTAL
EDGE OF HIGH FREQUENCY
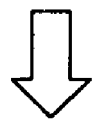
CODE BLOCK OF HIGHER SPEED
HAS GREATER AMOUNT OF 1LH CODES

| 2LL | 2HL | 1HL_1 | 1HL_2 |
|---|---|---|---|
| 2LH | 2HH | 1HL_3 | 1HL_4 |
| 1LH_1 | 1LH_2 | 1HH_1 | 1HH_2 |
| 1LH_3 | 1LH_4 | 1HH_3 | 1HH_4 |

| 2LL | 2HL | 1HL_1 | 1HL_2 |
|---|---|---|---|
| 2LH | 2HH | 1HL_3 | 1HL_4 |
| 1LH_1 HIGH | 1LH_2 HIGH | 1HH_1 | 1HH_2 |
| 1LH_3 HIGH | 1LH_4 LOW | 1HH_3 | 1HH_4 |

HIGH-SPEED CODE BLOCK : 3
LOW-SPEED CODE BLOCK : 1

ENTIRE IMAGE MOTION : HIGH (SPEED)

APPARATUS AND METHOD FOR PROCESSING IMAGE DATA BASED ON OBJECT MOVEMENT SPEED WITHIN A FRAME

The present application claims priority to the corresponding Japanese Application Nos. 2002-289867, filed on Oct. 2, 2002; 2002-300468, filed on Oct. 15, 2002, 2002-300476, filed on Oct. 15, 2002; 2002-329553, filed on Nov. 13, 2002; and 2002-360809, filed on Dec. 12, 2002, the entire contents of which are hereby incorporated by reference.

BACKGROUND OF THE INVENTION

1. Field of the Invention

The present invention generally relates to apparatuses and methods for processing a moving image, and more particularly, to an apparatus and method for processing a series of interlaced image.

2. Description of the Related Art

Recently, JPEG2000has been known as a compression and coding method suitable for processing high-definition images. Further, there is also a standard known as Motion JPEG2000that displays a moving image by successively reproducing still images encoded according to JPEG2000.

The inter-field movement (change) of an object, which is a parameter that does not pertain to a still image, exists in a series of interlaced images captured by a video camera, comparing the interlaced image of a field with that of the previous field. There have already been proposed Motion JPEG2000-compliant moving image processing apparatuses that detect the movement speed of an object within a frame using the above-described parameter of movement, and adaptively perform a compression and coding process. Japanese Published Examined Patent Application No. 4-77517 (corresponding to Japanese Laid-Open Patent Application No. 63-148790) discloses one of such moving image processing apparatuses.

The Motion JPEG2000-compliant moving image processing apparatuses perform the operation of obtaining an inter-field difference in the image data of an object and calculating the movement speed of the object based on the obtained difference data. Accordingly, a large amount of data should be processed so that a large amount of time and a large amount of memory capacity are required for the operation.

There are a variety of well-known conventional image processing apparatuses that convert image data into frequency-region coefficients by discrete cosine transform (DCT) or two-dimensional wavelet transform (DWT), quantize the coefficients frequency by frequency, and perform entropy coding on the quantized coefficients. For instance, Japanese Laid-Open Patent Application No. 8-186816 discloses an image processing apparatus that converts a quantization step size employed in the above-described quantization into a unit of image quality control (for instance, the unit of a sub-band in the case of using wavelet transform) in order to increase the amount of data compression while preventing the degradation of image quality.

This image processing apparatus, which uses two-dimensional DWT, sets the quantization step size for quantizing the wavelet coefficients obtained by the DWT so that the quantization step size is the largest for the HH sub-band, the second largest for the HL sub-band, and the smallest for the LH sub-band with respect to a luminance signal, and is the largest for the HH sub-band, the second largest for the LH sub-band, and the smallest for the HL sub-band with respect to a color difference signal.

The contents of the adjustment of the quantization step size are obtained based on experimental data obtained from experiments using "Mobile & Calendar," which is a standard MPEG image and are not specified based on the characteristics of a halftone image.

Further, a non-interlaced image having the interlaced images of two fields successively captured by a video camera at every interval of 1/60 second includes a comb-shaped pixel offset corresponding to the horizontal movement speed of an object. The above-described image processing apparatus does not take into consideration the fact that the comb-shaped pixel offset changes with the movement speed of the object. Accordingly, depending on the movement speed of the object, an originally single vertical line may become two separate lines or the outline of a reproduced image may include horizontal blurring, thus causing a great degradation of image quality.

Recently, improvements in image input and output technologies have greatly increased demand for high-definition images. In the case of digital cameras as image input apparatuses, for instance, high-performance charge coupled devices (CCDS) having 3,000,000 pixels or more have been reduced in price to be widely used in digital cameras in a popular price range. It is expected that products employing CCDs having 5,000,000 pixels or more will be commercially available in the near future. It is expected that this trend toward an increasing number of pixels will continue for a while.

On the other hand, there have also been remarkable developments in the high-definition property and significant progress in the price reduction of image output apparatuses and image display apparatuses such as hard-copy apparatuses including laser printers, ink-jet printers, and sublimation-type printers, and soft-copy apparatuses including flat panel displays made of CRTs, liquid crystal displays (LCDs), and plasma display panels (PDPs).

Due to the introduction of these high-performance, inexpensive image input and output apparatuses to the market, high-definition images have become popular. As a result, it is expected that there will be an increasing demand for high-definition images in various fields in the future. Actually, the developments in technologies related to PCs and networks including the Internet have accelerated such trends at an increasing rate. Particularly in recent years, mobile equipment such as mobile phones and notebook personal computers has become so popular that opportunities to transmit or receive high-definition images anywhere through communication means have increased rapidly.

It seems inevitable that, with these background trends, demand for improvement in the performance and multi-functioning of image compression and/or decompression technologies will become stronger in the future so that processing of high-definition images can be facilitated.

Therefore, in recent years, a new image compression method called JPEG2000, which can restore with high quality an image compressed at a high compression rate, has been standardized as one of image compression techniques satisfying such demand. According to JPEG2000, by dividing an image into rectangular regions called tiles, compression and decompression can be performed on the image with a small memory capacity. That is, each individual tile serves as a basic unit in performing compression and decompression processes, So that the tiles can be subjected to the compression and decompression processes independent of one another.

Further, such single-frame JPEG2000 images may be successively displayed at a predetermined frame rate (representing the number of frames reproduced per unit of time) as a moving image. There is an international standard called Motion JPEG2000 for successively displaying single-frame JPEG2000 images as a moving image.

Japanese Laid-Open Patent Application No. 2001-309381 discloses the technique of compressing and encoding image data using DWT as Motion JPEG2000. According to this technique, not only pixel values are compressed and encoded by DWT, but also the images of different frames are correlated in order to eliminate the redundancy of moving image data in the case where no image movement between the frames occurs. As a result, the rate of data compression can be further improved. However, in order to obtain the correlation between the frames, this technique requires the complicated processing of decoding and inversely quantizing the encoded orthogonal transform coefficients, thus requiring more processing time. Further, this technique requires a memory capacity for storing a preceding one of the frames used for obtaining the inter-frame correlation.

SUMMARY OF THE INVENTION

An apparatus and method for processing image data based on object movement speed is described. In one embodiment, the apparatus for processing a non-interlaced image, comprises a wavelet transform unit to perform a two-dimensional discrete wavelet transform of a level higher than or equal to level one on data of the non-interlaced image, and a determination unit to determine a movement speed of an object within the non-interlaced image based on at least values of wavelet coefficients of a 1LH sub-band of wavelet coefficients obtained by the wavelet transform unit.

BRIEF DESCRIPTION OF THE DRAWINGS

Other objects, features and advantages of the present invention will become more apparent from the following detailed description when read in conjunction with the accompanying drawings, in which:

FIGS. 3A through 3D are diagrams for illustrating a phenomenon occurring when a non-interlaced image is generated from interlaced images captured by the video camera and the principles of one embodiment of a process for determining an in-frame object movement speed using the phenomenon;

FIG. 26 is a flowchart of one embodiment of a process of a coding operation performed by a CPU of the image processing apparatus according to the first mode;

FIGS. 29A through 29C are tables showing one embodiment of normalizing denominators of Y, Cr, and Cb components, respectively, by sub-band type and Decomposition Level (1-5), the normalizing denominators being employed in the case of obtaining quantization steps;

FIGS. 30A through 30C are tables showing one embodiment of weighting factors for high speed of the Y, Cr, and Cb components, respectively, by sub-band type and Decomposition Level (1-5), the weighting factors being employed in the case of obtaining quantization steps for high speed;

FIGS. 31A through 31C are tables showing an embodiment of the quantization steps for high speed of the Y, Cr, and Cb components, respectively, by sub-band type and Decomposition Level (1-5);

FIGS. 32A through 32C are tables showing one embodiment of weighting factors for intermediate speed of the Y, Cr, and Cb components, respectively, by sub-band type and Decomposition Level (1-5), the weighting factors being employed in the case of obtaining quantization steps for intermediate speed;

FIGS. 33A through 33C are tables showing one embodiment of the quantization steps for intermediate speed of the Y, Cr, and Cb components, respectively, by sub-band type and Decomposition Level (1-5);

FIGS. 34A through 34C are tables showing one embodiment of weighting factors for low speed of the Y, Cr, and Cb components, respectively, by sub-band type and Decomposition Level (1-5), the weighting factors being employed in the case of obtaining quantization steps for low speed;

FIGS. 35A through 35C are tables showing one embodiment of the quantization steps for low speed of the Y, Cr, and Cb components, respectively, by sub-band type and Decomposition Level (1-5);

FIGS. 36A through 36C are tables showing one embodiment of weighting factors for high speed of the Y, Cr, and Cb components, respectively, by sub-band type and Decomposition Level (1-5), the weighting factors being employed in the case of obtaining quantization steps for high speed;

FIGS. 37A through 37C are tables showing one embodiment of the quantization steps for high speed of the Y, Cr, and Cb components, respectively, by sub-band type and Decomposition Level (1-5), the quantization steps being obtained using the weighting factors of FIGS. 36A through 36C;

FIGS. 38A through 38C are tables showing one embodiment of weighting factors for intermediate speed of the Y, Cr, and Cb components, respectively, by sub-band type and Decomposition Level (1-5), the weighting factors being employed in the case of obtaining quantization steps for intermediate speed;

FIGS. 39A through 39C are tables showing one embodiment of the quantization steps for intermediate speed of the Y, Cr, and Cb components, respectively, by sub-band type and Decomposition Level (1-5), the quantization steps being obtained using the weighting factors of FIGS. 38A through 38C;

FIGS. 40A through 40C are tables showing one embodiment of weighting factors for low speed of the Y, Cr, and Cb components, respectively, by sub-band type and Decomposition Level (1-5), the weighting factors being employed in the case of obtaining quantization steps for low speed;

FIGS. 41A through 41C are tables showing one embodiment of the quantization steps for low speed of the Y, Cr, and Cb components, respectively, by sub-band type and Decomposition Level (1-5), the quantization steps being obtained using the weighting factors of FIGS. 40A through 40C;

FIG. 42 is a flowchart of one embodiment of a coding operation performed by the CPU of an image processing apparatus according to a second mode;

FIGS. 45A through 45C are tables showing one embodiment of bit plane truncation numbers for high speed for the Y, Cb, and Cr components, respectively, by sub-band type and Decomposition Level (1-5) according to the second mode;

FIGS. 46A through 46C are tables showing one embodiment of bit plane truncation numbers for intermediate speed for the Y, Cb, and Cr components, respectively, by sub-band type and Decomposition Level (1-5) according to the second mode;

FIGS. 47A through 47C are tables showing one embodiment of bit plane truncation numbers for low speed for the Y, Cb, and Cr components, respectively, by sub-band type and Decomposition Level (1-5) according to the second mode;

FIGS. 48A through 48C are tables showing one embodiment of bit plane truncation numbers for high speed for the Y, Cb, and Cr components, respectively, by sub-band type and Decomposition Level (1-5) in the case of using other weighting factors according to the second mode;

FIGS. 49A through 49C are tables showing one embodiment of bit plane truncation numbers for intermediate speed for the Y, Cb, and Cr components, respectively, by sub-band type and Decomposition Level (1-5) in the case of using other weighting factors according to the second mode;

FIGS. 50A through 50C are tables showing one embodiment of bit plane truncation numbers for low speed for the Y, Cb, and Cr components, respectively, by sub-band type and Decomposition Level (1-5) in the case of using other weighting factors according to the second mode;

FIG. 60 is a diagram for illustrating sub-bands at each decomposition level when the number of decomposition levels is three according to JPEG2000;

FIG. 69 is a diagram for illustrating one embodiment of a method of estimating an image motion (speed) by a speed estimation unit of the post-quantization unit;

DETAILED DESCRIPTION

Figure 1:
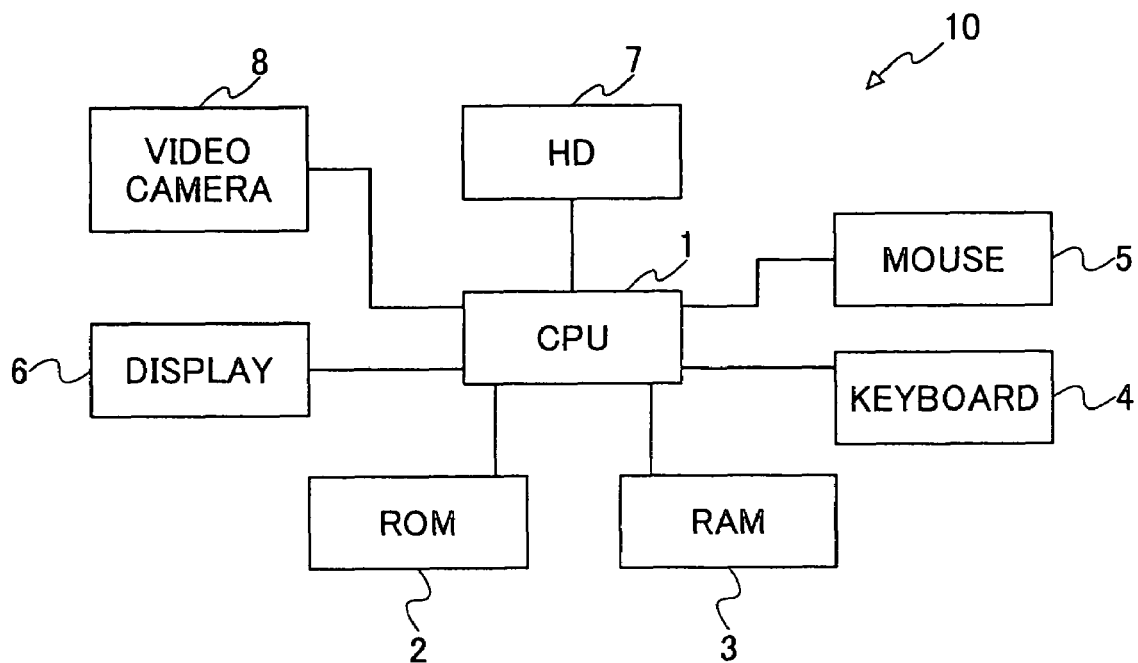
FIG. 1 is a block diagram of one embodiment of an image processing apparatus.

Accordingly, embodiments of the present invention provide an image processing apparatus and method in which the above-described disadvantage is eliminated.

A more specific embodiment of the present invention provides an image processing apparatus and method that determine the movement speed of an object by a simple operation using a small amount of data without the inter-field difference in the image data of the object, and perform processing based on the determination result.

Another more specific embodiment of the present invention provides an image processing apparatus and method for processing a non-interlaced image having the interlaced images of successive fields, which apparatus and method realizes excellent compression and coding of image data without causing the degradation of the quality of a reproduced image in accordance with the movement speed of an object within a frame.

Yet another more specific embodiment of the present invention provides a motion estimation apparatus and method for obtaining the motion of an image at high speed with high accuracy.

The above techniques are achieved by an apparatus for processing a non-interlaced image, including: a wavelet transform unit to perform a two-dimensional discrete wavelet transform of a level higher than or equal to level one on data of the non-interlaced image; and a determination unit to determine a movement speed of an object within the non-interlaced image based on at least values of wavelet coefficients of a 1LH sub-band of wavelet coefficients obtained by the wavelet transform unit.

According to the above-described apparatus, the movement speed of an object can be determined easily by a simple operation without calculating the inter-field movement of the object.

The above techniques of the present invention are also achieved by a method of processing a non-interlaced image, the method including: (a) performing a two-dimensional discrete wavelet transform on the non-interlaced image; and (b) determining a movement speed of an object within the non-interlaced image based on at least values of wavelet coefficients of a 1LH sub-band of wavelet coefficients obtained by operation (a).

According to the above-described method, the movement speed of an object can be determined easily by a simple operation without calculating the inter-field movement of the object.

The above techniques of the present invention are also achieved by an apparatus for processing a non-interlaced image, including: a wavelet transform unit to perform a two-dimensional discrete wavelet transform of a level higher than or equal to level one on data of the non-interlaced image; and a determination unit to divide wavelet coefficients of each of sub-bands obtained by the wavelet transform unit into blocks each having a pixel matrix smaller in size than each sub-band, and determining a movement speed of an object within the non-interlaced image based on at least coefficient values of each block of a 1LH sub-band.

According to the above-described apparatus, the movement speed of an object can be determined easily by a simple operation without calculating the inter-field movement of the object. Further, the in-frame object movement speed is determined based on the coefficient values of each code block smaller in size than a sub-band. Accordingly, for instance, the case where only a relatively small object moves at high speed in a still image can be recognized correctly.

The above techniques of the present invention are also achieved by a method of processing a non-interlaced image, the method including: (a) performing two-dimensional discrete wavelet transform on the non-interlaced image; and (b) dividing wavelet coefficients of each of sub-bands obtained by operation (a) into blocks each having a pixel matrix smaller in size than each sub-band, and determining a movement speed of an object within the non-interlaced image based on at least coefficient values of each block of a 1LH sub-band.

According to the above-described method, the movement speed of an object can be determined easily by a simple operation without calculating the inter-field movement of the object. Further, the in-frame object movement speed is determined based on the coefficient values of each code block smaller in size than a sub-band. Accordingly, for instance, the case where only a relatively small object moves at high speed in a still image can be recognized correctly.

The above techniques of the present invention are also achieved by an image processing apparatus encoding image data of a non-interlaced image into code data, the non-interlaced image having two successive interlaced images, the image processing apparatus including: a data reduction unit that reduces an amount of the code data, wherein as a movement speed of an object in the non-interlaced image increases, the data reduction unit decreases an amount to be reduced of part of the code data, the part of the code data affecting reproducibility of an edge part of the non-interlaced image.

The above techniques of the present invention are also achieved by an image processing method encoding image data of a non-interlaced image into code data, the non-interlaced image having two successive interlaced images, the image processing method including reducing an amount of the code data, wherein as a movement speed of an object in the non-interlaced image increases, reducing the amount of the coded data decreases an amount to be reduced of part of the code data, the part of the code data affecting reproducibility of an edge part of the non-interlaced image.

According to the above-described image processing apparatus and method, which process a non-interlaced image (frame) generated from the interlaced images of two successive fields, data reduction (including data reduction through quantization) can be realized in order to increase the reproducibility of a comb-shaped image offset appearing in the non-interlaced image in consideration of the human visual characteristics as the in-frame object movement speed increases.

The above techniques of the present invention are also achieved by a motion estimation apparatus, wherein each of frames having interlaced images forming a moving image is divided into one or a plurality of blocks, and the frames are hierarchically compressed and encoded into the code stream data by performing a discrete wavelet transform on pixel values block by block, the motion estimation apparatus including: a sub-block acquisition unit that acquires sub-blocks included in high-frequency sub-bands block by block from code stream data; a code amount calculation unit that calculates an amount of codes of each of the acquired sub-blocks; and a sub-block motion estimation unit that estimates a motion in each of the sub-blocks based on the calculated amount of codes thereof.

The above techniques of the present invention are also achieved by a motion estimation method, wherein each of frames having interlaced images forming a moving image is divided into one or a plurality of blocks, and the frames are hierarchically compressed and encoded into the code stream data by performing a discrete wavelet transform on pixel values block by block, the motion estimation method including: (a) acquiring sub-blocks included in high-frequency sub-bands block by block from code stream data; (b) calculating an amount of codes of each of the acquired sub-blocks; and (c) estimating a motion in each of the sub-blocks based on the calculated amount of codes thereof.

According to the above-described motion estimation apparatus and method, the amount of codes of the sub-blocks included in the high-frequency sub-bands is calculated block by block, and the image motion (speed) is estimated code block by code block based on the amount of sub-blocks. As a result, there is no need to calculate the difference between frames so that memory consumption can be controlled and processing time can be reduced. Accordingly, the image motion (speed) in each code block can be estimated at high speed with high accuracy.

The above techniques of the present invention are also achieved by a computer-readable recording medium storing a program for causing a computer to execute a motion estimation method, wherein each of frames having interlaced images forming a moving image is divided into one or a plurality of blocks, and the frames are hierarchically compressed and encoded into the code stream data by performing discrete wavelet transform on pixel values block by block, the motion estimation method including: (a) acquiring sub-blocks included in high-frequency sub-bands block by block from code stream data; (b) calculating an amount of codes of each of the acquired sub-blocks; and (c) estimating a motion in each of the sub-blocks based on the calculated amount of codes thereof.

The above objects of the present invention are further achieved by a program for causing a computer to execute a motion estimation method, wherein each of frames having interlaced images forming a moving image is divided into one or a plurality of blocks, and the frames are hierarchically compressed and encoded into the code stream data by performing a discrete wavelet transform on pixel values block by block, the motion estimation method including: (a) acquiring sub-blocks included in high-frequency sub-bands block by block from code stream data; (b) calculating an amount of codes of each of the acquired sub-blocks; and (c) estimating a motion in each of the sub-blocks based on the calculated amount of codes thereof.

A description is given below, with reference to the accompanying drawings, of embodiments of the present invention.

FIRST EMBODIMENT

An image processing apparatus according to a first embodiment of the present invention processes the image data of a non-interlaced image (a frame) obtained by combining the interlaced images of two fields successively captured by a video camera. Among the coefficient values obtained by performing two-dimensional discrete wavelet transform (DWT) on the image data of the non-interlaced image, the coefficient values of the 1LH sub-band increase, together with the amount of codes thereof, in proportion to the horizontal movement speed of an object within the fields (frame) captured by the video camera, while the coefficient values and the amount of codes of the 1HL sub-band show substantially constant values. The image processing apparatus of this embodiment, based on these characteristics, determines the horizontal movement speed of the object within the fields (to be HIGH or LOW), and performs coding more effectively in accordance with the determination result.

A description is given below of an image processing apparatus 10 for processing an interlaced image and the operation of determining the movement speed of an object within a frame (in-frame object movement speed) and its variations according to the first embodiment. FIG. 1 is a block diagram showing the image processing apparatus 10. The image processing apparatus 10 includes a central processing unit (CPU) 1, a ROM 2 storing an image processing program, a RAM 3 that is used when the image processing program is executed, a keyboard 4 and a mouse 5 that are man-machine interfaces, a display 6, a video camera 8, and a hard disk (HD) 7 that is a primary recorder and records data for an image captured by the video camera 8 in the process of coding and the resultant coded data.

Figure 2:
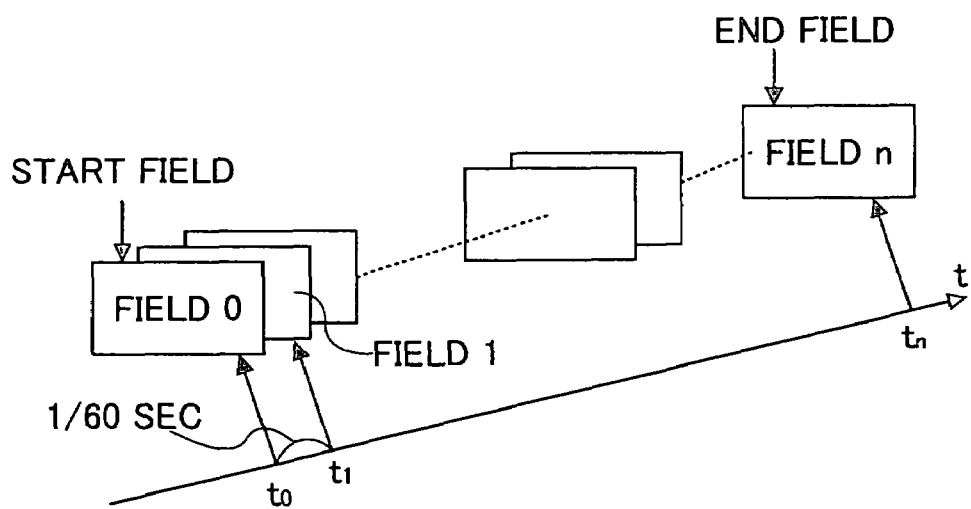
FIG. 2 is a diagram showing a series of fields captured at intervals of 1/60 second by one embodiment of a video camera.

FIG. 2 is a diagram showing a series of fields captured by the video camera 8. With the start of image capturing at a time $t_0$, the video camera 8 scans the image of a field 0 by interlacing, and 1/60 second later, at a time $t_1$, the video camera 8 scans the image of a field 1 by interlacing. By an end time $t_n$, the video camera 8 scans the images of n fields by interlacing at intervals of 1/60 second.

FIGS. 3A through 3D are diagrams for illustrating a phenomenon occurring when a non-interlaced image is generated from interlaced images captured by the video camera 8 and the principles of the determination of the movement speed of an object using the phenomenon. Referring to FIG. 3A, according to interlacing, after the first pixel line (the solid first scanning line) is scanned, the third pixel line two pixels below the first line (the solid third scanning line) is scanned, skipping the second pixel line immediately below the first pixel line (the broken second scanning line). Referring to FIG. 3B, immediately after completing the scanning of an interlaced image A, the video camera 8 scans the pixel lines that were not scanned at the previous scanning (the solid scanning lines in FIG. 3B). As a result, an interlaced image B is captured. At the time of capturing these images A and B, 1/60 second has passed since the scanning of a first pixel line before scanning a second pixel line immediately below the first pixel line. The comparison of FIGS. 3A and 3B shows that an object 15 has moved rightward during the 1/60 second. Naturally, the object 15 could move leftward in other cases. Accordingly, referring to FIG. 3C, a non-interlaced image formed by superimposing the interlaced image B on the interlaced image A includes a comb-shaped offset equivalent to a few pixels in each horizontal end of the non-interlaced image.

Data for the non-interlaced image can be formed by alternately arranging the image data of the interlaced image A and the image data of the interlaced image B scanning line by scanning line (one-pixel scanning line by one-pixel scanning line in this case). That is, the non-interlaced image can be formed by complementing data for the scanning lines that have not been scanned for each of the interlaced images A and B.

Referring to FIG. 3D, the amount L of the comb-shaped offset increases (becomes longer in FIG. 3D) in proportion to the movement speed of the object 15 within the interlaced images. The coefficient values of the 1LH sub-band obtained by performing two-dimensional DWT on the image data of the non-interlaced image having the above-described comb-shaped offset increase in proportion to the total of horizontal edge components E1, that is, the movement speed of the object 15 within the interlaced images. Further, the coefficient values of the 1HL sub-band increase in proportion to the total of vertical edge components E2. However, it is assumed that the coefficient values of the 1HL sub-band remain substantially the same irrespective of the movement speed of the object 15 based on the empirical rule that generally, almost all objects make horizontal movements while their images are being captured. As described below, the image processing apparatus 10 determines the movement speed of an object within interlaced images using the above-described characteristic of the coefficient values of the 1LH sub-band.

Figure 4:
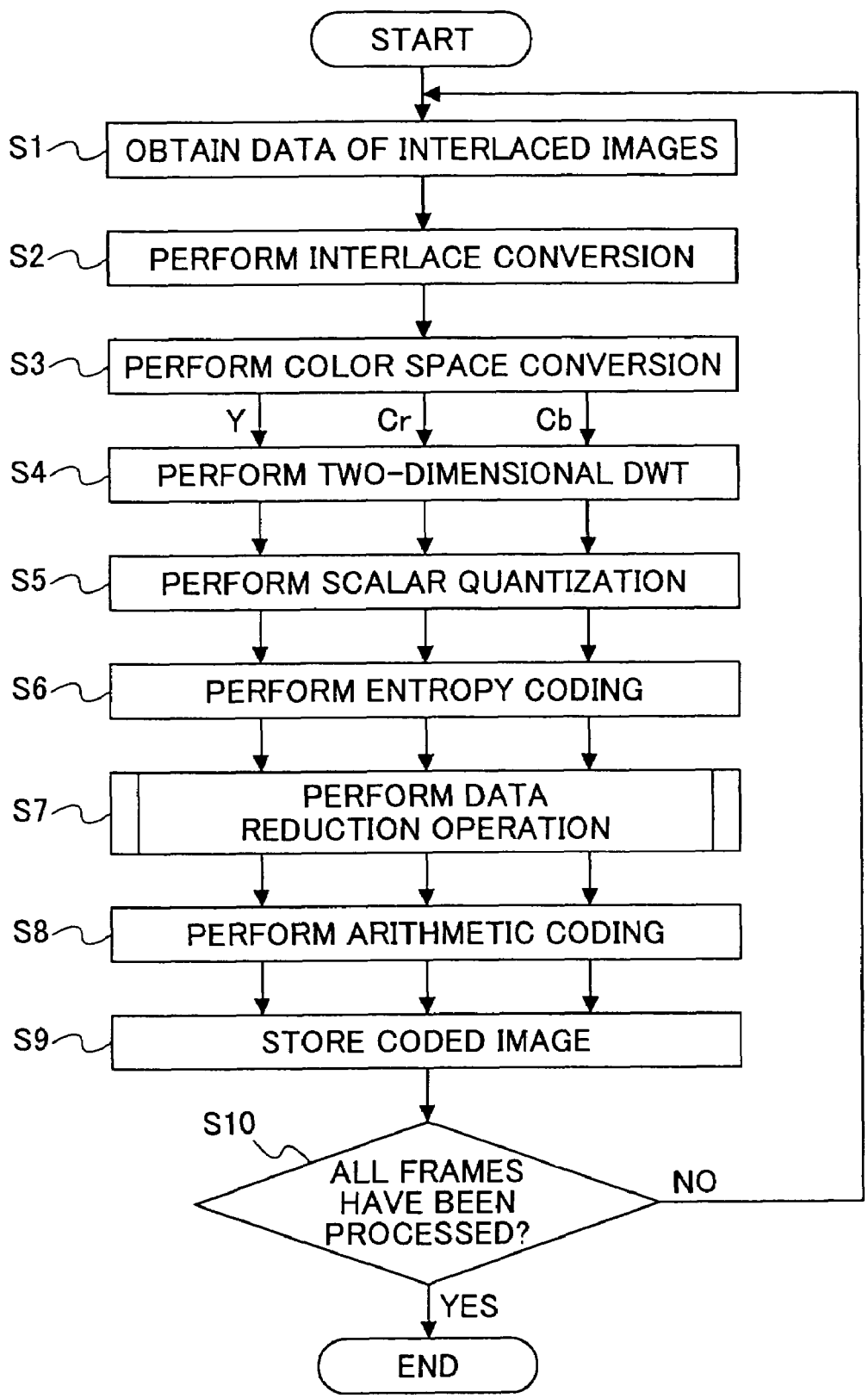
FIG. 4 is a flowchart of the main routine of one embodiment of an image processing program executed by the image processing apparatus.

FIG. 4 is a flowchart of one embodiment of the main routine of the image processing program executed by the CPU 1 of the image processing apparatus 10. First, in step S1 of FIG. 4, the video camera 8 captures the image data of interlaced images having a series of fields, (FIG. 2). Specifically, the data of the interlaced image obtained by performing scanning at intervals of 1/60 second by the video camera is recorded in the RAM 3 or on the HD 7. The data of the interlaced images of the successive fields are thus obtained by the video camera 8. Alternatively, however, the data of the interlaced images of the successive fields in the state before being subjected to compression and coding may be recorded on the HD 7 for reading out successively.

In step S2, the interlaced images of two fields obtained by successive scanning are combined (or subjected to so-called interlace conversion), so that a non-interlaced image as shown in FIG. 3C is formed. The interlace conversion is performed by, for instance, alternately outputting the data of an interlaced image and the data of the next interlaced image scanning line by scanning line to the RAM 3. Alternatively, the interlace conversion may be performed by first loading the data of an interlaced image read earlier into the data map of a non-interlaced image in the RAM 3 and then writing the data of the next interlaced image obtained by successive scanning to the data map.

In step S3, the image data of the non-interlaced image obtained by the interlace conversion is converted to data for Y, Cr, and Cb color components. In the following process, the data of all the color components is processed in parallel following the same procedure. In the following description, however, only the case of the Y color component data is illustrated for simplification.

In step S4, two-dimensional DWT of level 3 is performed on the Y color component data so that the wavelet coefficients obtained as a result of the DWT are recorded in the RAM 3 or on the HD 7. The wavelet coefficients obtained as a result of the DWT of level 3 are divided into code blocks each having, for instance, a matrix of 32×32 pixels. Then, in step S5, the obtained wavelet coefficients are subjected to scalar quantization defined by JPEG2000, and the quantized data is recorded in the RAM 3 or on the HD 7. In step S6, the quantized data is subjected to entropy coding (so-called coefficient modeling) defined by JPEG2000, and the coded data is recorded in the RAM 3 or on the HD 7. Steps S3 through S6 are well-known operations based on JPEG2000

Next, in step S7, a data reduction operation is performed. The data reduction operation is characteristic of the image processing apparatus 10. As described in detail below, the data reduction operation includes a speed determination operation for determining whether the movement speed of an object is EIGE or LOW based on the wavelet coefficients of the 1LH sub-band recorded in the RAM 3 or on the HD 7. If the movement speed is determined to be HIGH (the object is moving at high speed), the data reduction operation performs data reduction putting emphasis on the LH component on the coded (entropy-coded) data recorded in the. RAM 3 or on the HD 7. On the other hand, if the movement speed is determined to be LOW (the object is moving at low speed), the data reduction operation performs data reduction putting emphasis on the HL component on the coded (entropy-coded) data.

After the data reduction operation in step S7, in step S8, the data obtained after the data reduction operation is subjected to arithmetic coding defined by JPEG2000. Next, in step S9, the resulting coded data is recorded on the HD 7. Then, in step S10, a determination is made as to whether all the frames have been processed. If all the frames have not been processed (that is, "NO" in step S10), the operation returns to step S1 so that the next image captured by the video camera 8 is subjected to the above-described coding. On the other hand, if the image capturing by the video camera 8 is completed, and all the frames have been processed (all the image data has been coded) (that is, "YES" in step S10), the operation ends.

As described above, all of the operations other than those of steps S1, S2, and S7 (that is, the operations of steps S3 through S6 and S8) are performed following the procedures complying with the JPEG2000 standard. These operations, together with the operations of steps S9 and S10, may be realized by a hardware circuit. As a result, the operation speed can be increased. There is an image processing apparatus that realizes all of the coding operations based on JPEG2000 by a hardware circuit.

Further, the interlace conversion of step S2 or the data reduction operation of step S7 may be realized by a hardware circuit. For instance, the interlace conversion may be realized as a hardware circuit by preparing: a first register for storing the image data of a first interlaced image obtained by initial scanning; a second register for storing the image data of a second interlaced image obtained successively by the next scanning; a first relay switch that outputs data alternately from the first and second registers line by line to an image memory or a buffer memory for a non-interlaced image when the data writing to the second register is completed; third and fourth registers for storing interlaced images obtained successively by scanning while the data is output from the first and second registers; and a second relay switch that outputs data alternately from the third and fourth registers line by line to the image memory or the buffer memory for a non-interlaced image when the data writing to the fourth register is completed. As a result, the operation speed can be increased.

Figure 5:
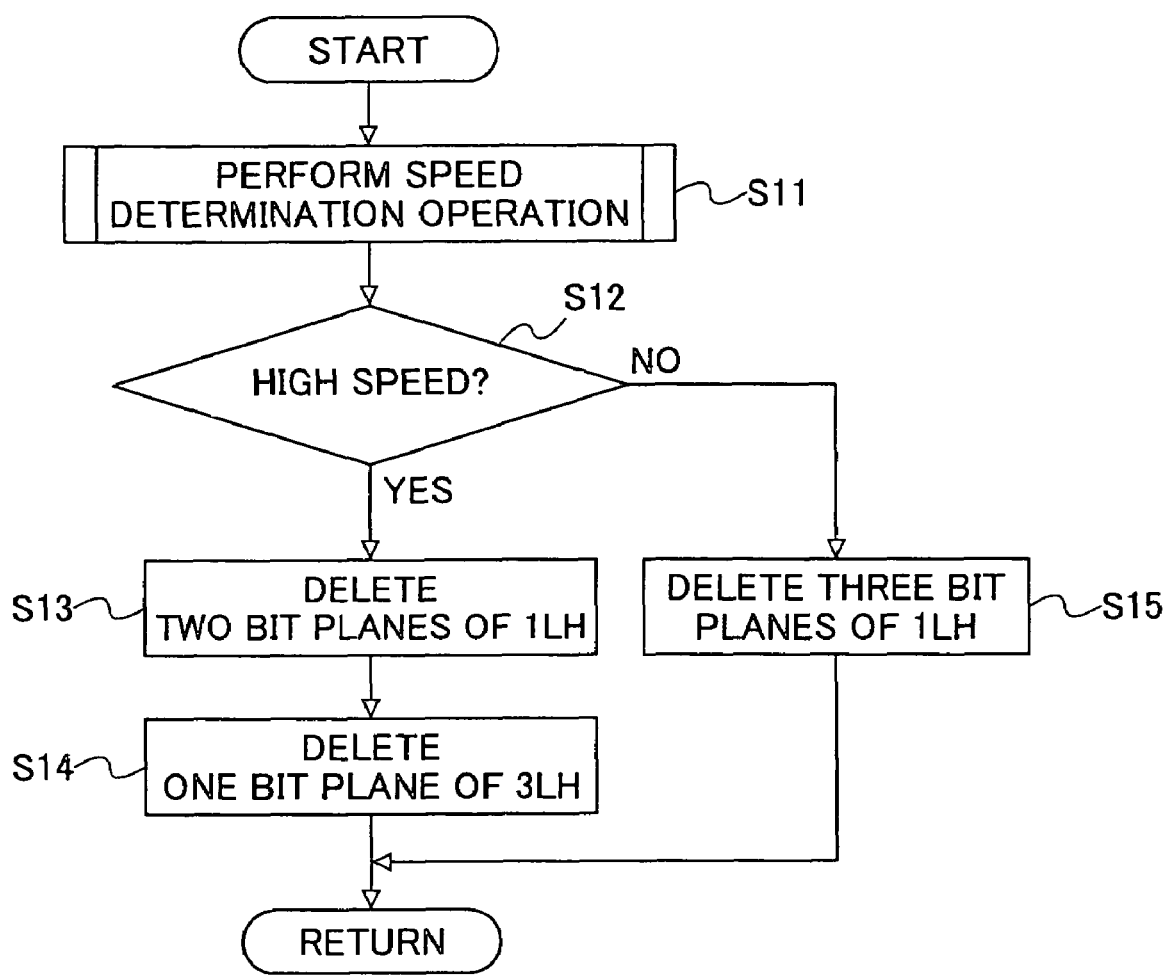
FIG. 5 is a flowchart of one embodiment of a data reduction operation.

FIG. 5 is a flowchart of the data reduction operation of step S7 of FIG. 4. First, in step S11 of FIG. 5, a determination is made as to whether the in-frame object movement speed is HIGH or LOW based on the values of the 1LH sub-band coefficients of the wavelet coefficients obtained by the two-dimensional DWT of level 3 of step S4 of FIG. 4. The contents of the speed determination operation are described, in detail below.

If, as a result of the speed determination operation of step S11, the movement speed is determined to be HIGH (that is, "YES" in step S12), the following data reduction putting emphasis on the LH component is performed. This allows further data reduction while maintaining good reproducibility. Specifically, in step S13, data for the lowest-order or least-significant two bits including the LSB (least significant bit) in the case of decomposing the 1LH sub-band data of the entropy-coded data obtained by step S6 of FIG. 4 into bit planes is deleted from the 1LH sub-band data. Further, in step S14, data for the LSB in the case of decomposing the 3LH sub-band data of the entropy-coded data into bit planes is deleted from the 3LH sub-band data.

On the other hand, if, as a result of step S11, the movement speed is determined to be LOW (that is, "NO" in step S12), the following data reduction putting emphasis on the HL component is performed. This allows further data reduction while maintaining good reproducibility. Specifically, in step S15, data for the lowest-order or least-significant three bits including the LSB in the case of decomposing the 1LH sub-band data of the entropy-coded data into bit planes is deleted from the 1LH sub-band data. In the case of low movement speed (LOW), no data is deleted from the 3LH sub-band data of the entropy-coded data obtained by step S6 of FIG. 4. After the above-described operations, the operation returns to the main routine of FIG. 4.

Figure 6:
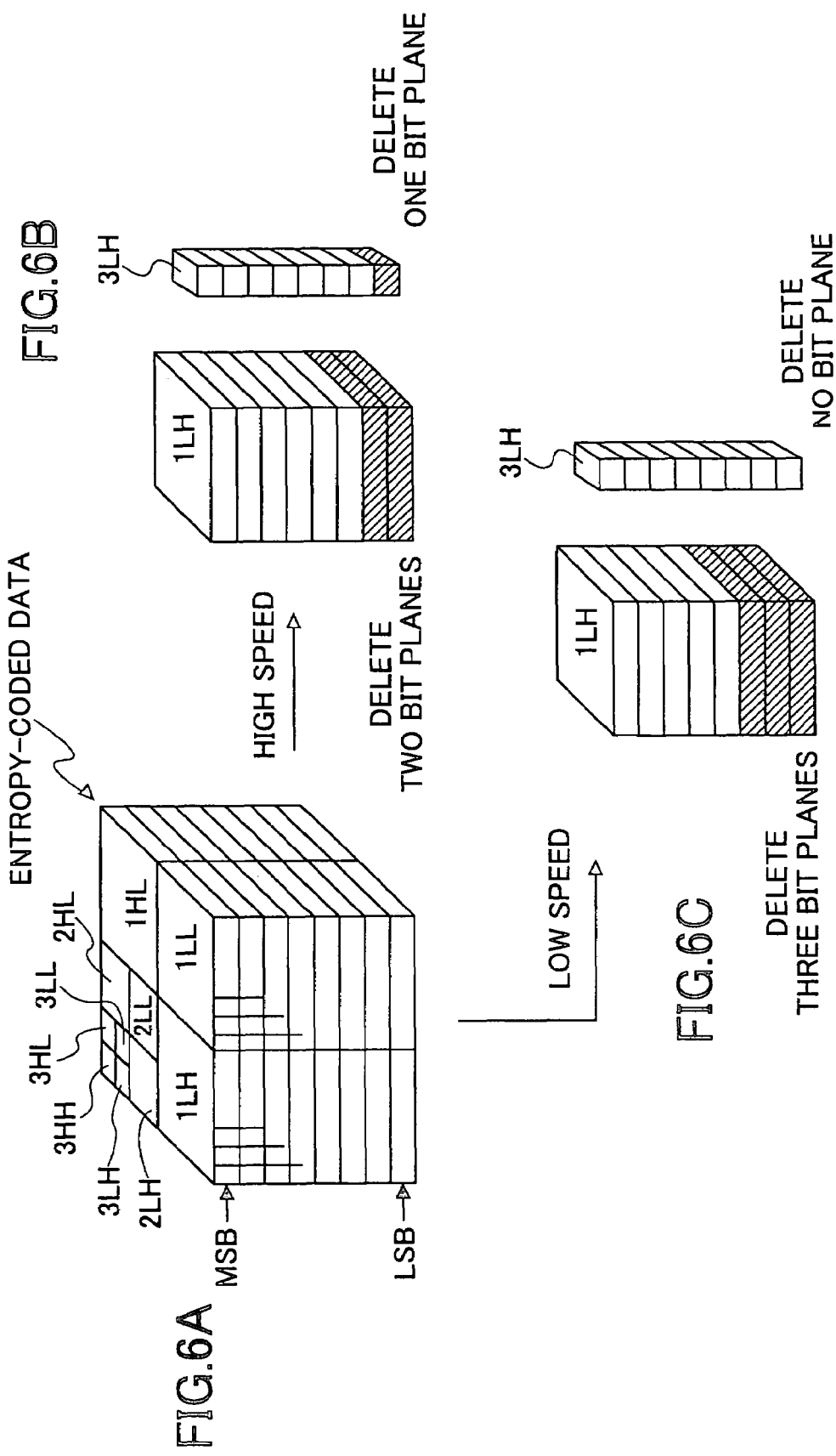
FIGS. 6A through 6C are diagrams illustrating one embodiment of a data reduction operation is performed in accordance with the in-frame object movement speed.

FIG. 6A is a diagram showing the entropy-coded data decomposed into bit planes. FIG. 6B is a diagram illustrating the contents of the operations of steps S13 and S14 of FIG. 5 performed when, in step S11, the movement speed is determined to be HIGH. As shown hashed in FIG. 6B, data for the lowest-order or least-significant two bits including the LSB is deleted from the coefficients of the 1LH sub-band decomposed into bit planes. That is, the two bit planes corresponding to the LSB and the next bit of the 1LH sub-band are deleted. Further, the data of the LSB of the coefficients of the 3LH sub-band is deleted.

FIG. 6C is a diagram illustrating the contents of the operation of step S15 of FIG. 5 performed when, in step S11, the movement speed is determined to be LOW. As shown hatched in FIG. 6C, data for the lowest-order or least-significant three bits including the LSB is deleted from the coefficients of the 1LH sub-band decomposed into bit planes. That is, the three bit planes corresponding to the LSB and the next two bits of the 1LH sub-band are deleted. In this case, no data is deleted from the coefficients of the 3LH sub-band.

Figure 7:
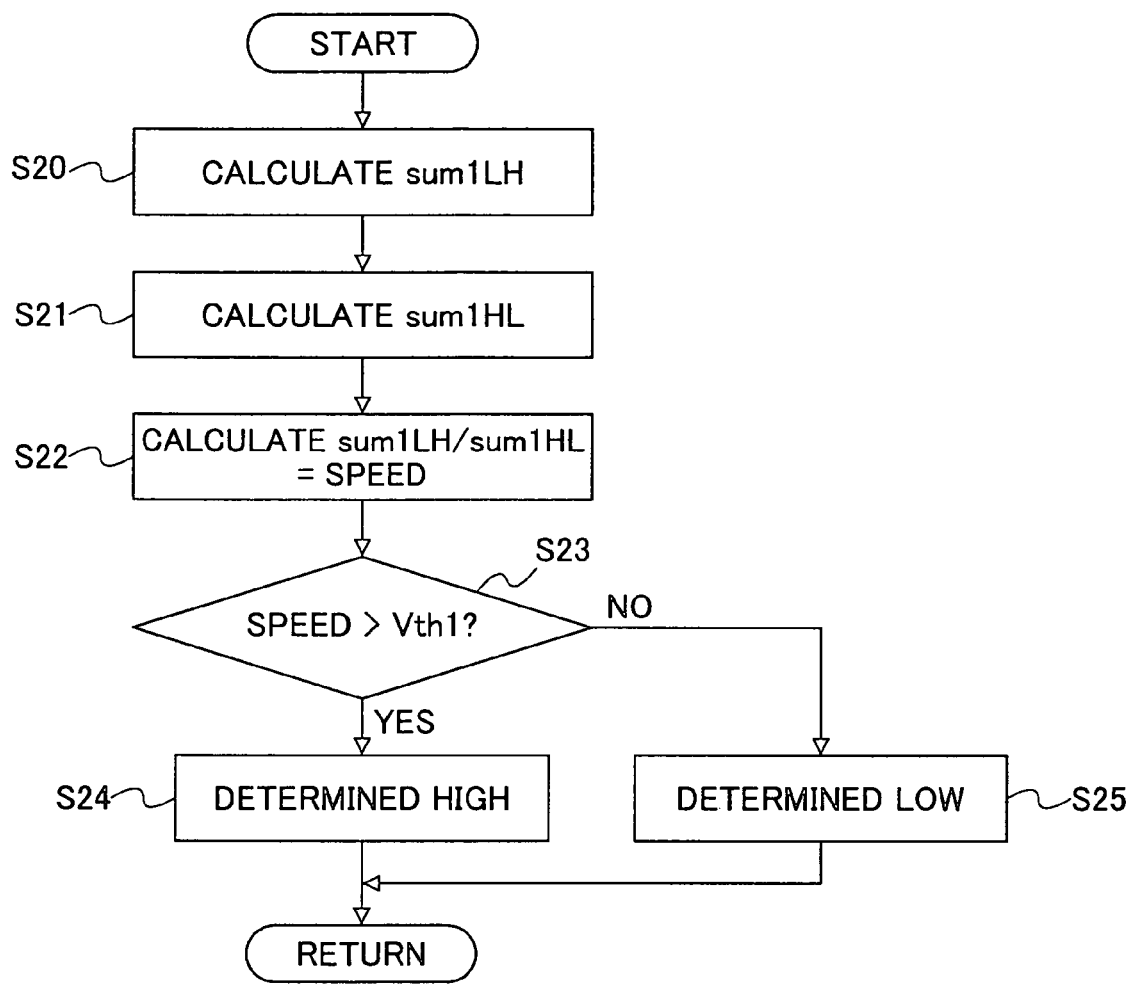
FIG. 7 is a flowchart of one embodiment of a speed determination operation.

FIG. 7 is a flowchart of the specific contents of the speed determination operation of step S11 of FIG. 5. First, in step S20 of FIG. 7, the sum of the absolute values of the 1LH coefficients is obtained from the wavelet coefficients obtained as a result of the two-dimensional DWT of level 3 of step S4 of the main routine of FIG. 4. This sum is referred to as Sum 1LH. Next, in step S21, the sum of the absolute values of the 1HL coefficients is obtained. This sum is referred to as sum 1HL. Then, in step S22, the value of sum 1LH/sum 1HL is obtained as a numerical value SPEED representing the in-frame object movement speed. It may be considered that the value SPEED varies substantially in proportion to the in-frame object movement speed. The reason for this is as follows. As previously described, the values of the 1LH coefficients increase in proportion to an increase in the horizontal edge amount of an image, that is, an increase in the in-frame object movement speed. On the other hand, the values of the 1HL coefficients, which are in proportion to the vertical edge amount of an image, are relatively stable since it is empirically known that an object makes only horizontal movements in most cases.

Next, in step S23, a determination is made as to whether the coefficient SPEED obtained in step S22 is greater than an experimentally determined threshold Vth1. If SPEED is greater than Vth1 (that is, "YES" in step S23), in step S24, the in-frame object movement speed is determined to be HIGH. On the other hand, if SPEED is less than or equal to Vth1 (that is, "NO" in step S23), in step 525, the in-frame object movement speed is determined to be LOW. After the above-described determination, the operation returns to the flowchart of FIG. 5.

As previously described, among the wavelet coefficients obtained by performing two-dimensional DWT of level 3 on image data to be encoded, particularly, the coefficient values of the 1LH sub-band increase, together with the amount of codes thereof, in proportion to the horizontal movement speed of an object within the captured fields or frame, while the coefficient values and the amount of codes of the 1HL sub-band show substantially constant values. The image processing apparatus 10, based on these characteristics, detects the horizontal movement speed of the object within the fields, and performs coding more effectively based on the detected value. As a result, the object movement speed can be detected by a simple operation using a small amount of data without the inter-field difference in the image data of the object, and the operation of compression and coding can be adaptively performed.

First Variation

A description is given of a first variation of the speed determination operation of step S11 of FIG. 5.

In the above-described case, referring to FIG. 7, the image processing apparatus 10 determines the in-frame object movement speed based on the coefficient values of the 1LH and 1HL sub-bands. Of the wavelet coefficient values, the 1LH coefficient values include information on the edge in the comb-shaped offset part of a non-interlaced image, while the 2LH coefficient values, which are obtained based on the unit of lines corresponding to two pixels (two pixel lines) with respect to the comb-shaped offset, are relatively stable irrespective of the object movement speed. Accordingly, as a variation of the speed determination operation, the object movement speed may be determined using the coefficient values of the 2LH sub-band instead of those of the 1HL sub-band.

Figure 8:
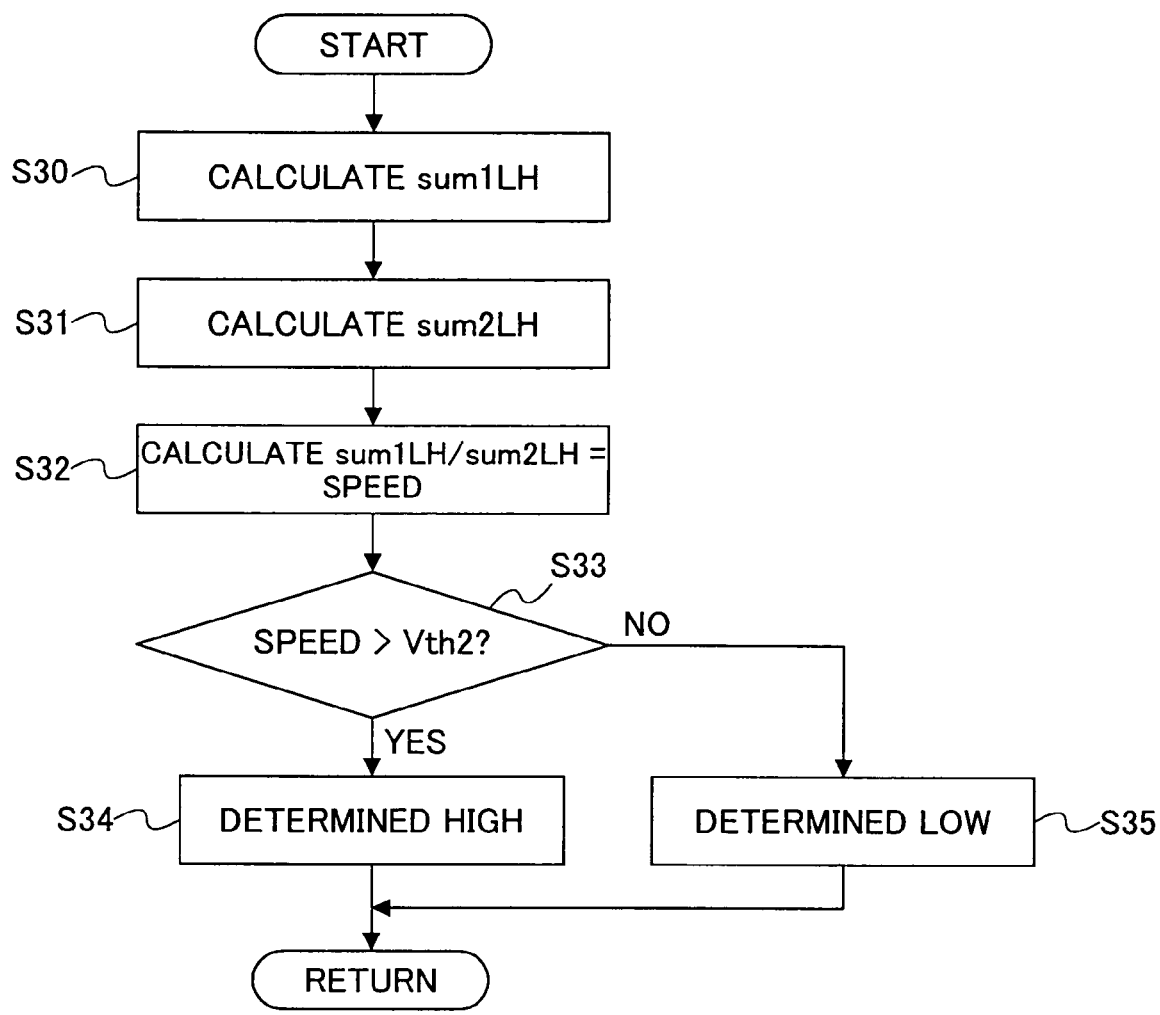
FIG. 8 is a flowchart of a first variation of the speed determination operation.

FIG. 8 is a flowchart of the first variation of the speed determination operation of step S11 of FIG. 5. First, in step S30 of FIG. 8, the sum of the absolute values of the 1LH coefficients is obtained from the wavelet coefficients obtained as a result of the two-dimensional DWT of level 3 of step S4 of the main routine of FIG. 4. This sum is referred to as sum 1LH. Next, in step 831, the sum of the absolute values of the 2LH coefficients is obtained. This sum is referred to as sum2LH. Then, in step S32, the value of sum1LH/sum2LH is obtained as a numerical value SPEED representing the in-frame object movement speed. Next, in step S33, a determination is made as to whether the coefficient SPEED obtained in step S32 is greater than an experimentally determine led threshold Vth2. If SPEED is greater than Vth2 (that is, "YES" in step S33), in step S34, the in-frame object movement speed is determined to be HIGH. On the other hand, if SPEED is less than or equal to Vth2 (that is, "NO" in step S33), in step S35, the in-frame object movement speed is determined to be LOW. After the above-described determination, the operation returns to the flowchart of FIG. 5.

Second Variation

A description is given of a second variation of the speed determination operation of step S11 of FIG. 5. Among the wavelet coefficients, the coefficients of the first decomposition level (1LH, 1HL, and 1LL) reflect information on the comb-shaped offset part of a non-interlaced image formed by combining interlaced images. On the other hand, the coefficients of the second decomposition level (2LH, 2HL, and 2LL), which are obtained based on the unit of two pixel lines with respect to the comb-shaped offset, may be considered to be relatively stable irrespective of the object movement speed. In the second variation of the speed determination operation, the in-frame object movement speed is determined using one of determination formulas obtained based on the above-described consideration, which one was experimentally capable of determining with the most accuracy that an object is moving at high speed within a frame without erroneously determining, when an object including a large number of horizontally extending edges is stationary or moving at low speed, that the object is moving at high speed.

Figure 9:
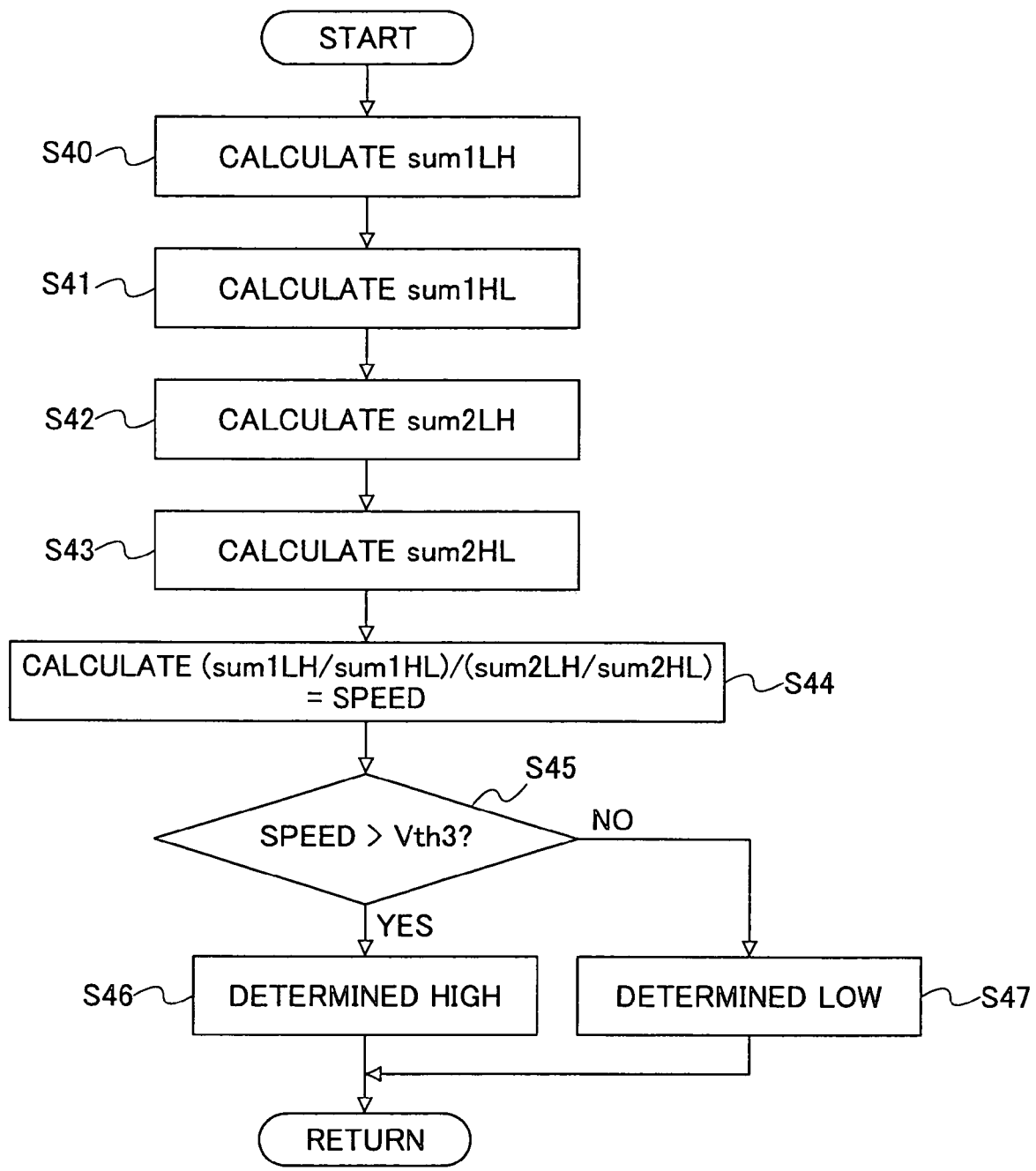
FIG. 9 is a flowchart of a second variation of the speed determination operation.

FIG. 9 is a flowchart of the second variation of the speed determination operation of step S11 of FIG. 5. First, in step 840 of FIG. 9, the sum of the absolute values of the 1LH coefficients is obtained from the wavelet coefficients obtained as a result of the two-dimensional DWT of level 3 of step S4 of the main routine of FIG. 4. This sum is referred to as sum1LH. Next, in step S41, the sum of the absolute values of the 1HL coefficients is obtained. This sum is referred to as sum 1HL. Next, in step S42, the sum of the absolute values of the 2LH coefficients is obtained. This sum is referred to as sum2LH. Next, in step S43, the sum of the absolute values of the 2HL coefficients is obtained. This sum is referred to as sum2HL. Then, in step S44, the value of (sum 1LH/sum1HL)/(sum2LH/sum2HL) is obtained as a numerical value SPEED representing the in-frame object movement speed. Next, in step S45, a determination is made as to whether the coefficient SPEED obtained in step S44 is greater than an experimentally determined threshold Vth3. If SPEED is greater than Vth3 (that is, "YES" in step S45), in step S46, the in-frame object movement speed is determined to be HIGH. On the other hand, if SPEED is less than or equal to Vth3 (that is, "NO" in step S45), in step S47, the in-frame object movement speed is determined to be LOW. After the above-described determination, the operation returns to the flowchart of FIG. 5.

Other Variations

As previously described, the in-frame object movement speed is in proportion to the 1LH wavelet coefficient values. Naturally, the in-frame object movement speed is also in proportion to the amount of coded data of the 1LH sub-band obtained by encoding the 1LH wavelet coefficient values using a (5, 3) lossless filter. A description is given briefly of each of the three cases where the speed determination operations of FIGS. 7 through 9 are performed based on the amount of codes obtained by temporary arithmetic coding.

Figure 10:
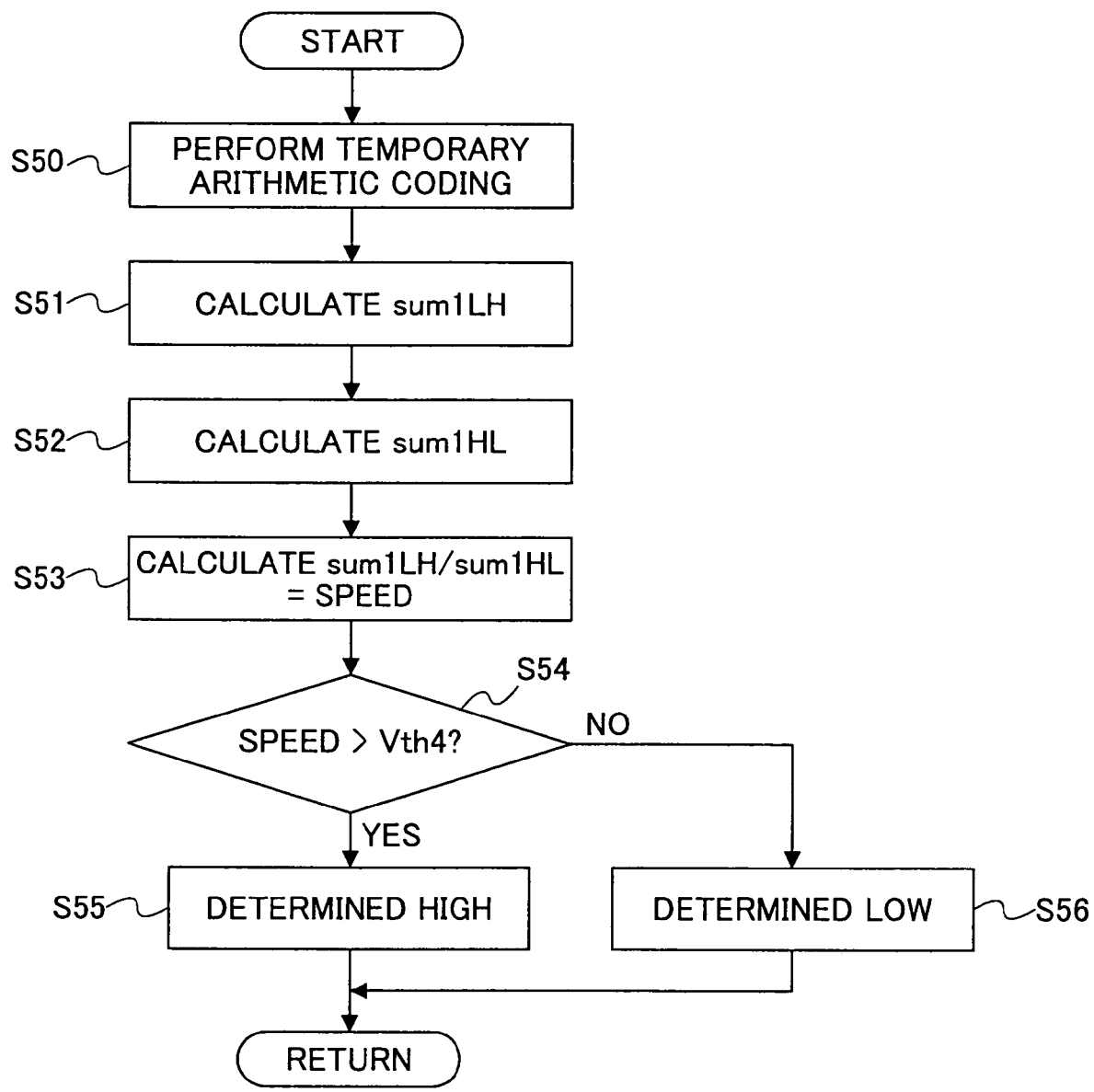
FIG. 10 is a flowchart of another variation of the speed determination operation.

FIG. 10 is a flowchart showing an operation procedure in the case of performing the speed determination operation of FIG. 7 based on the amount of codes obtained by temporary arithmetic coding. First, in step S50 of FIG. 10, temporary arithmetic coding is performed on the entropy-coded data obtained by step S6 of the main routine of FIG. 4. Next, in step S51, the total amount of coded data of the 1LH coefficients is obtained among the coded data obtained after step S50. This amount is referred to as sum1LH. Next, in step S52, the total amount of coded data of the 1HL coefficients is obtained. This amount is referred to as sum1HL. Then, in step S53, the value of sum 1LH/sum1HL is obtained as a numerical value SPEED representing the in-frame object movement speed. Next, in step S54, a determination is made as to whether the coefficient SPEED obtained in step S53 is greater than an experimentally determined threshold Vth4. If SFEED is greater than Vth4 (that is, "YES" in step S54), in step S55, the in-frame object movement speed is determined to be HIGH. On the other hand, if SPEED is less than or equal to Vth4 (that is, "NO" in step S54), in step S56, the in-frame object movement speed is determined to be LOW. After the above-described determination, the operation returns to the flowchart of FIG. 5.

Figure 11:
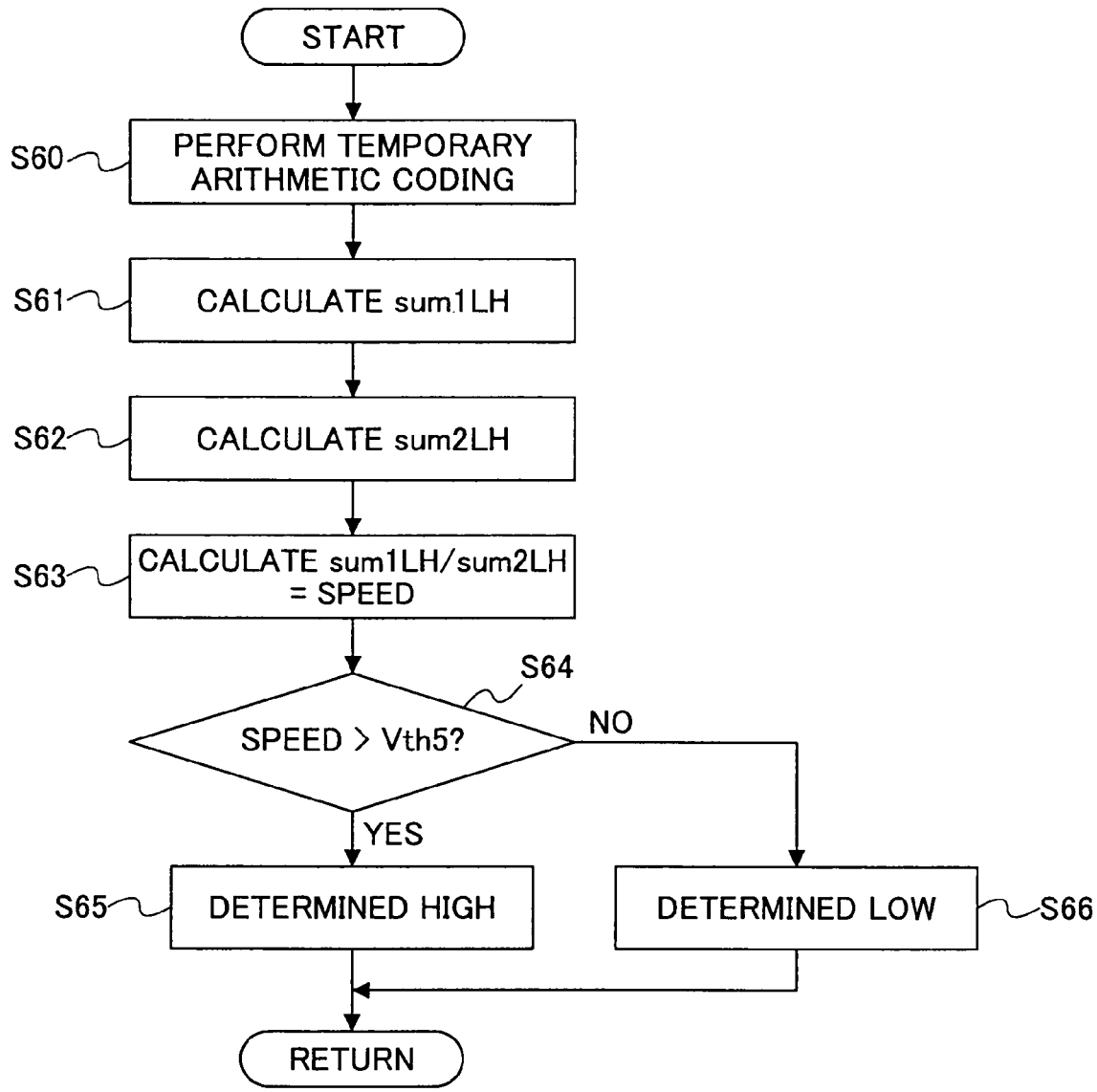
FIG. 11 is a flowchart of yet another variation of the speed determination operation.

FIG. 11 is a flowchart showing an operation procedure in the case of performing the speed determination operation of FIG. 8 based on the amount of codes obtained by temporary arithmetic coding. First, in step S60 of FIG. 11, temporary arithmetic coding is performed on the entropy-coded data obtained by step S6 of the main routine of FIG. 4. Next, in step S61, among the coded data obtained after step S60, the total amount of those of the 1LH coefficients is obtained. This amount is referred to as sum 1LH. Next, in step S62, the total amount of coded data of the 2LH coefficients is obtained. This amount is referred to as sum2LH. Then, in step S63, the value of sum1LH/sum2LH is obtained as a numerical value SPEED representing the in-frame object movement speed. Next, in step S64, a determination is made as to whether the coefficient SPEED obtained in step S63 is greater than an experimentally determined threshold Vth5. If SPEED is greater than Vth5 (that is, "YES" in step S64), in step S65, a determination is made as to whether the in-frame object movement speed is HIGH. On the other hand, if SPEED is less than or equal to Vth5 (that is, "NO" in step S64), in step S66, a determination is made as to whether the in-frame object movement speed is LOW. After the above-described determination, the operation returns to the flowchart of FIG. 5.

Figure 12:
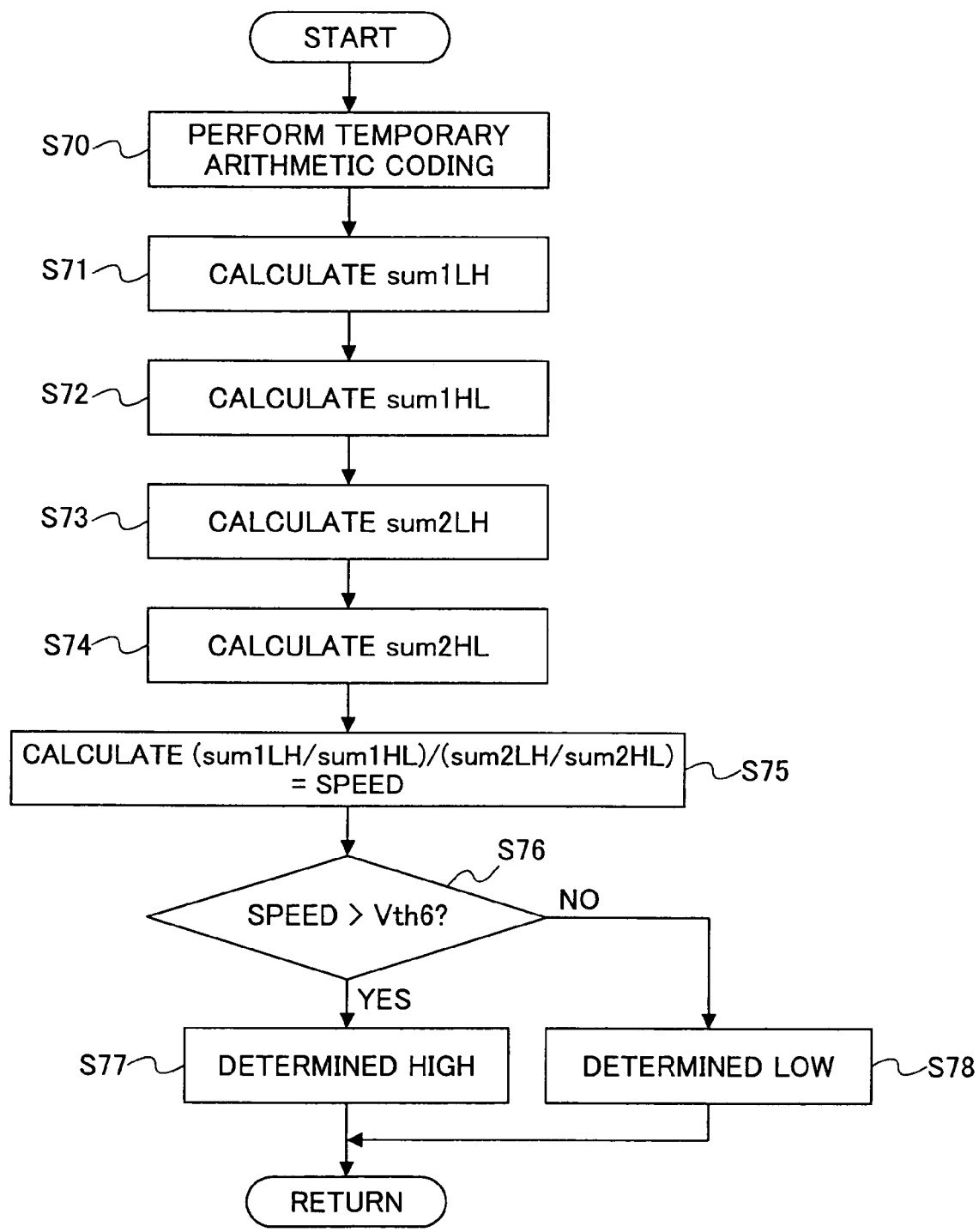
FIG. 12 is a flowchart of still another variation of the speed determination operation.

FIG. 12 is a flowchart showing an operation procedure in the case of performing the speed determination operation of FIG. 9 based on the amount of codes obtained by temporary arithmetic coding. First, in step S70 of FIG. 12, temporary arithmetic coding is performed on the entropy-coded data obtained by step S6 of the main routine of FIG. 4. Next, in step S71, the total amount of coded data of the 1LH coefficients is obtained among the coded data obtained after step S70. This amount is referred to as sum1LH. Next, in step S72, the total amount of coded data of the 1HL coefficients is obtained. This amount is referred to as sum 1HL. Next, in step S73, the total amount of coded data of the 2LH coefficients is obtained. This amount is referred to as sum2LH. Next, in step S74 the total amount of coded data of the 2HL coefficients is obtained. This amount is referred to as sum2HL. Then, in step 575, the value of sum 1LH/sum1HL)/(sum2LH/sum2HL) is obtained as a numerical value SPEED representing the in-frame object movement speed. Next, in step S76, a determination is made as to whether the coefficient 8PEED obtained in step S75 is greater than an experimentally determined threshold Vth6. If SPEED is greater than Vth6 (that is, "YES" in step S76), in step S77, the in-frame object movement speed is determined to be HIGH. On the other hand, if SPEED is less than or equal to Vth6 (that is, "NO" in step S76), in step S78, the in-frame object movement speed is determined to be LOW. After the above-described determination, the operation returns to the flowchart of FIG. 5.

As previously described, the in-frame object movement speed can be determined easily using any of the variations shown in FIGS. 10 through 12.

SECOND EMBODIMENT

An image processing apparatus for processing an interlaced image according to a second embodiment of the present invention, which performs coding based on JPEG2000, processes the image data of a non-interlaced image obtained by combining the interlaced images of two fields successively captured by a video camera. Among the coefficient values obtained by performing a two-dimensional discrete wavelet transform (DWT) on the image data of the non-interlaced image, the coefficient values of the 1LH sub-band increase, together with the amount of codes thereof, in proportion to the horizontal movement speed of an object within the fields captured by the video camera, while the coefficient values and the amount of codes of the 1HL sub-band show substantially constant values. The image processing apparatus of this embodiment, based on these characteristics, determines the horizontal movement speed of the object within the fields (to be HIGH or LOW) using a code block as a unit of determination, and determines the movement speed of the object within the fields or frame (in-frame object movement speed) based on the determination results. The code block has a matrix of pixels smaller than a sub-band, such as a matrix of 32×32 pixels. Compared with the case of determining the in-frame object movement speed based on the unit of a sub-band, the case where only a relatively small object moves at high speed in a still image (landscape) can be recognized with accuracy by making an overall determination based on the results of code block-by-code block determination.

In the following description, the same elements as those of the first embodiment are referred to by the same numerals, and a description thereof is omitted.

The image processing apparatus of this embodiment has the same configuration as the image processing apparatus 10 of the first embodiment (FIG. 1). As described below, the image processing apparatus of this embodiment determines the in-frame object movement speed based on the determination unit of a code block using the above-described characteristic of the coefficient values of the 1LH sub-band.

The main routine of the image processing program executed by the CPU 1 of the image processing apparatus of this embodiment is basically equal to that of the first embodiment shown in FIG. 4. According to this embodiment, in the data reduction operation of step S7, the speed determination operation is performed based on information on each code block.

The data reduction operation according to the second embodiment is equal to that of the first embodiment shown in FIG. 5 except for the speed determination operation. That is, according to this embodiment, in step S11 of FIG. 5, a determination is made as to whether the in-frame object movement speed is HIGH or LOW based on the coefficient values of each code block of the 1LH sub-band of the wavelet coefficients obtained by the two-dimensional DWT of level 3 of step S4 of FIG. 4. The contents of the speed determination operation according to the second embodiment are described in detail below.

Figure 13:
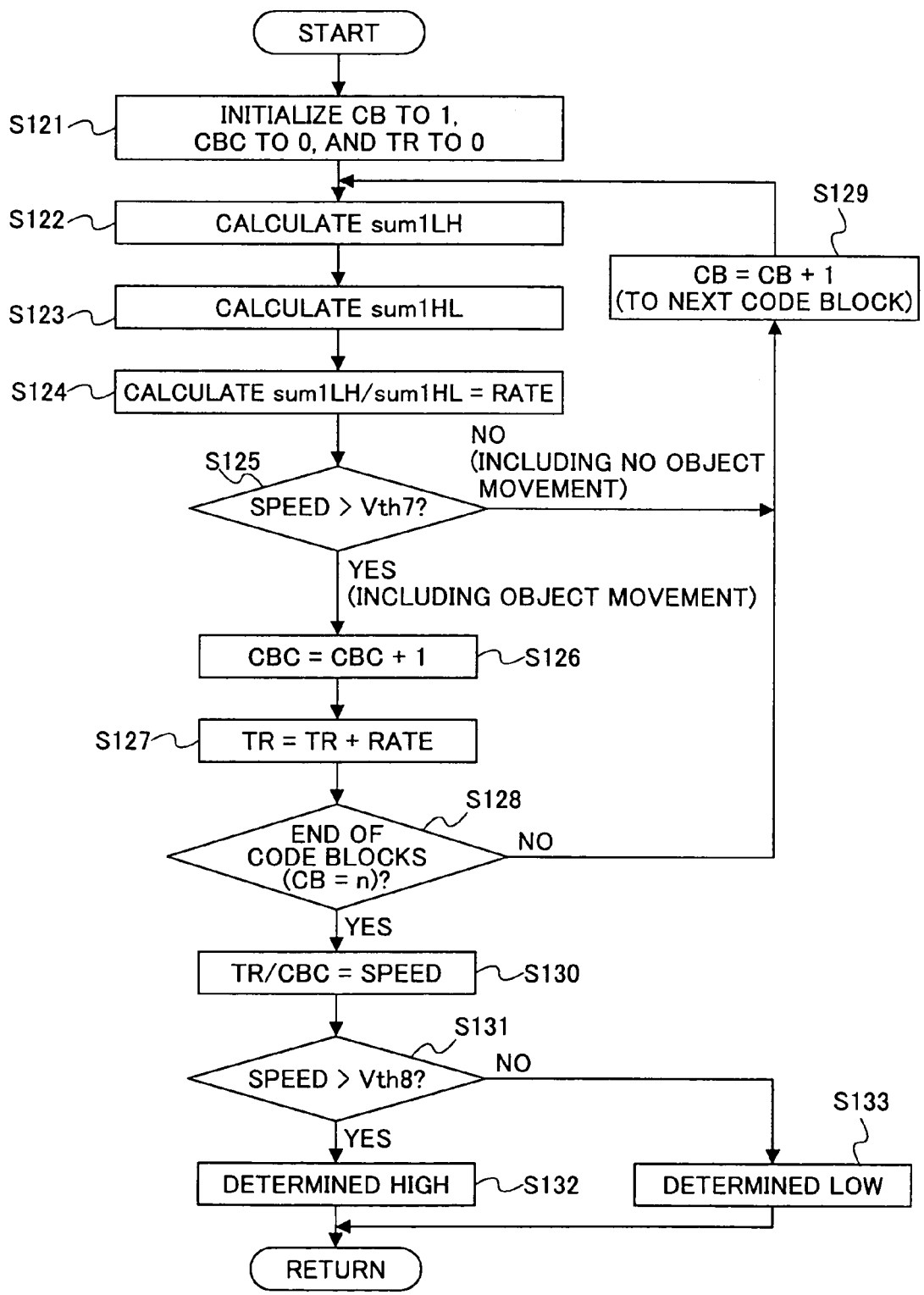
FIG. 13 is a flowchart of another embodiment of the speed determination operation.
Figure 14:
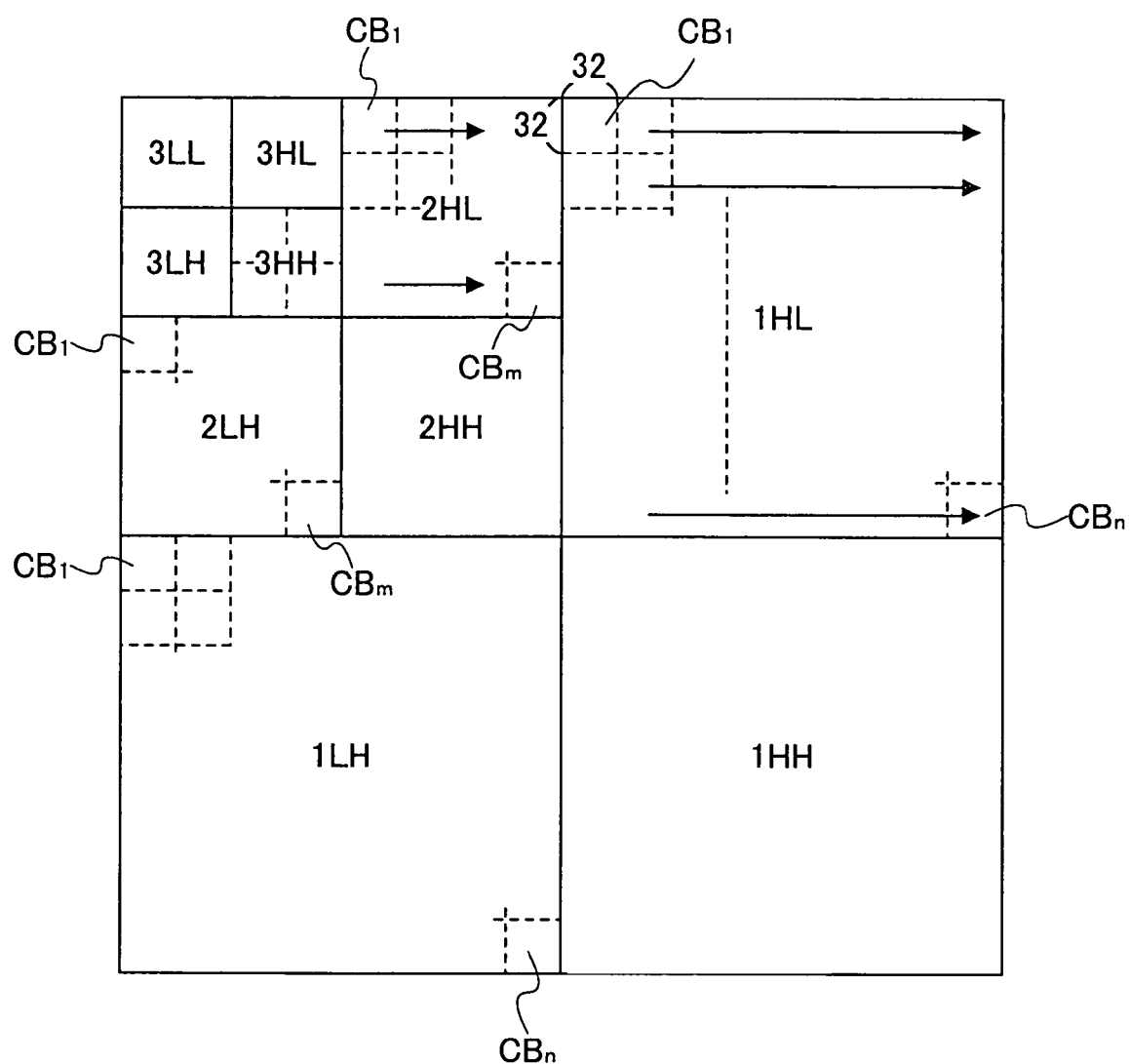
FIG. 14 is a diagram for illustrating one embodiment of a process for dividing of wavelet coefficients into code blocks.

FIG. 13 is a flowchart of another embodiment of the speed determination operation of step S11 of FIG. 5. The wavelet coefficients obtained by the two-dimensional DWT of level 3 are divided into code blocks each having, for instance, a matrix of 32×32 pixels. FIG. 14 is a diagram showing the code blocks generated in each of the sub-bands (1LH, 1HL, 1HH, 2LH, 2HL, 2HH, 3LL, 3LH, 3LH, and 3HH) by the above-described dividing. Each of the 1LH and 1HL sub-bands is divided into n code blocks. Each of the 2LH and 2HL sub-bands is divided into m code blocks. In the following description, each code block in the sub-bands is specified by the value of a variable CB. For easier understanding, the code block of CB=1 of the 1LH sub-band is indicated as CB, in FIG. 14. As indicated by a plurality of arrows in the 1HL sub-band, for instance, the value of the variable CB increments by one in accordance with so-called raster scan order in each sub-band.

Referring back to the flowchart of FIG. 13, in step S121, the value of the variable CB representing a code block is initialized to 1, a significant code block count value CBC representing the number of code blocks determined to include an object movement (the number of significant code blocks) is initialized to 0, and the total (cumulative) value of the below-described variable RATE calculated for each significant code block (referred to as a total RATE value TR) is initialized to 0. Next, in step S122, the sum of the absolute values of the coefficients of the code block CB in the 1LH sub-band is calculated. This Sum is referred to as sum1LH. Next, in step S123, the sum of the absolute values of the coefficients of the code block CB in the 1HL sub-band is calculated. This sum is referred to as sum1HL . Then, in step S124, the value of sum1LH/sum1HL=RATE is calculated using the coefficients sum1LH and sum1HL obtained in steps S122 and S123. It may be considered that the variable RATE varies substantially in proportion to the in-frame object movement speed. As previously described, the values of the 1LH coefficients increase in proportion to an increase in the horizontal edge amount of an image, that is, an increase in the in-frame object movement speed. On the other hand, the values of the 1HL coefficients, which are in proportion to the vertical edge amount of an image, are relatively stable since it is empirically known that an object makes only horizontal movements in most cases.

Next, in step S125, a determination is made as to whether the variable RATE obtained in step S124 is greater than an experimentally determined threshold Vth7 for determining that the code block CB includes an object movement, that is, the object has made a movement in the code block CB, if RATE is greater than Vth7. If RATE is greater than Vth7 (that is, "YES" in step S125), in step S126, the significant code block count value CBC is incremented by one, and in step S127, the value of RATE is added to the total RATE value TR.

If the value of RATE is less than or equal to Vth7 (that is, "NO" in step S125), or if the speed determination operation has not performed the above-described operation of steps S122 through S127 on all the n code blocks (that is, "NO" in step S128), in steps, the variable CB is incremented by one, and the operation returns to step S122 in order to continue the determination of the variable RATE (movement speed determination) for each of the remaining code blocks.

If the above-described operation has been performed on all the n code blocks, that is, if the variable CB is n, in step S130 through S133, the speed determination operation is performed based on the number of significant code blocks that have been determined so far to include an object movement and On the total RATE value TR of the RATE values of the significant code blocks.

If the determination of RATE has been made for all the n code blocks (that is, "YES" in step S128), in step S130, a variable SPEED is obtained by dividing the total RATE value TR by the significant code block count value CBC (the number of significant code blocks). The variable SPEED is the average of the RATE values of the significant code blocks. In step S131, a determination is made as to whether the variable SPEED obtained in step S130 is greater than an experimentally determined threshold Vth8. If SPEED is greater than Vth8 (that is, "YES" in step S131), in step S132, the in-frame object movement speed is determined to be HIGH. If SPEED is less than or equal to Vth8, in step S133, the in-frame object movement speed is determined to be LOW.

According to the above-described configuration of the image processing apparatus 10 according to the second embodiment, in the case where only a relatively small object moves at high speed in a still image (landscape), it can be correctly determined that the movement speed of the object is HIGH by making an overall determination based on the results of code block-by-code block determination, compared with the case of determining the in-frame object movement speed based on the unit of a sub-band.

First Variation

A description is given below of a first variation of one embodiment of the speed determination operation. In the above-described speed determination operation based on code block-by-code block determination, a determination is made as to whether the object within the frame is moving based on the average of the values of the variable RATE representing the degree of movement of a code block determined to include an object movement. In the first variation of the speed determination operation, the object within the frame is determined to be moving at high speed (that is, the in-frame object movement speed is HIGH) if the majority of the code blocks including an object movement are moving at high speed.

Figure 15:
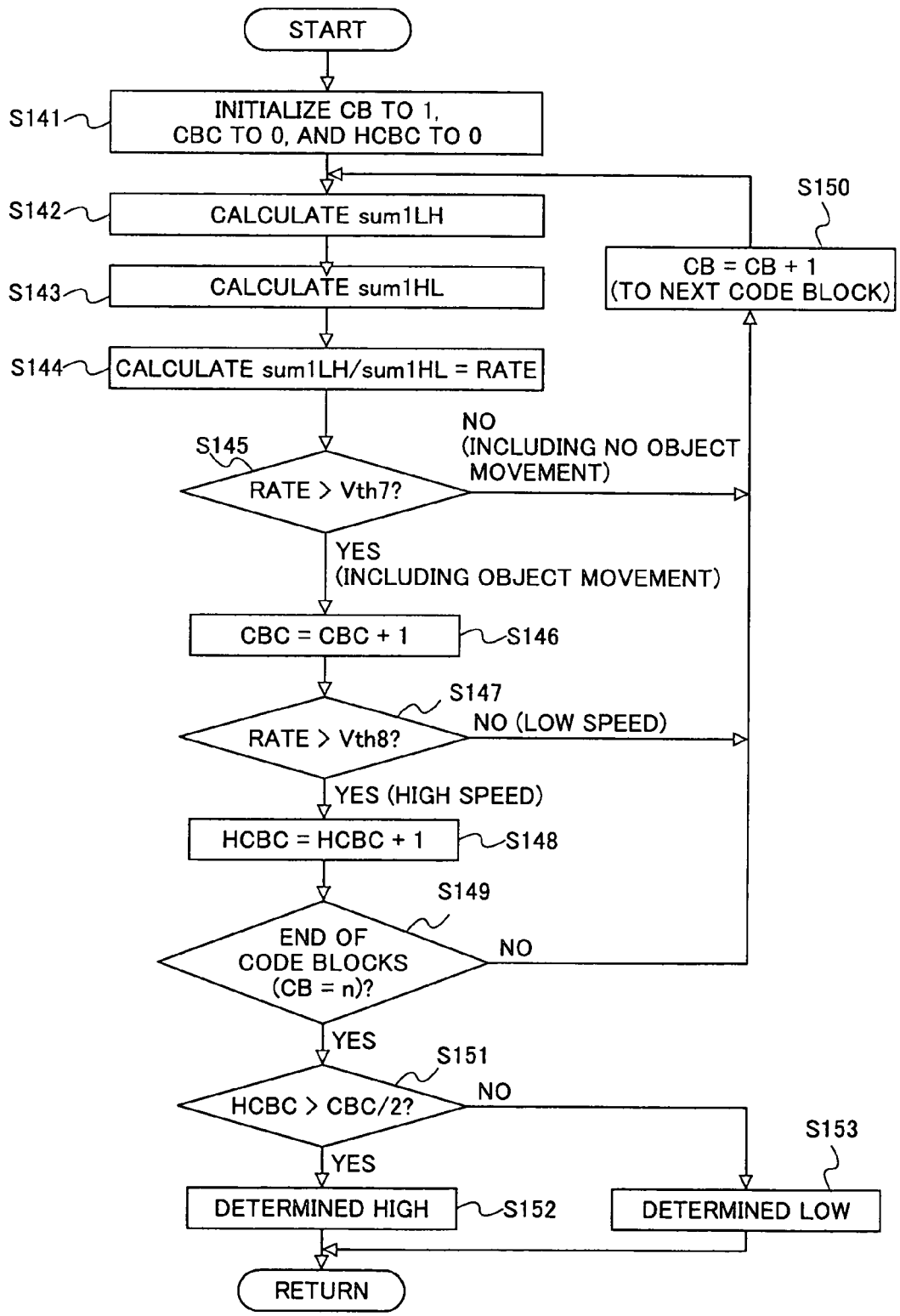
FIG. 15 is a flowchart of a variation of the speed determination operation.

FIG. 15 is a flowchart of the first variation of one embodiment of the speed determination operation. The wavelet coefficients obtained by the two-dimensional DWT of level 3 are divided into code blocks each having, for instance, a matrix of 32×32 pixels. In step S141 of FIG. 15, the value of the variable CB representing a code block is initialized to 1, the significant code block count value CBC representing the number of code blocks determined to include an object movement (the number of significant code blocks) is initialized to 0, and a HIGH significant code block count value HCBC is initialized to 0. HCBC represents, among the significant code blocks, the number of those in which the object is determined to be moving at high speed. Next, in step S142, the sum of the absolute values of the coefficients of the code block CB in the 1LH sub-band is calculated. This sum is referred to as sum1LH. Next, in step S143, the sum of the absolute values of the coefficients of the code block CB in the 1HL sub-band is calculated. This sum is referred to as sum1HL. Then, in step S144, the value of sum1LH/sum1HL=RATE is calculated using the coefficients sum1LH and sum1HL obtained in steps S142 and S143. Next, in step S145, a determination is made as to whether the variable RATE obtained in step S144 is greater than the experimentally determined threshold Vth7. If RATE is greater than Vth7. (that is, "YES" in step S145), in step S146, the code block CB is determined to include an object movement, and the significant code block count value CBC is incremented by one. Then, in step S147, a determination is made as to whether RATE is greater than the experimentally determined threshold Vth8. If RATE is greater than Vth8 (that is, "YES" in step S147), in step S148, the variable HCBC is incremented by one.

If RATE is less than or equal to Vth7 (that is, "NO" in step S145) or Vth8 (that is, "NO" in step S147), or if the above-described operation of steps S142 through S148 has not been performed on all the n code blocks (that is, "NO" in step S149), in step S150, the variable CB is incremented by one, and the operation returns to step S142 in order to continue the determination of the variable RATE (movement speed determination) for each of the remaining code blocks.

On the other hand, if the above-described operation has been performed on all then code blocks, that is, if the variable CB is n (that is, "YE5" in step S149), in step S151,a determination is made as to whether the HIGH significant code block count number HCBC is greater than the half of the significant code block count number CBC. If HCBC>CBC/2 (that is, "YES" in step S151), in step S152, the in-frame object movement speed is determined to be HIGH. If HCBC≦CBC/2 (that is, "NO" in step S151), in step S153, the in-frame object movement speed is determined to be LOW. Thereafter, the operation returns to the main routine of FIG. 4.

Other Variations

As previously described, the in-frame object movement speed is in proportion to the 1LH wavelet coefficient values. Naturally, the in-frame object movement speed is also in proportion to the amount of coded data of the 1LH sub-band obtained by encoding the 1LH wavelet coefficient values using a (5, 3) lossless filter. A description is given briefly of each of the cases where the speed determination operations of FIGS. 13 and 15 are performed based on the amount of codes obtained by temporary arithmetic coding.

Figure 16:
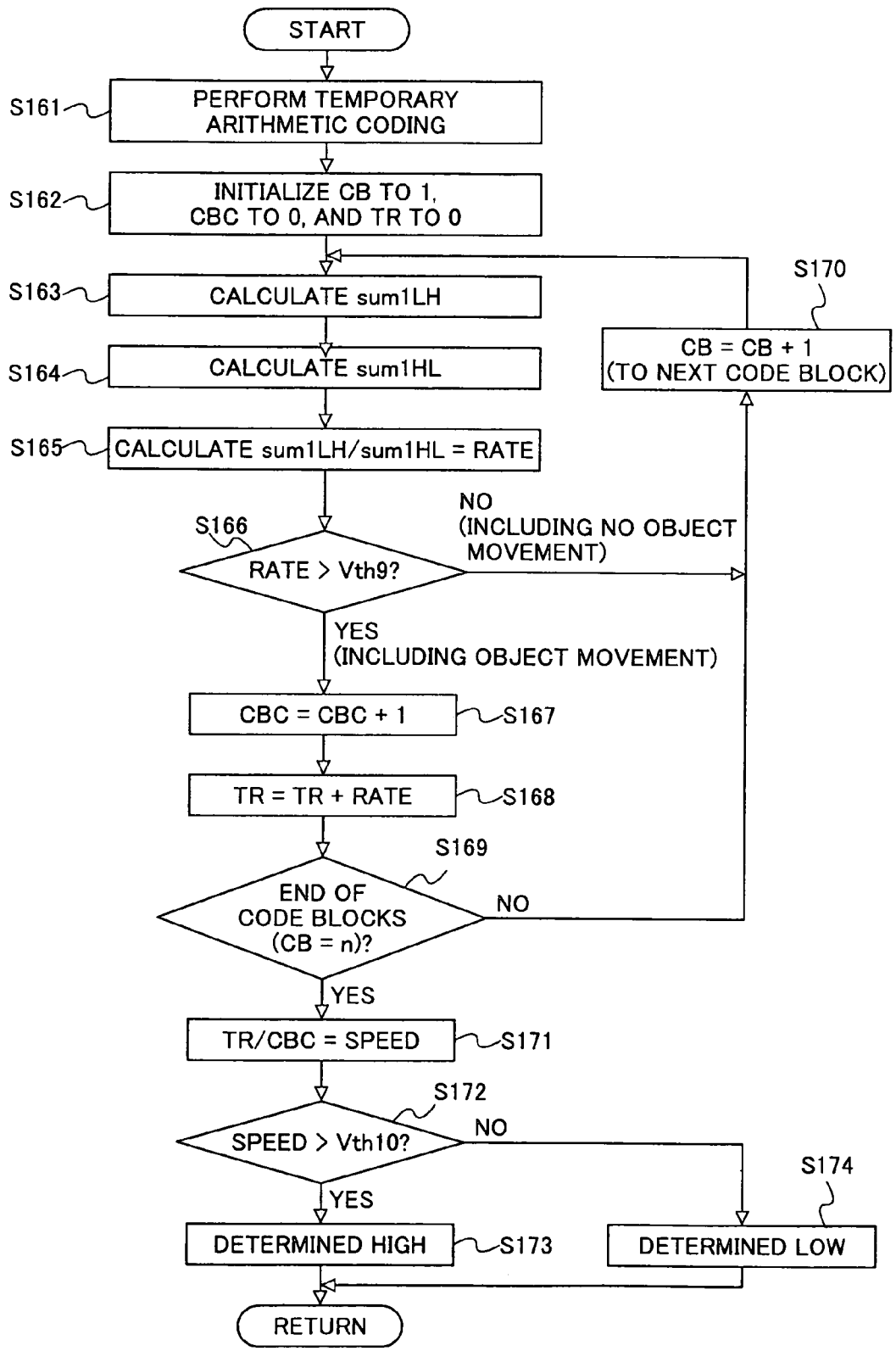
FIG. 16 is a flowchart of another variation of the speed determination operation.

FIG. 16 is a flowchart showing an operation procedure in the case of performing the speed determination operation of FIG. 13 based on the amount of codes obtained by temporary arithmetic coding. First, in step S161 of FIG. 16, temporary arithmetic coding is performed on the entropy-coded data obtained by step S6 of the main routine of FIG. 4. Then, in step S162, the value of the variable CB representing a code block is initialized to 1, the significant code block count value CBC representing the number of code blocks determined to include an object movement (the number of significant code blocks) is initialized to 0, and the total (cumulative) value of the variable RATE calculated for each significant code block (the total RATE value TR) is initialized to 0. Next, in step S163, the sum of the absolute values of the coefficients of the code block CB in the 1LH sub-band is calculated. This sum is referred to as sum1LH: Next, in step S164, the sum of the absolute values of the coefficients of the code block CB in the 1HL sub-band is calculated. This sum is referred to as sum1HL. Then, in step S165, the value of sum1LH/sum1HL=RATE is calculated using the coefficients sum 1LH and sum 1HL obtained in steps S163 and S164. Next, in step S166, a determination is made as to whether the variable RATE obtained in step S165 is greater than an experimentally determined threshold Vth9 for determining that the code block CB includes an object movement, that is, the object has made a movement in the code block CB, if RATE is greater than Vth9. If RATE is greater than Vth9 (that is, "YES" in step S166), in step S167, the significant code block count value CBC is incremented by one, and in step S168, the value of RATE is added to the total RATE value TR.

If the value of RATE is less than Or equal to Vth9 (that is, "NO" in step S166), or if the speed determination operation is determined to have not performed the above-described operation of steps S163 through S168 on all the n code blocks (that is, "NO" in step S169), in step S170, the variable CB is incremented by one, and the operation returns to step S163 in order to continue the determination of the variable RATE (movement speed determination) for each of the remaining code blocks.

If the above-described operation has been performed on all the n code blocks, that is, if the variable CB is n (that is, "YES" in step S169), in step S171 through S174, the speed determination operation is performed based on the number of significant code blocks that have been determined so far to include an object movement and on the total RATE value TR of the RATE values of the significant code blocks.

If the determination of RATE has been made for all the n code blocks (that is, "YES" in step S169), in step S171, a variable SPEED is obtained by dividing the total RATE value TR by the significant code block count value CBC (the number of significant code blocks). The variable SPEED is the average of the RATE values of the significant code blocks. In step S172, a determination is made as to whether the variable SPEED obtained in step S171 is greater than an experimentally determined threshold Vth10. If SPEED is greater than Vth10 (that is, "YES" in step S172), in step S173, the in-frame object movement speed is determined to be HIGH. If SPEED is less than or equal to Vth10, in step S174, the in-frame object movement speed is determined to be LOW.

Figure 17:
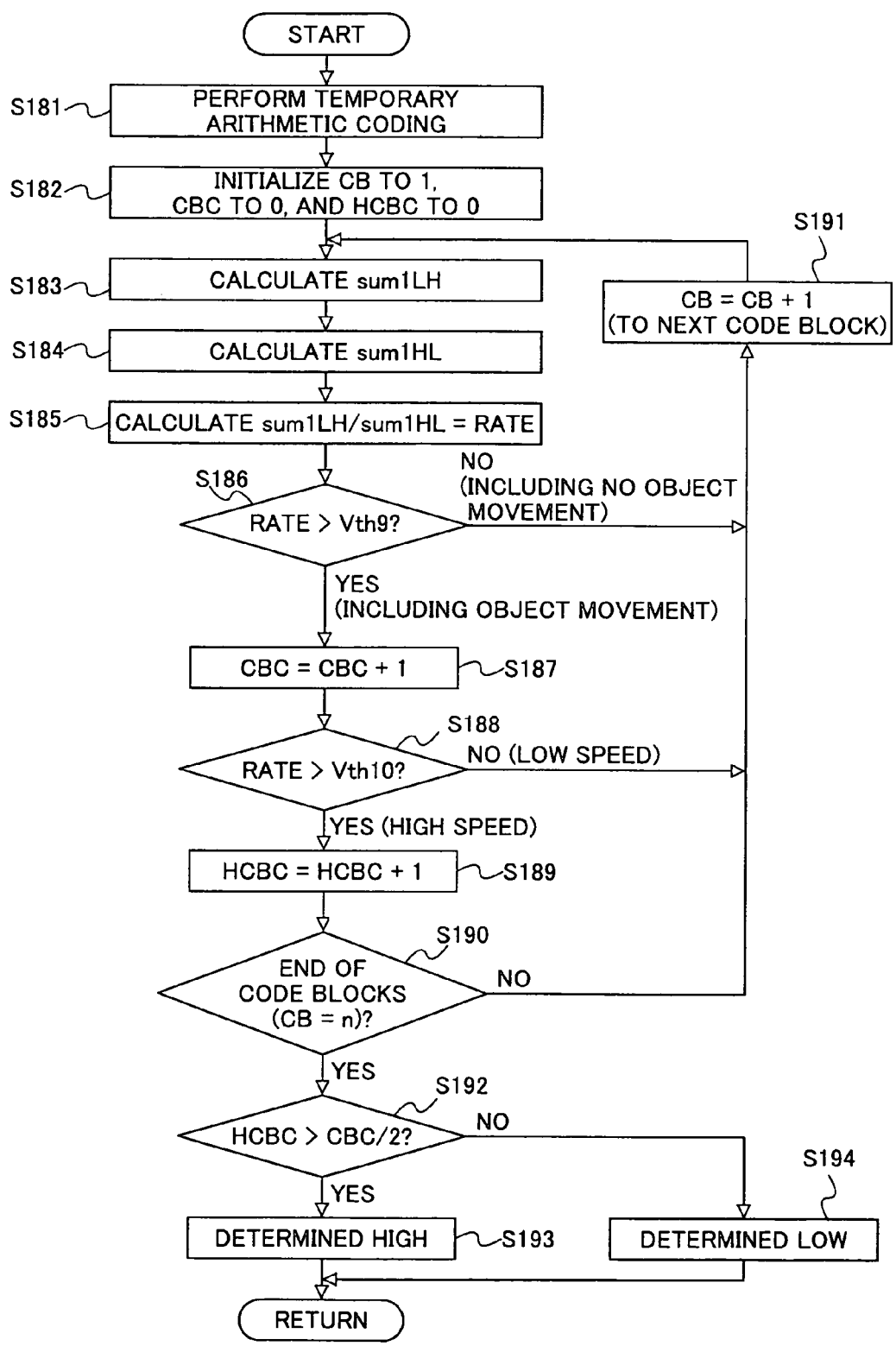
FIG. 17 is a flowchart of yet another variation of the speed determination operation.

FIG. 17 is a flowchart showing an operation procedure in the case of performing the speed determination operation of FIG. 15 based on the amount of codes obtained by temporary arithmetic coding. First, in step S181 of FIG. 17, temporary arithmetic coding is performed on the entropy-coded data obtained by step S6 of the main routine of FIG. 4. Then, in step S182, the value of the variable CB representing a code block is initialized to 1, the significant code block count value CBC representing the number of code blocks determined to include an object movement (the number of significant code blocks) is initialized to 0, and the HIGH significant code block count value HCBC is initialized to 0. HCBC represents, among the significant code blocks, the number of those in which the object is determined to be moving at high speed. Next, in step S183, the sum of the absolute values of the coefficients of the code block CB in the 1LH sub-band is calculated. This sum is referred to as sum1LH. Next, in step S184, the sum of the absolute values of the coefficients of the corresponding code block CB in the 1HL sub-band is calculated. This sum is referred to as sum1HL. Then, in step S185, the value of sum 1LH/sum1HL=RATE is calculated using the coefficients sum 1LH and sum 1HL obtained in steps S183 and S184. Next, in step S186, a determination is made as to whether the variable RATE obtained in step S185 is greater than the experimentally determined threshold Vth9. If RATE is greater than Vth9 (that is, "YES" in step S186), in step S187, the code block CB is determined to include an object movement, and the significant code block count value CBC is incremented by one. Then, in step S188, a determination is made as to whether RATE is greater than the experimentally determined threshold Vth10. If RATE is greater than Vth10 (that is, "YES" in step S188), in step S189, the variable HCBC is incremented by one.

If RATE is less than or equal to Vth9 (that is, "NO" in step S186) or Vth10 (that is, "NO" in step S188), or if the above-described operation of steps S183 through S189 has not been performed on all the n code blocks (that is, "NO" in step S190), in step S191, the variable CB is incremented by one, and the operation returns to step S183 in order to continue the determination of the variable RATE (movement speed determination) for each of the remaining code blocks.

On the other hand, if the above-described operation has been performed on all the n code blocks, that is, if the variable CB is n (that is, "YES" in step S190), in step S192, a determination is made as to whether the HIGH significant code block count number HCBC is greater than the half of the significant code block count number CBC. If HCBC>CBC/2 (that is, "YES" in step S192), in step S193, the in-frame object movement speed is determined to be HIGH. If HCBC≦CBC/2 (that is, "NO" in step S192), in step S194, the in-frame object movement speed is determined to be LOW. Thereafter, the operation returns to the main routine of FIG. 4.

As described above, the in-frame object movement speed can be determined easily based on the unit of a code block using either one of the variations of FIGS. 16 and 17. Accordingly, for instance, in the case where only an object moves in a still image, a still image unit and a moving image unit can be separated and adaptively processed compared with the case of determining the in-frame object movement speed based on the unit of a sub-band.

THIRD EMBODIMENT

An image processing apparatus according to a third embodiment of the present invention, which performs coding based on JPEG2000, processes the image data of a non-interlaced image obtained by combining the interlaced images of two fields successively captured by a video camera. Among the coefficient values obtained by performing a two-dimensional discrete wavelet transform (DWT) on the image data of the non-interlaced image, the coefficient values of the 1LH sub-band increase, together with the amount of codes thereof, in proportion to the horizontal movement speed of an object within the fields captured by the video camera, while the coefficient values and the amount of codes of the 1HL sub-band show substantially constant values. The image processing apparatus of this embodiment, based on these characteristics, determines the horizontal movement speed of the object within the frame (in-frame object movement speed) (to be HIGH or LOW) using a code block as a unit of determination, and performs coding effectively based on the unit of a code block based on the determination results. The code block has a matrix of pixels smaller than a sub-band, such as a matrix of 32×32 pixels. Compared with the case of determining the in-frame object movement speed based on the unit of a sub-band and performs adaptive image processing based on the determination results, in the case where only an object moves in a still image, for instance, a still image unit and a moving image unit can be separated from each other based on the unit of a code block to be suitably processed.

In the following description, the same elements as those of the first and second embodiments are referred to by the same numerals, and a description thereof is omitted.

The image processing apparatus of this embodiment has the same configuration as the image processing apparatus 10 of the first embodiment (FIG. 1). As described below, the image processing apparatus of this embodiment determines the in-frame object movement speed based on the determination unit of a code block using the above-described characteristic of the coefficient values of the 1LH sub-band.

The main routine of the image processing program executed by the CPU 1 of the image processing apparatus of this embodiment is basically equal to that of the first embodiment shown in FIG. 4. According to this embodiment, in the data reduction operation of step S7, the speed determination operation is performed based on information on each code block.

According to the data reduction operation of the third embodiment, the speed determination operation is performed based on the unit of a code block as in the data reduction operation of the second embodiment. Then data reduction operation performs data reduction putting emphasis on the LH component on the coded (entropy-coded) data recorded in the RAM 3 or on the HD 7. On the other hand, if the movement speed is determined to be LOW (the object is moving at low speed), the data reduction operation performs data reduction putting emphasis on the HL component on the coded (entropy-coded) data.

Figure 18:
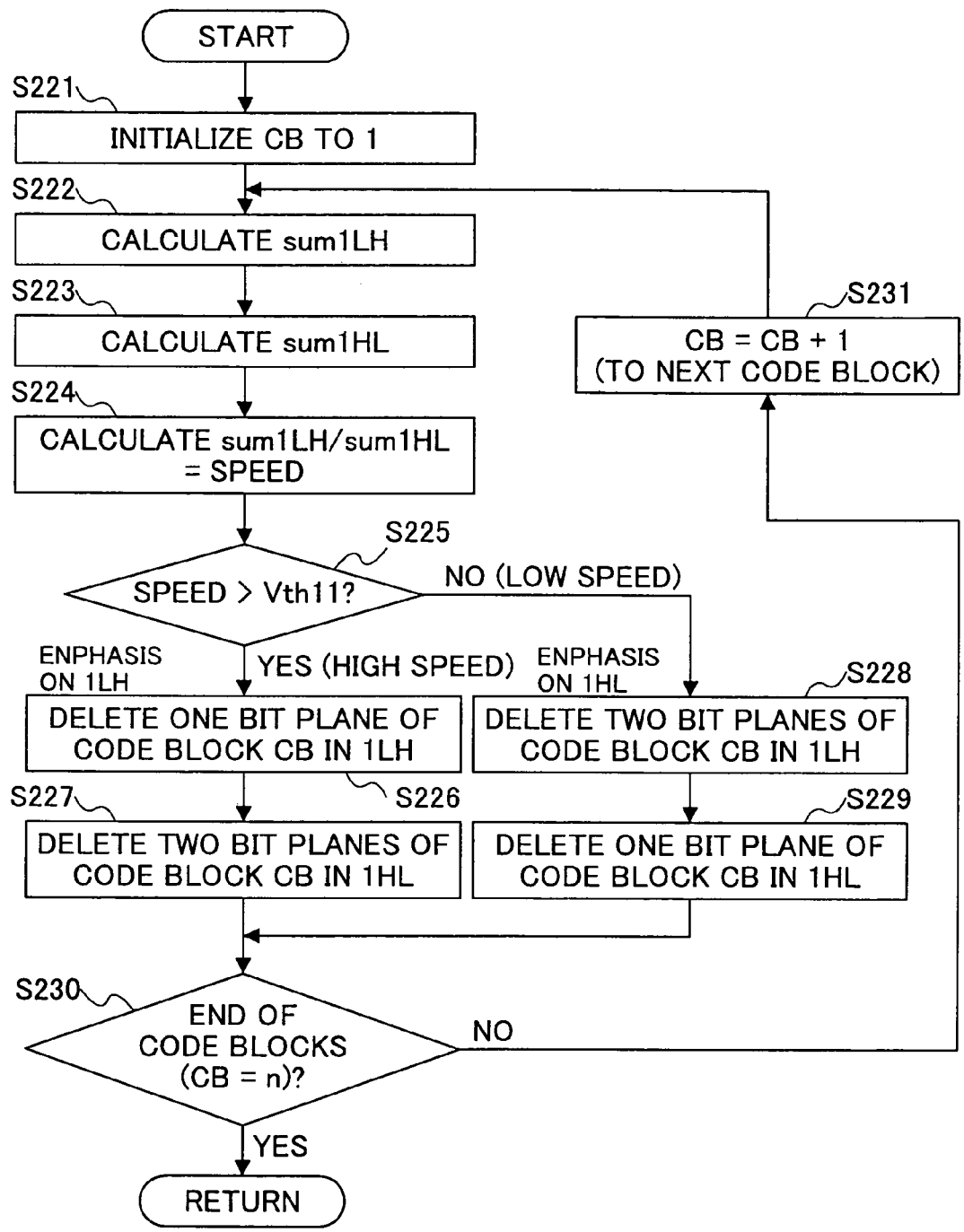
FIG. 18 is a flowchart of yet another embodiment of the data reduction operation.

FIG. 18 is a flowchart another embodiment of the data reduction operation of step S7 of FIG. 4. The wavelet coefficients obtained by the two-dimensional DWT of level 3 are divided into code blocks each having, for instance, a matrix of 32×32 pixels. The code blocks generated in each of the sub-bands (1LH, 1HL, 1HH, 2LH, 2HL, 2HH, 3LL, 3LH, 3LH, and 3HH) by the above-described dividing are as shown in FIG. 14 of the second embodiment.

In step S221 of FIG. 18 the value of the variable CB representing a code block is initialized to 1. Next, in step S222, the sum of the absolute values of the coefficients of the code block CB in the 1LH sub-band is calculated. This sum is referred to as sum 1LH. Next, in step S223, the sum of the absolute values of the coefficients of the code block CB in the 1HL sub-band is calculated. This sum is referred to as sum1HL. Then, in step S224, the value of sum1LH/sum1HL=SPEED is calculated using the coefficients sum1LH and sum1HL obtained in steps S222 and S223. It may be considered that the variable SPEED varies substantially in proportion to the in-frame object movement speed. As previously described, the values of the 1LH coefficients increase in proportion to an increase in the horizontal edge amount of an image, that is, an increase in the in-frame object movement speed. On the other hand, the values of the 1HL coefficients, which are in proportion to the vertical edge amount of an image, are relatively stable since empirically, the object makes only horizontal movements in most cases.

Next, in step S225, a determination is made as to the variable SPEED calculated in step S224 is greater than an experimentally determined threshold Vth11. If SPEED is greater than Vth11 (that is, "YES" in step S225), the movement speed of the object is determined to be HIGH (the object is moving at high speed in the code block CB), and data reduction putting emphasis on the LH component is performed. Specifically, in step S226, the bit plane corresponding to the LSB of the code block CB in the 1LH sub-band is deleted, and in step S227, the two bit planes corresponding to the lowest-order or least-significant two bits including the LSB (the LSB and the next bit) of the code block CB in the 1HL sub-band are deleted. On the other hand, if SPEED is less than or equal to Vth11 (that is, "NO" in step S225), the movement speed is determined to be LOW (the object is moving at low speed in the code block CB), and data reduction putting emphasis on the HL component is performed: Specifically, in step S228, the two bit planes corresponding to the lowest-order or least-significant two bits including the LSB (the LSB and the next bit) of the code block CB in the 1LH sub-band are deleted, and in step S229, the bit plane corresponding to the LSB of the code block CB in the 1HL sub-band is deleted.

Figure 19:
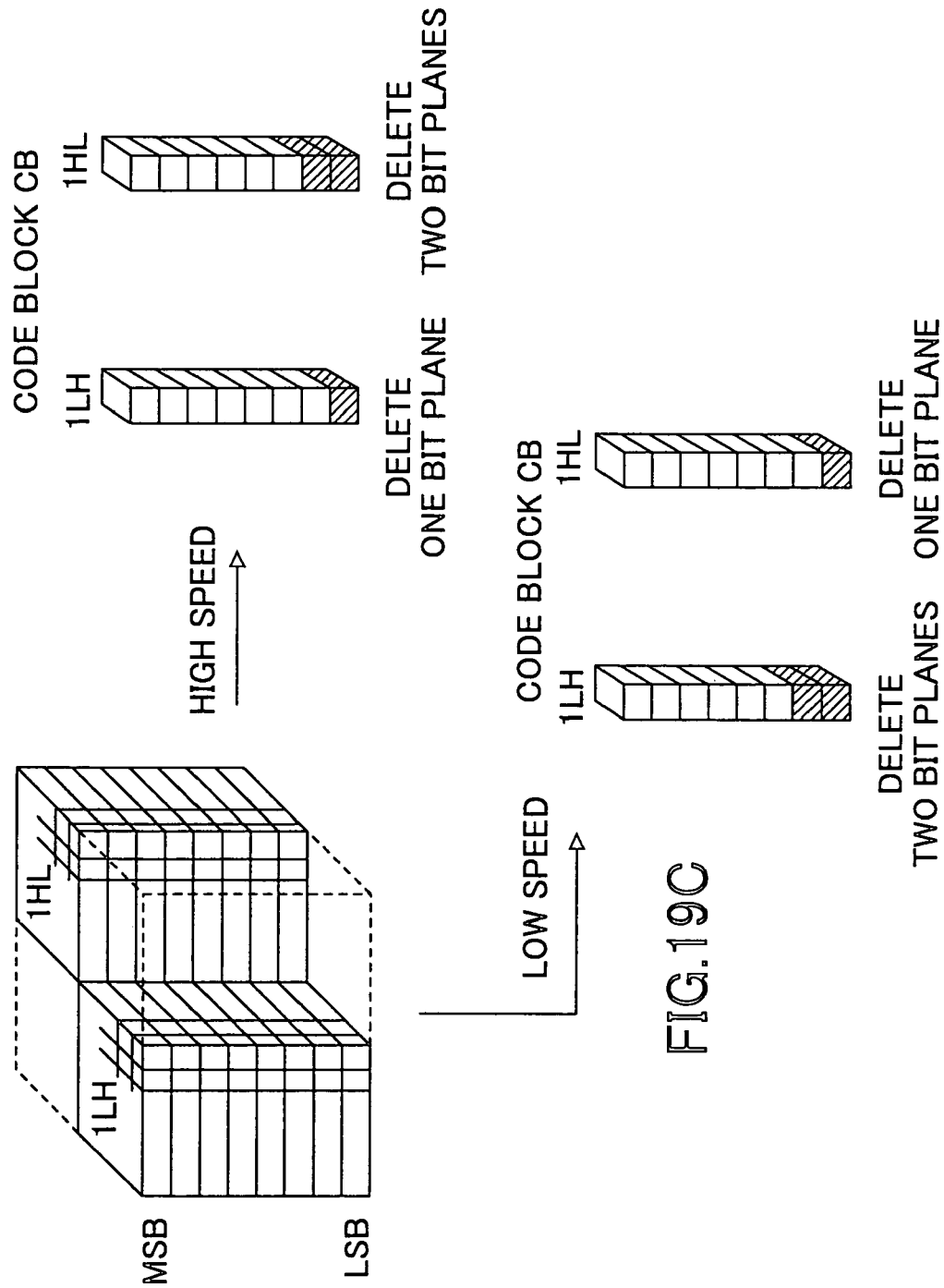
FIGS. 19A through 19C are diagrams illustrating one embodiment of a data reduction operation is performed in accordance with the result of the speed determination operation.

FIG. 19A is a diagram showing the wavelet coefficients of the 1LH and 1HL sub-bands after the entropy coding decomposed into bit planes. FIG. 19B is a diagram illustrating the contents of the operations of steps S226 and S227 of FIG. 18 performed when the movement speed is determined to be HIGH in step S225. As shown hatched in FIG. 19B, data for the LSB is deleted from the 1LH coefficients of the code block CB decomposed in bit planes. Further, data for the lowest-order or least-significant two bits including the LSB is deleted from the 1HL coefficients of the code block CB. That is, the two bit planes corresponding to the LSB and the next bit of the 1HL sub-band of the code block CB are deleted.

FIG. 19C is a diagram illustrating the contents of the operations of steps S228 and S229 of FIG. 18 performed when the movement speed is determined to be LOW in step S225. As shown hatched in FIG. 19C, data for the lowest-order or least-significant two bits including the LSB is deleted from the 1LH coefficients of the code block CB decomposed into bit planes. That is, the two bit planes corresponding to the LSB and the next bit of the 1LH sub-band are deleted. Further, data for the LSB is deleted from the 1HL coefficients of the code block CB.

Referring back to FIG. 18, in step S230, a determination is made as to whether the above-described operation (data reduction based on the movement speed of the object in the code block CB) has been performed on all the n code blocks. If the above-described operation has not been performed on all the n code blocks CB (that is, "NO" in step S230), in step S231, the variable CB is incremented by one, and the operation returns to step S222 in order to continue the determination of the variable SPEED (movement speed determination) for each of the remaining code blocks. On the other hand, if the above-described operation has been performed on all the n code blocks, that is, CB=n (that is, "YES" in step S230), the data reduction operation ends so that the operation returns to the main routine of FIG. 4.

As previously described, among the wavelet coefficients obtained by performing two-dimensional DWT of level 3 on image data to be encoded, particularly, the coefficient values of the 1LH sub-band increase, together with the amount of codes thereof, in proportion to the horizontal movement speed of an object within the captured fields or frame, while the coefficient values and the amount of codes of the 1HL sub-band show substantially constant values. The image processing apparatus of the third embodiment, based on these characteristics, detects the horizontal movement speed of the object within the frame based on the unit of a code block, and performs coding more effectively based on the detected values. As a result, the object movement speed can be detected, based on the unit of a code block, by a simple operation using a small amount of data without the inter-field difference in the image data of the object, and the operation of compression and coding can be adaptively performed based on the unit of a code block.

First Variation

A description is given below of a first variation of one embodiment of the data reduction operation. In the above-described case, the in-frame object movement speed is determined based on the coefficient values of the 1LH and 1HL sub-bands as shown in the flowchart of FIG. 18. According to the first variation, the data reduction operation employs a speed determination operation that was experimentally effective in speed determination, based further on the coefficient values of the 1HH sub-band.

Figure 20:
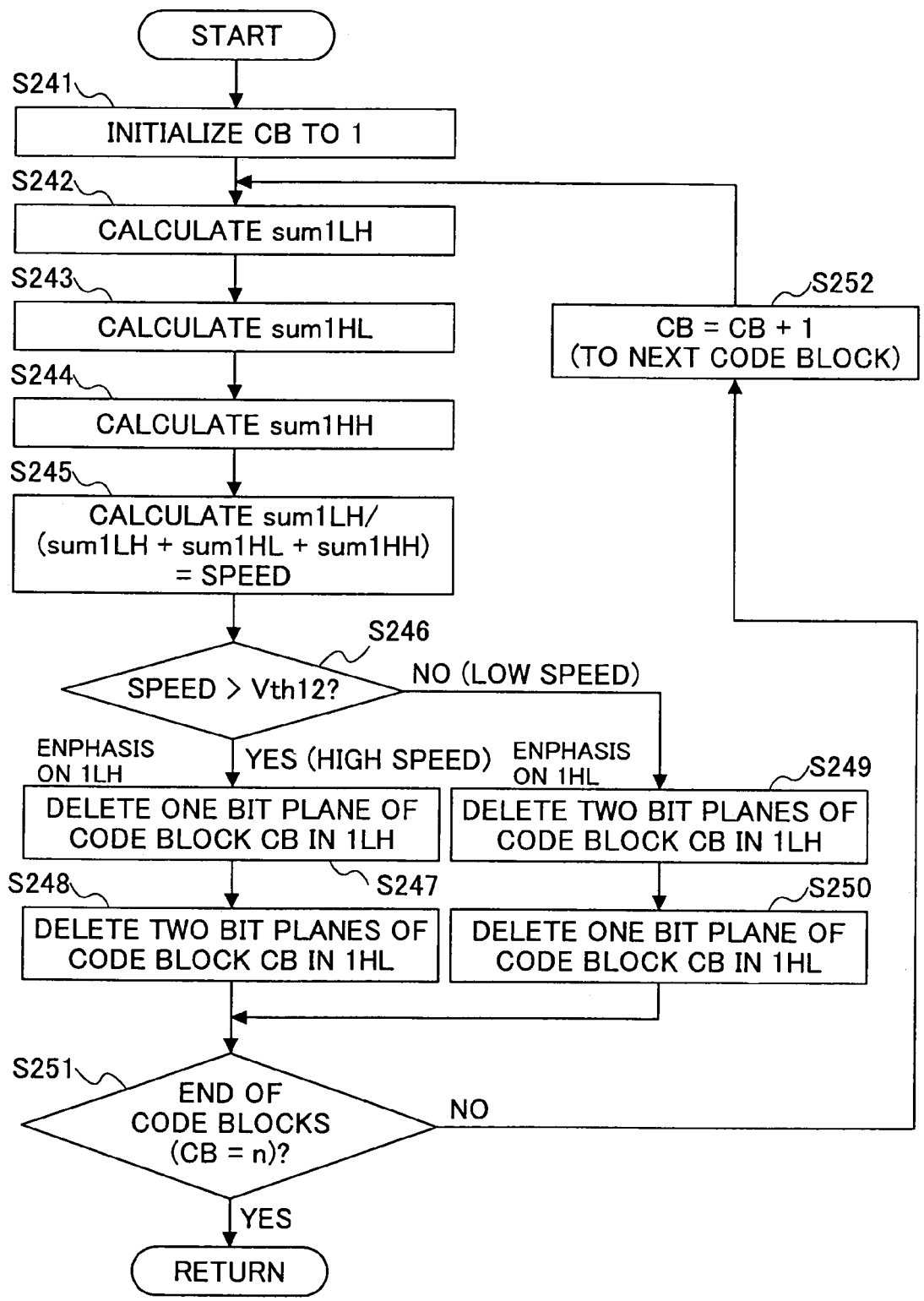
FIG. 20 is a flowchart of a first variation of the data reduction operation.

FIG. 20 is a flowchart of one embodiment of the first variation of the data reduction operation of step S7 of FIG. 4. The wavelet coefficients obtained by the two-dimensional DWT of level 3 are divided into code blocks each having, for instance, a matrix of 32×32 pixels. As a result, each of the sub-bands of level 1 is divided into n code blocks. In step S241 of FIG. 20, the value of the variable CB representing a code block in the sub-bands is initialized to 1. Next, in step S242, the sum of the absolute values of the coefficients of the code block CB in the 1LH sub-band is calculated. This sum is referred to as sum1LH. Next, in step S243, the sum of the absolute values of the coefficients of the code block CB in the 1HL sub-band is calculated. This sum is referred to as sum1HL. Next, in step S244, the sum of the absolute values of the coefficients of the code block CB in the 1HH sub-band is calculated. This sum is referred to as sum1HH. Then, in step S245, the value of sum1LH/(sum1LH+sum1HL+sum1HH) =SPEED is calculated using the coefficients sum1LH, sum1HL, and sum1HH obtained in steps S242 through S244.

Next, in step S246, a determination is made as to whether the variable SPEED calculated in step S245 is greater than an experimentally determined threshold Vth12. If SPEED is greater than Vth12 (that is, "YES" in step S246), the movement speed of the object is determined to be HIGH (the object is moving at high speed in the code block CB), and data reduction putting emphasis on the LH component is performed. Specifically, in step S247, the bit plane corresponding to the LSB of the code block CB in the 1LH sub-band is deleted, and in step S248, the two bit planes corresponding to the lowest-order or least-significant two bits including the LSB (the LSB and the next bit) of the code block CB in the 1HL sub-band are deleted. On the other hand, if SPEED is less than or equal to Vth12 (that is, "NO" in step S246), the movement speed is determined to be LOW (the object is moving at low speed in the code block CB), and data reduction putting emphasis on the HL component is performed. Specifically, in step S249, the two bit planes corresponding to the lowest-order or least-significant two bits including the LSB (the LSB and the next bit) of the code block CB in the 1LH sub-band are deleted, and in step S250, the bit plane corresponding to the LSB of the code block CB in the 1HL sub-band is deleted.

Next, in step S251, a determination is made as to whether the above-described operation (data reduction based on the movement speed of the object in the code block CB) has been performed on all the n code blocks. If the above-described operation has not been performed on all the n code blocks CB (that is, "NO" in step S251), in step S252, the variable CB is incremented by one, and the operation returns to step S252 in order to continue the determination of the variable SPEED (movement speed determination) for each of the remaining code blocks. On the other hand, if the above-described operation has been performed on all the n code blocks, that is, CB=n (that is, "YES" in step S251), the data reduction operation ends so that the operation returns to the main routine of FIG. 4.

Other Variations

As previously described, the in-frame object movement speed is in proportion to the 1LH wavelet coefficient values. Naturally, the in-frame object movement speed is also in proportion to the amount of coded data of the 1LH sub-band obtained by encoding the 1LH wavelet coefficient values using a (5, 3) lossless filter. A description is given briefly of each of the cases where the speed determination operations (data reduction operations) of FIGS. 18 and 20 are performed based on the amount of codes obtained by temporary arithmetic coding.

Figure 21:
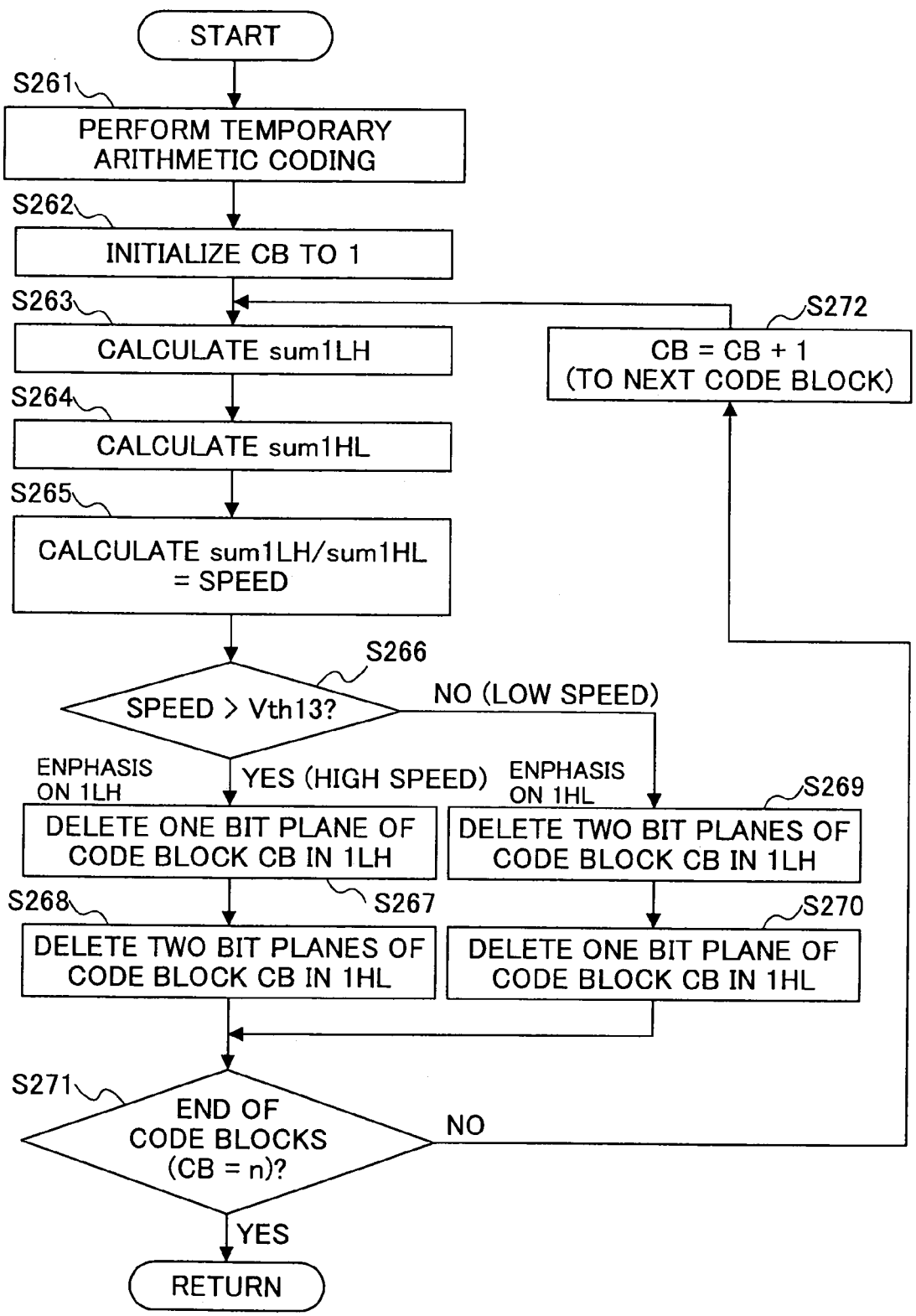
FIG. 21 is a flowchart of another variation of the data reduction operation.

FIG. 21 is a flowchart showing an operation procedure in the case of performing the speed determination operation (data reduction operation) of FIG. 18 based on the amount of codes obtained by temporary arithmetic coding. First, in step S261 of FIG. 21, temporary arithmetic coding is performed on the entropy-coded data obtained by step S6 of the main routine of FIG. 4. Each of the sub-bands of level 1 is divided into n code blocks. Then, in step S262, the value of the variable CB representing a code block in the sub-bands is initialized to 1. Next, in step S263, the sum of the absolute values of the coefficients of the code block CB in the 1LH sub-band is calculated. This sum is referred to as sum1LH. Next, in step S264, the sum of the absolute values of the coefficients of the code block CB in the 1HL sub-band is calculated. This sum is referred to as sum1HL. Then, in step S265, the value of sum1LH/sum1HL=SPEED is calculated using the coefficients sum1LH and sum1HL obtained in steps S263 and S264.

Next, in step S266, a determination is made as to whether the variable SPEED calculated in step S265 is greater than an experimentally determined threshold Vth13. If SPEED is greater than Vth13 (that is, "YES" in step S266), the movement speed of the object is determined to be HIGH (the object is moving at high speed in the code block CB), and data reduction putting emphasis on the LH component is performed. Specifically, in step S267, the bit plane corresponding to the LSB of the code block CB in the 1LH sub-band is deleted, and in step S268, the two bit planes corresponding to the lowest-order or least-significant two bits including the LSB (the LSB and the next bit) of the code block CB in the 1HL sub-band are deleted. On the other hand, if SPEED is less than or equal to Vth13 (that is, "NO" in step S266), the movement speed is determined to be LOW (the object is moving at low speed in the code block CB), and data reduction putting emphasis on the HL component is performed. Specifically, in step S269, the two bit planes corresponding to the lowest-order or least-significant two bits including the LSB (the LSB and the next bit) of the code block CB in the 1LH sub-band are deleted, and in step S270, the bit plane corresponding to the LSB of the code block CB in the 1HL sub-band is deleted.

Then, in step S271, a determination is made as to whether the above-described operation (data reduction based on the movement speed of the object in the code clock CB) has been performed on all the n code blocks. If the above-described operation has not been performed on all the n code blocks CB (that is, "NO" in step S271), in step S272, the variable CB is incremented by one, and the operation returns to step S263 in order to continue the determination of the variable SPEED (movement speed determination) for each of the remaining code blocks. On the other hand, if the above-described operation has been performed on all the n code blocks, that is, CB=n (that is, "YES" in step S271), the data reduction operation ends so that the operation returns to the main routine of FIG. 4.

Figure 22:
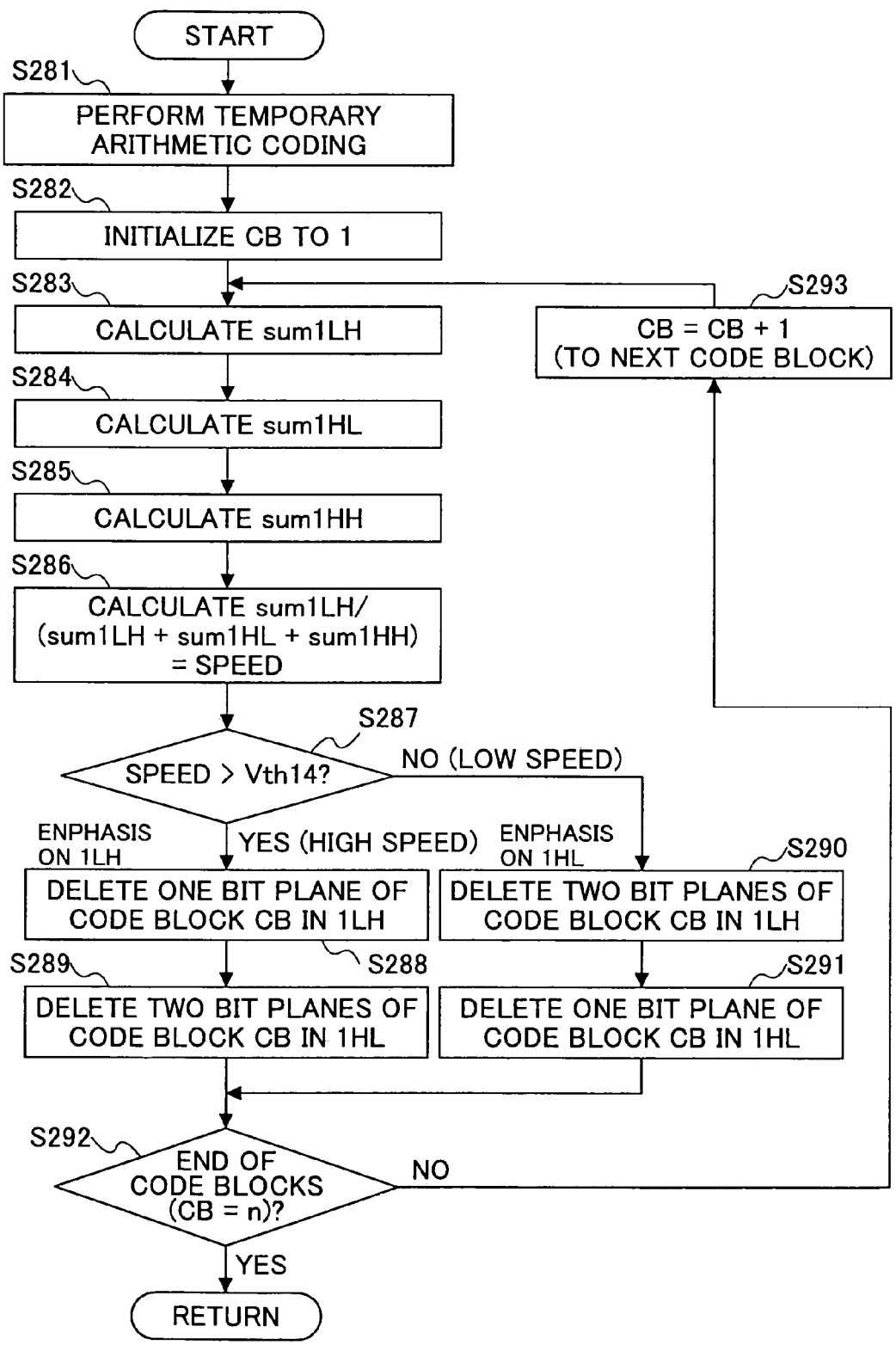
FIG. 22 is a flowchart of yet another variation of the data reduction operation.

FIG. 22 is a flowchart showing an operation procedure in the case of performing the speed determination operation (data reduction operation) of FIG. 20 based on the amount of codes obtained by temporary arithmetic coding. First, in step S281 of FIG. 22, temporary arithmetic coding is performed on the entropy-coded data obtained by step S6 of the main routine of FIG. 4. Each of the sub-bands of level 1 is divided into n code blocks. Then, in step S282, the value of the variable CB representing a code block in the sub-bands is initialized to 1. Next, in step S283, the sum of the absolute values of the coefficients of the code block CB in the 1LH sub-band is calculated. This sum is referred to as sum1LH. Next, in step S284, the sum of the absolute values of the coefficients of the code block CB in the 1HL sub-band is calculated. This sum is referred to as sum1HL. Next, in step S285, the sum of the absolute values of the coefficients of the code block CB in the 1HH sub-band is calculated. This sum is referred to as sum1HH. Then, in step S286, the value of sum1LH/(sum 1LH+sum1HL+sum1HH)=SPEED is calculated using the coefficients sum1LH, sum1HL, and sum1HH obtained in steps S283 through S285.

Next, in step S287, a determination is made as to whether the variable SPEED calculated in step S286 is greater than an experimentally determined threshold Vth14. If SPEED is greater than Vth14 (that is, "YES" in step S287), the movement speed of the object is determined to be HIGH (the object is moving at high speed in the code block CB), and data reduction putting emphasis on the LH component is performed. Specifically, in step S288, the bit plane corresponding to the LSB of the code block CB in the 1LH sub-band is deleted, and in step S289, the two bit planes corresponding to the lowest-order or least-significant two bits including the LSB (the LSB and the next bit) of the code block CB in the 1HL sub-band are deleted. On the other hand, if SPEED is less than or equal to Vth14 (that is, "NO" in step S287), the movement speed is determined to be LOW (the object is moving at low speed in the code block CB), and data reduction putting emphasis on the HL component is performed. Specifically, in step S290, the two bit planes corresponding to the lowest-order or least-significant two bits including the LSB (the LSB and the next bit) of the code block CB in the 1LH sub-band are deleted, and in step S291, the bit plane corresponding to the LSB of the code block CB in the 1HL sub-band is deleted.

Next, in step S292, a determination is made as to whether the above-described operation (data reduction based on the movement speed of the object in the code block CB) has been performed on all the n code blocks. If the above-described operation has not been performed on all the n code blocks CB (that is, "NO" in step S292), in step S293, the variable CB is incremented by one, and the operation returns to step S283 so a to continue the determination of the variable SPEED (movement speed determination) for each of the remaining code blocks. On the other hand, if the above-described operation has been performed on all the n code blocks, that is, CB=n (that is, "YES" step S292), the data reduction operation ends so that the operation returns to the main routine of FIG. 4

As described above, the in-frame object movement speed can be determined easily based on the unit of a code block using either one of the variations of FIGS. 21 and 22. Accordingly, for instance, in the case where only an object moves in still image, a still image unit and a moving image unit can be separated and adaptively processed compared with the case of determining the in-frame object movement speed based on the unit of a sub-band.

FOURTH EMBODIMENT

A description is given below of a fourth embodiment of the present invention. An image processing apparatus according to the fourth embodiment, which processes a non-interlaced image (a frame) generated from the interlaced images of two successive fields, converts the image data of the non-interlaced image into frequency-region coefficients, quantizes the coefficients frequency by frequency, and performs entropy coding on the quantized coefficients. The image processing apparatus of the fourth embodiment performs data reduction (including data reduction through quantization) in order to increase the reproducibility of a comb-shaped image offset appearing in the non-interlaced image, that is, decrease the amount of reduction of part of the code data (coded data) which part may degrade or adversely affect the reproducibility of the edge part of the non-interlaced image, in consideration of the human visual characteristics as the in-frame object movement speed increases. Specifically, the data reduction is performed by any of the following three methods. Image processing apparatuses for performing the three data reduction methods are described below) in detail.

The first data reduction method converts data for the non-interlaced image to be processed to frequency-region coefficients by frequency conversion such as DCT in JPEG or two-dimensional DWT in JPEG2000, and performs data reduction using quantization performed on the coefficients of each frequency. At this point, as the in-frame object movement speed increases, the value of a quantization step (a quantization step size) employed for the quantization of the coefficients of a high-frequency band is reduced. The quantized coefficients are subjected to entropy coding. The first data reduction method is employed in an image processing apparatus according to the below-described first mode of the fourth embodiment.

The second data reduction method performs frequency conversion on the non-interlaced image to be processed, and quantizes the coefficients of each frequency obtained by the frequency conversion. Thereafter, the second data reproduction method divides the quantized coefficients of each frequency into units of image quality control, which correspond to, for instance, sub-bands or code blocks in JPEG2000, and performs data reduction by performing entropy coding on only part of the divided coefficients which part is to be finally required (for instance, in the case of JPEG2000, a required part of the bit planes of each necessary sub-band or each necessary code block) in accordance with the in-frame object movement speed. At this point, as the movement speed of an object in the non-interlaced image, or the in-frame object movement speed, increases, the low-order bit data to be discarded of the coefficients of a high-frequency band decreases in amount. The second data reduction method is employed in an image processing apparatus according to the below-described second mode of the fourth embodiment.

The third data reduction method performs frequency conversion on the non-interlaced image to be processed, and quantizes the coefficients of each frequency obtained by the frequency conversion. Thereafter, the third data reduction method performs entropy coding on the quantized coefficients of each frequency, and then performs data reduction by finally discarding unnecessary entropy-coded data based on the in-frame object movement speed. The unnecessary entropy-coded data is discarded in ascending order of significance (or in the order of increasing significance) based on the unit of the bit plane of the coefficients of a unit of image quality control such as a sub-band or a code block in the case of JPEG2000. At this point, the significance of the entropy-coded data is controlled so that the low-order bit data to be discarded of the entropy-coded data of the coefficients of a high-frequency band decreases in amount as the movement speed of an object in the non-interlaced image, or the in-frame object movement speed, increases. The third data reduction method is employed in an image processing apparatus according to the below-described third mode of the fourth embodiment.

First Mode

Figure 23:
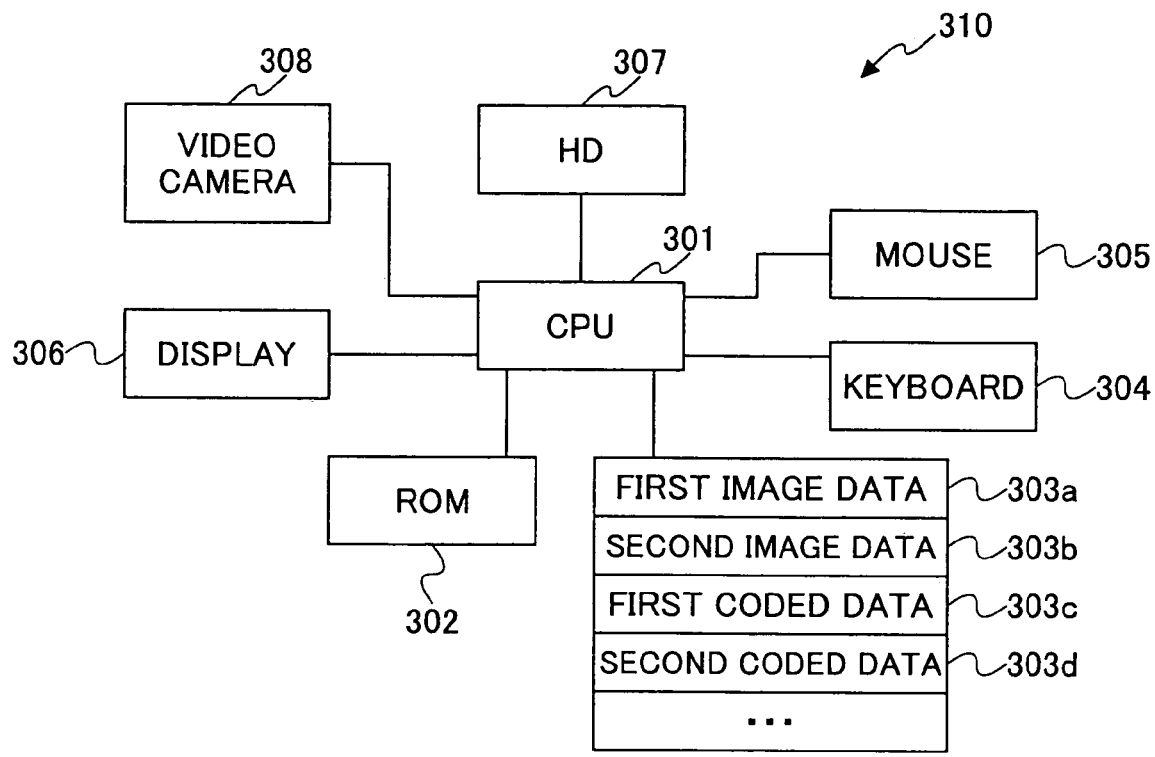
FIG. 23 is a block diagram showing an image processing apparatus according to a first mode.

FIG. 23 is a block diagram showing an image processing apparatus 310 according to the first mode of the fourth embodiment of the present invention. The image processing apparatus 310, which performs coding based on JPEG2000, varies the quantization step size of scalar quantization to be performed on the wavelet coefficients obtained by two-dimensional DWT, which is frequency conversion, in accordance with the in-frame object movement speed based on the unit of a sub-band, which is a unit of image quality control. More specifically, as the movement speed of an object in a non-interlaced image to be processed increases, the value of a quantization step employed for quantizing the coefficients of a high-frequency band, which can degrade the reproducibility of the edge part of the non-interlaced image, is reduced in order to increase the reproducibility of a comb-shaped image offset appearing in the non-interlaced image.

Referring to FIG. 23, the image processing apparatus 310, which is an apparatus for compressing and encoding image data based on JPEG2000, includes a CPU 301, a ROM 302 storing a control program, a RAM 303 employed as working memory for coding, a keyboard 304, a mouse 305, a display 306, a hard disk (HD) 307, and a video camera 308.

The image data of a non-interlaced image having the interlaced images of two fields successively captured by the video camera 308 is written alternately to a first image data region 303a and a second image data region 303b of the RAM 303 by the control of the CPU 301.

Figure 24:
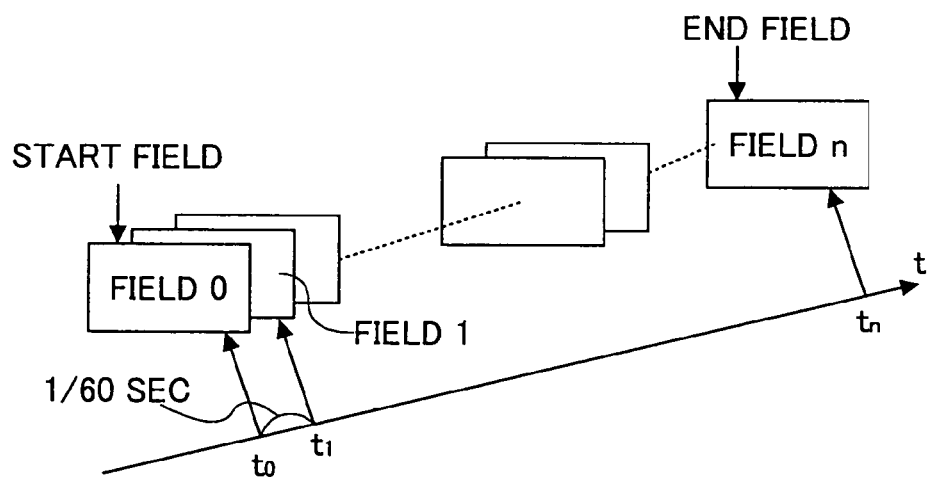
FIG. 24 is a diagram showing a series of interlaced images captured by and embodiment of a video camera.

More specifically, as shown in FIG. 24, of the interlaced images of fields 0 through n successively read at intervals of 1/60 second, the image data of the interlaced image A of the field 0 (FIG. 25A), for instance, is written to the first image data region 303a of the RAM 303. Thereafter, the image data of the interlaced image B of the next field 1 (FIG. 25B) read after an interval of 1/60 second is complementarily written line by line to part of the first image data region 303a to which part no data has been written so that the image data of the interlaced image A and B are written in alternate lines. As a result, the image data of a non-interlaced image as shown in FIG. 25C is formed in the first image data region 303a of the RAM 303.

Likewise, the CPU 301 writes the image data of the interlaced images A and B of the fields 2 and 3 to the second image data region 303b, thereby forming the image data of a non-interlaced image. The image data of the non-interlaced image written to the first image data region 303a is encoded by the CPU 301 (in approximately ⅓₀ second) by the time the writing of the image data of the non-interlaced image to the second image data region 303b is completed.

The CPU 301 writes the code data (coded data) generated by the encoding to a first coded data region 303c, and stores the coded data written to the first coded data region 303c on the HD 307 when the encoding is completed.

On the other hand, when the writing of the image data of the non-interlaced image to the second image data region 303b is completed, the CPU 301 writes the coded data generated by encoding to a second coded data region 303d, and stores the coded data written to the second coded data region 303d on the HD 307 when the encoding is completed.

Alternatively, the CPU 301 may temporarily record the image data of the non-interlaced images before encoding written to the first and second image data regions 303a and 303b on the HD 307, and thereafter, read out and encode the recorded image data of the non-interlaced images successively.

Figure 25A:
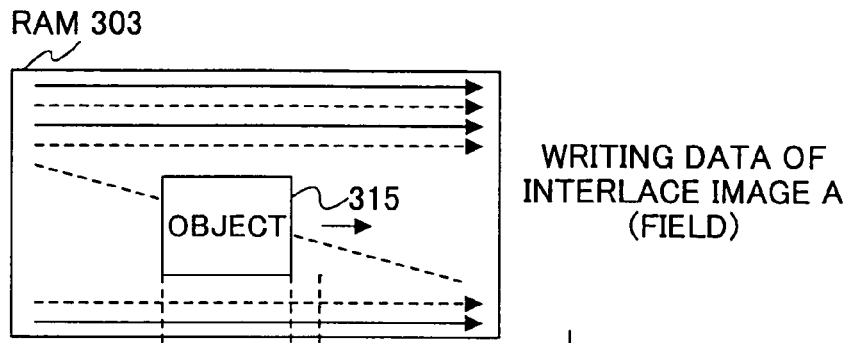
FIGS. 25A through 25D are diagrams for illustrating a comb-shaped offset generated in the case of forming a non-interlaced image from interlaced images.
Figure 25B:
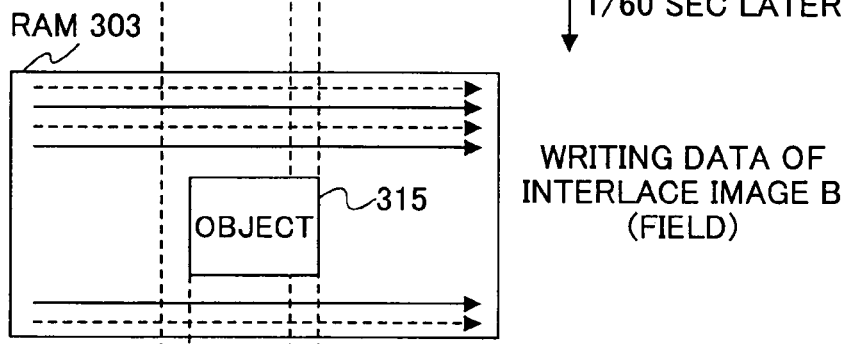
Figure 25C:
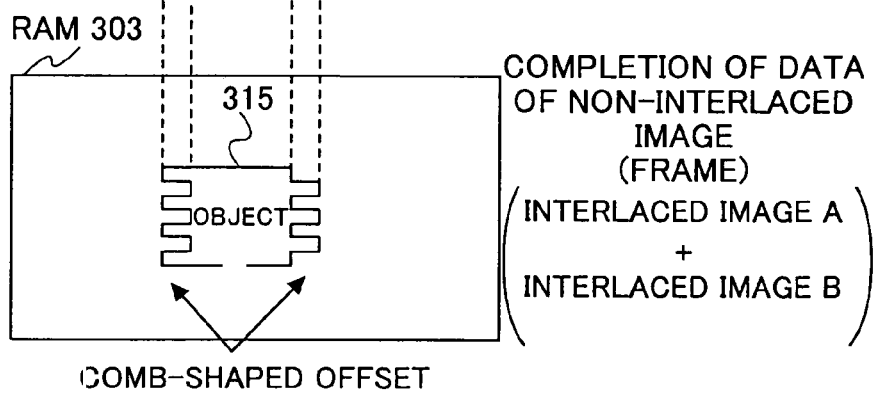

FIGS. 25A through 25D are diagrams for illustrating a phenomenon occurring when a non-interlaced image is generated from interlaced images captured by the video camera 308 and the principles of the determination of the movement speed of an object using the phenomenon. Referring to FIG. 25A, according to interlacing, after the first pixel line (the solid first scanning line) is scanned, the third pixel line two pixels below the first line (the solid third scanning line) is scanned, skipping the second pixel line immediately below the first pixel line (the broken second scanning line).

Referring to FIG. 25B, immediately after writing the image data of the interlaced image A to the first or second image data region 303a or 303b of the RAM 303, the video camera 308 scans the pixel lines that were not scanned at the previous scanning (the solid scanning lines in FIG. 25B). As a result, the interlaced image B is captured. The CPU 301 additionally writes the scanned image data of the interlaced image B to the first or second image data region 303a or 303b of the RAM 303 to which the image data of the interlaced image A of the immediately preceding field is written in order to supplement image data for the lines (dotted lines in FIG. 25A) that have not been scanned for the interlaced image A.

At the time of capturing these images A and B, ¹⁄₆₀ second passes since the scanning of a pixel line of the interlaced image A of a field before scanning a pixel line of the interlaced image B of the next field which pixel line is positioned immediately below the pixel line of the interlaced image A. The comparison of the interlaced images A and B of FIGS. 25A and 25B shows that an object 315 has made a rightward movement during the ¹⁄₆₀ second. Naturally, the movement may be leftward. Accordingly, referring to FIG. 25C, the non-interlaced image formed in the first or second image data region 303a or 303b of the RAM 303 includes a comb-shaped offset equivalent to a few pixels in each horizontal end of the non-interlaced image.

Figure 25D:
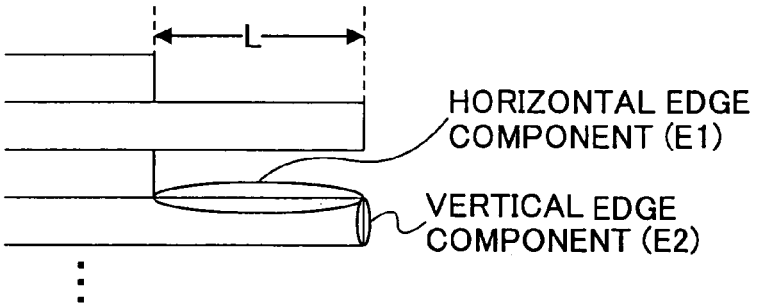

Referring to FIG. 25D, the amount L of the comb-shaped offset increases (becomes longer in FIG. 25D) in proportion to the movement speed of the object 315 within the interlaced images. The coefficient values of the 1LH sub-band obtained by performing two-dimensional DWT on the image data of the non-interlaced image having the above-described comb-shaped offset increase in proportion to the total of horizontal edge components E1, that is, the movement speed of the object 315 within the interlaced images. Further, the coefficient values of the 1HL sub-band increase in proportion to the total of vertical edge components E2. However, it is assumed that the coefficient values of the 1HL sub-band remain substantially the same irrespective of the movement speed of the object 315 based on the empirical rule that generally, almost all objects make horizontal movements while their images are being captured. As described below, the image processing apparatus 310 determines the movement speed of an object within interlaced images using the above-described characteristic of the coefficient values of the 1LH sub-band.

FIG. 26 is a flowchart of the main routine of a coding operation performed by the CPU 301 of the image processing apparatus 310. First, in step S301 of FIG. 26, the image data of a non-interlaced image written to one of the first and second image data regions 303a and 303b of the RAM 303 is read out. Then, in step S302, the read-out non-interlaced image is converted into three signals of Y (luminance), Cb (color difference), and Cr (color difference). That is, the read-out non-interlaced image is subjected to so-called color conversion. Next, in step S303, two-dimensional DWT is performed as frequency conversion on the three Y, Cb, and Cr signals obtained by the color conversion. Then, in step S304, speed-based quantization is performed on the wavelet coefficients of each of the Y, Cb, and Cr color components obtained by the two-dimensional DWT. The contents of the speed-based quantization are described below in detail.

In step S305, the data of each of the Y, Cb, and Cr components after the speed-based quantization is subjected to entropy coding having the coefficient modeling and arithmetic coding defined by JPEG2000. Then, in step S306, after the entropy coding, the coded data written to the first or second coded data region 303c or 303d of the RAM 303 is stored on the HD 307.

Next, in step S307, a determination is made as to whether the image data of all the frames has been processed. If there still exists a frame (image data) to be processed (that is, "NO" in step S307), the operation returns to step S301, and the image data of a non-interlaced image that is written to the other one of the first and second image data regions 303a and 303b (that is, the first or second data region 303a or 303b different from the one from which the image data of the non-interlaced image was read out last time in step S301) is read out. If the image capturing by the video camera 308 is stopped, and the encoding of the image data of the non-interlaced image of the last frame (having the fields n−1 and n shown in FIG. 24) is completed (that is, "YES" in step S307), the coding operation ends.

Figure 27:
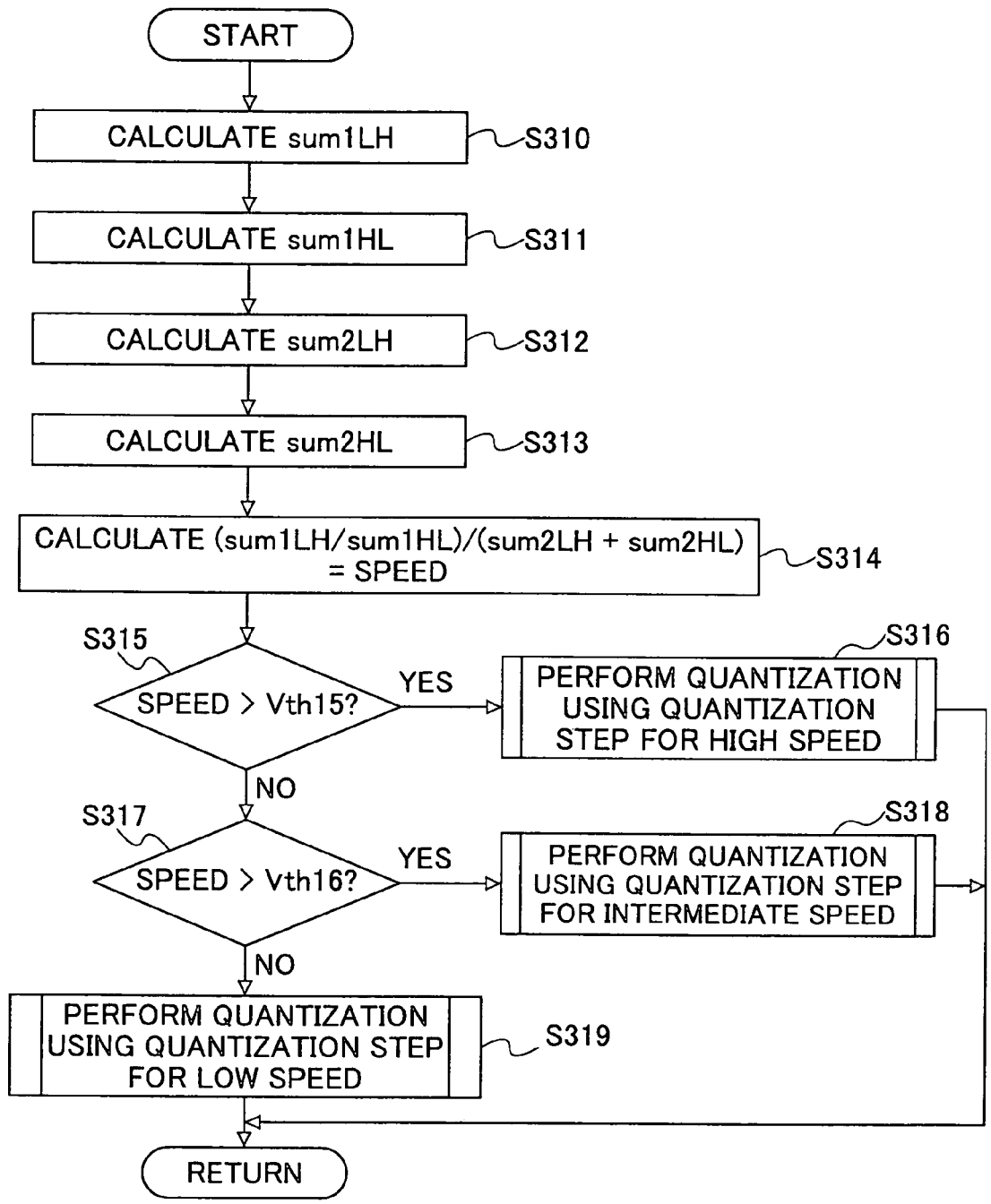
FIG. 27 is a flowchart of one embodiment of a speed-based quantization according to the first mode.

FIG. 27 is a flowchart of the speed-based quantization of step S304 of FIG. 26. In this operation, the in-frame object movement speed is determined based on the coefficients of the 1HL sub-band obtained by wavelet transform of Decomposition Level 1. Then, a different quantization step is specified for each sub-band, which is a unit of image quality control, based on the determination result, and quantization is performed using the specified quantization steps (quantization step values). More specifically, as the in-frame object movement speed increases, the value of a quantization step for the coefficients of a high-frequency component is reduced. As a result, the reproducibility of a comb-shaped image offset is improved. This prevents a single vertical line of an original image from becoming two separate lines in its reproduced image, and prevents horizontal blurring of the reproduced image. Further, the quantization step to be employed for each unit of image quality control is optimized based on the in-frame object movement speed, thereby realizing excellent data reduction without degrading the quality of the reproduced image.

Referring to FIG. 27, first, in step S310, the sum of the absolute values of the wavelet coefficients of the 1LH sub-band is calculated (sum 1LH). Next, in step S311, the sum of the absolute values of the wavelet coefficients of the 1HL sub-band is calculated (sum1HL). Next, in step S312, the sum of the absolute values of the wavelet coefficients of the 2LH sub-band is calculated (sum2LH). Next, in step S313, the sum of the absolute values of the wavelet coefficients of the 2HL sub-band is calculated (sum2HL). Then, in step S314, the value of (sum1LH/sum1HL)/(sum2LH/sum2HL) =SPEED is calculated.

The values of the 1LH coefficients increase in proportion to an increase in the amount of horizontal edge of the image, that is, an increase in the in-frame object movement speed, while values of the 1HL coefficients, which are in proportion to the amount of vertical edge of the image, are relatively stable since empirically, the object makes only horizontal movements in most cases. Accordingly, the value of sum1LH/sum1HL reflects the length of the comb-shaped offset part, that is, the movement (movement speed) of the object per unit time. Further, the wavelet coefficients of Decomposition Level 2 (2LH, 2HL, and 2LL) that are obtained based on the unit of two pixel lines with respect to the comb-shaped offset, may be considered to be relatively stable values irrespective of the object movement speed. Accordingly, the calculation performed in step 14 normalizes sum1LH/sum1HL by sum2LH/sum2HL, which is the ratio of the horizontal high frequency to the vertical high frequency other than the comb-shaped offset included in the original image. Therefore, it may be considered that the variable SPEED reflects the in-frame object movement speed with accuracy. If the original image includes many edges in addition to the comb-shaped offset, the coefficient values of the 1LH sub-band also increase. In such a case, it may be difficult to determine whether the 1LH coefficient values reflect the edges or the comb-shaped offset. Meanwhile, the 2LH coefficients are obtained by processing the image data based on the unit of two pixel lines together in order to reflect the edges more than the comb-shaped offset. Accordingly, by normalizing Decomposition Level 1 by Decomposition Level 2, the size of the comb-shaped offset can be determined.

Next, in step S315, a determination is made as to whether the variable SPEED calculated in step S314 is greater than an experimentally determined threshold Vth15. If SPEED is greater than Vth15 (that is, "YES" in step S315), in step S316, a quantization operation using a quantization step for high speed is performed. The quantization operation is performed on the wavelet coefficients of each of the Y, Cb, and Cr components of each of the sub-bands (LL, HL, LH, and HH) at each of the decomposition levels (1 through 5).

If SPEED is less than or equal to Vth15 (that is, "NO" in step S315), in step S317, a determination is made as to whether SPEED is greater than an experimentally obtained threshold Vth16 (<Vth15). If SPEED is greater than Vth16 (that is, "YES" in step S16), in step S318, a quantization operation using a quantization step for intermediate speed is performed.

If SPEED is less than or equal to Vth16 (that is, "NO" in step S317), in step S319, a quantization operation using a quantization step for low speed is performed.

After performing any of steps S316, S318, and S319, the operation returns to the main routine of FIG. 26.

Figure 28:
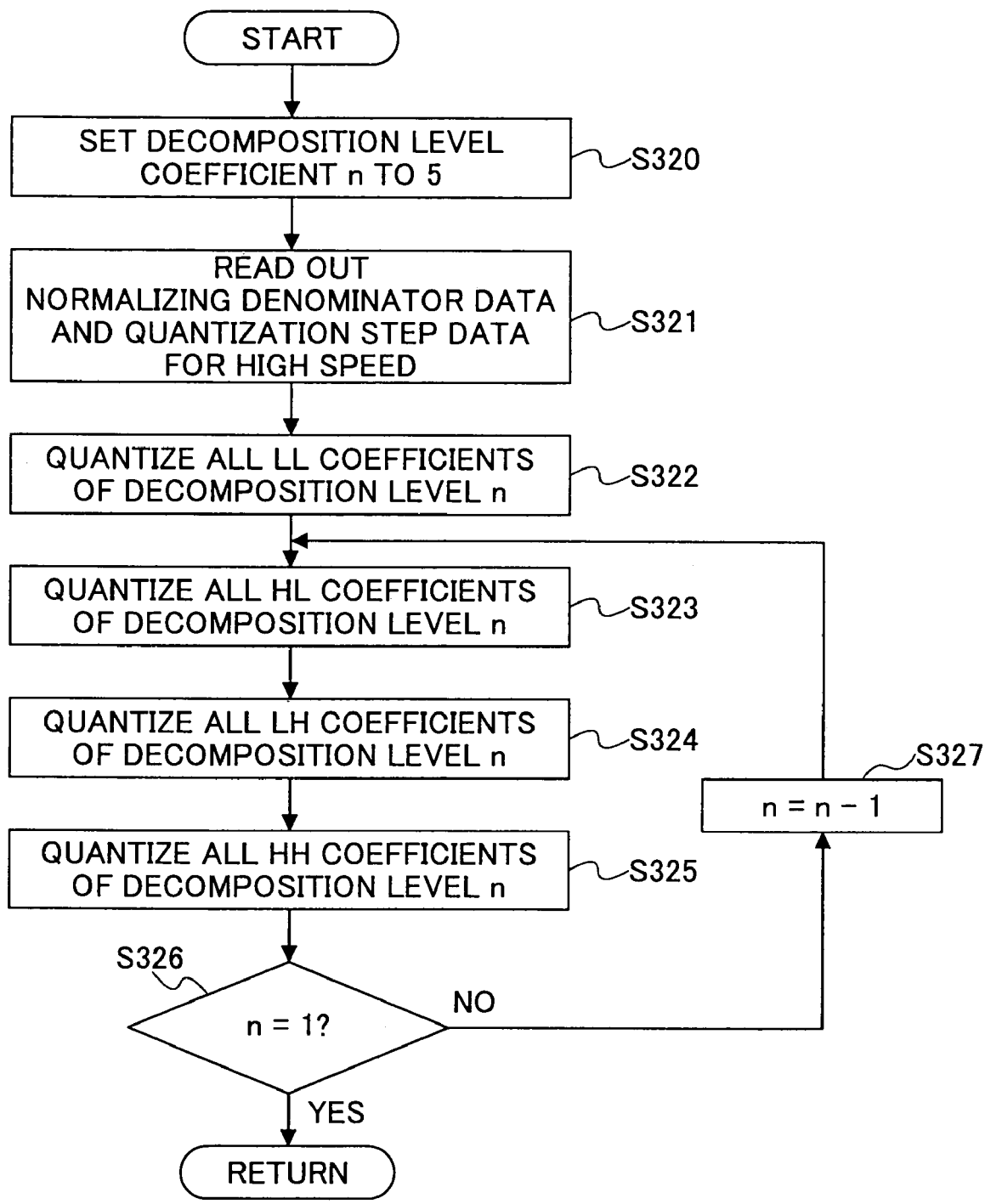
FIG. 28 is a flowchart of an embodiment of a quantization operation using a quantization step for high speed according to the first mode.

FIG. 28 is a flowchart of the quantization operation of step S316 of FIG. 27 using the quantization step for high speed.

First, in step S320, the value of a variable n indicating a decomposition level is set to 5. Next, in step S321, the data of the normalizing denominators corresponding to Decomposition Levels 1 through 5 of the Y, Cr, and Cb components shown in FIGS. 29A through 29C and the data of the weights for high speed corresponding to Decomposition Levels 1 through 5 of the Y, Cr, and Cb components shown in FIGS. 30A through 30C are read from the HD 307 into the work area (a space shown in FIG. 23) of the RAM 303.

Then, in step S322, all the wavelet coefficients of the LL sub-band of Decomposition Level n of each of the Y, Cb, and Cr components are successively quantized. Specifically, the quantized values q of the wavelet coefficients of the LL sub-band of Decomposition Level n are successively calculated component by component (with respect to each of the Y, Cb, and Cr components) using the below-described expression (1), and are stored in the work area of the RAM 303.

$$q = \text{sign}(a) * \lfloor |a/\Delta b| \rfloor \quad (1)$$

where q is a quantized value, a is a wavelet coefficient in a sub-band to be quantized, $\Delta b$ is a quantization step for a sub-band of Decomposition Level n and $\lfloor |a|/\Delta b \rfloor$ is a floor function converting the value of $|a|/\Delta b$ into the largest of all the integers smaller than or equal to $|a|/\Delta b$.

In this case, the quantization step ($\Delta b$) for the LL sub-band of Decomposition Level n of each of the Y, Cb, and Cr components is obtained by dividing the value of the normalizing denominator of the LL sub-band of Decomposition Level n of the corresponding one of FIGS. 29A through 29C by the value of the weight for high speed of the LL sub-band of Decomposition Level n of the corresponding one of FIGS. 30A through 30C. The values of the quantization step ($\Delta b$) obtained by this calculation are shown in FIGS. 31A through 31C.

Then, in step S323, all the wavelet coefficients of the HL sub-band of Decomposition Level n of each of the Y, Cb, and Cr components are successively quantized by the same procedure as in step 5322. Next, in step 5324, all the wavelet coefficients of the LH sub-band of Decomposition Level n of each of the Y, Cb, and Cr components are successively quantized by the same procedure as in step S322. Next, in step S325, all the wavelet coefficients of the HH sub-band of Decomposition level n of each of the Y, Cb, and Cr components are successively quantized by the same procedure as in step S322.

Then, in step S326, a determination is made as to whether n=1. If n≠1 (that is, "NO" in step S326), in step S327, one is subtracted from the coefficient n, and steps S323 through S325 are performed. On the other hand, if n=1 (that is, "YES" in step S326), the quantization operation ends, and the operation returns to the flowchart of FIG. 27.

The quantization operation of step S318 of FIG. 27 using the quantization step for intermediate speed is equal to the quantization operation of step S316 using the quantization step for high speed except that the data of the weights or weighting factors read out in step S318 from the HD 307 is changed from the data of FIGS. 30A through 30C for step S316 to data shown in FIGS. 32A through 32C. In step S318, the values of the quantization step $\Delta b$ are calculated in the same way as in step S316. Accordingly, a description of the overlapping part of steps S316 and 5318 is omitted.

That is, the same expression (1) is employed in the quantization operation of step S318 using the quantization step for intermediate speed, but the values of the quantization step $\Delta b$ are obtained as shown in FIGS. 33A through 33C by dividing the values of the normalizing denominators shown in FIGS.

29A through 29C by the weighting factors for intermediate speed shown in FIGS. 32A through 32C.

Likewise, the quantization operation of step S319 of FIG. 27 using the quantization step for low speed is equal to the quantization operation of step S316 using the quantization step for high speed except that the data of the weights or weighting factors read out in step S319 from the HD 307 is changed from the data of FIGS. 30A through 30C for step S316 to data shown in FIGS. 34A through 34C. In step S319, the values of the quantization step Δb are calculated in the same way as in step S316. Accordingly, a description of the overlapping part of steps 5316 and S319 is omitted.

That is, the same expression (1) is employed in the quantization operation of step S319 using the quantization step for low speed, but the values of the quantization step Δb are obtained as shown in FIGS. 35A through 35C by dividing the values of the normalizing denominators shown in FIGS. 29A through 29C by the weighting factors for low speed shown in FIGS. 34A through 34C.

The weighting factors or components for high speed, intermediate speed, and low speed of FIGS. 30A through 30C, 32A through 32C, and 34A through 34C employed in calculating the values of the quantization step Δb are set in order to increase the weights for the decomposition levels and the sub-bands of high-frequency bands that affect the resolution of a reproduced image as the object movement speed becomes higher so that the quantization of the comb-shaped offset part is suppressed to more extent for an image (object) moving at higher speed. That is, as the in-frame object movement speed becomes higher, the values of the quantization step Δb employed for quantizing the coefficients of the high frequency bands are decreased. By thus performing quantization suitably in accordance with the object movement speed, the rate of compression can be increased while preventing a decrease in image quality.

Further, the weighing components of FIGS. 30A through 30C, 32A through 32C, and 34A through 34C may be replaced by weighting components for high speed, intermediate speed, and low speed shown in FIGS. 36A through 36C, 36A through 36C, and 40A through 40C, respectively. The weighting components shown in FIGS. 36A through 36C, 36A through 36C, and 40A through 40C are set to suppress quantization, putting emphasis particularly on the LH components up to Decomposition Level 2. The values of the quantization step (Δb) in this case are as shown in FIGS. 37A through 37C for high speed, 38A through 38C for intermediate speed, and 41A through 41C for low speed, respectively. As a result, the reproducibility of the comb-shaped offset part can be further improved.

Second Mode

An image processing apparatus according to the second mode (not graphically represented) has the same basic configuration as the image processing apparatus 310 of FIG. 23 according to the first mode of the fourth embodiment. In the following description, the same elements as those of the image processing apparatus 310 are referred to by the same numerals. According to the second mode, in the coding operation performed by the CPU 301 controlling the image processing apparatus 310 of the first mode, the image processing apparatus reduces wavelet coefficients obtained by two-dimensional DWT based on the unit of a bit plane in accordance with a table determined based on the object movement speed. That is, the image processing apparatus of the second mode reduces the wavelet coefficients by replacing all the data of a target bit plane with 0s. More specifically, the number of bit planes to be reduced of the wavelet coefficients of each of high-frequency components such as 1HL and 1LH affecting the reproducibility of the edge part of an image is reduced in proportion to an increase in the object movement speed in a non-interlaced image in order to improve the reproducibility of a comb-shaped image offset appearing in the non-interlaced image.

FIG. 42 is a flowchart of the coding operation performed by the CPU 301 of the image processing apparatus according to the second mode. Referring to FIG. 42, first, in step S330, the image data of a non-interlaced image that has been written to the first or second image data region 303a or 303b of the RAM 303 is read out. Next, in step S331, the read-out image data of the non-interlaced image is converted into three signals of Y (luminance), Cb (color difference), and Cr (color difference). That is, the read-out non-interlaced image is subjected to so-called color conversion.

Next, in step S332, two-dimensional DWT is performed as frequency conversion on the three Y, Cb, and Cr signals obtained by the color conversion. Then, in step S333, scalar quantization based on JPEG2000 is performed on the wavelet coefficients of each of the Y, Cb, and Cr color components obtained by the two-dimensional DWT.

In step S334, the quantized wavelet coefficients of each of the Y, Cb, and Cr components are subjected to data reduction. In the data reduction of step S334, the quantized wavelet coefficients of each of the Y, Cb, and Cr components are decomposed sub-band by sub-band into bit planes, and the data of a bit plane that has little effect on a reproduced image is reduced based on the unit of a sub-band based on the in-frame object movement speed. An expatiation is given below of the data reduction of step S334.

After the speed-based data reduction of step S334, in step S335, the data of each of the Y, Cb, and Cr components is subjected to entropy coding (having the coefficient modeling and arithmetic coding) based on JPEG2000. Then, in step S336, the coded data written to the first or second coded data region 303c or 303d of the RAM 303 is stored on the HD 307 by the CPU 301.

Next, in step S337, a determination is made as to whether the image data of all the frames has been processed. If there still exists a frame (image data) to be processed (that is, "NO" in step S337), the operation returns to step S330, and the image data of a non-interlaced image that is written to the other one of the first and second image data regions 303a and 303b (that is, the first or second data region 303a or 303b different from the one from which the image data of the non-interlaced image was read out last time in step S330) is read out. If the image capturing by the video camera 308 is stopped, and the encoding of the image data of the non-interlaced image of the last frame (having the fields n−1 and n shown in FIG. 24) is completed, that is, the encoding of the image data of the non-interlaced images of all the frames is completed (that is, "YES" in step S337), the coding operation ends.

Figure 43:
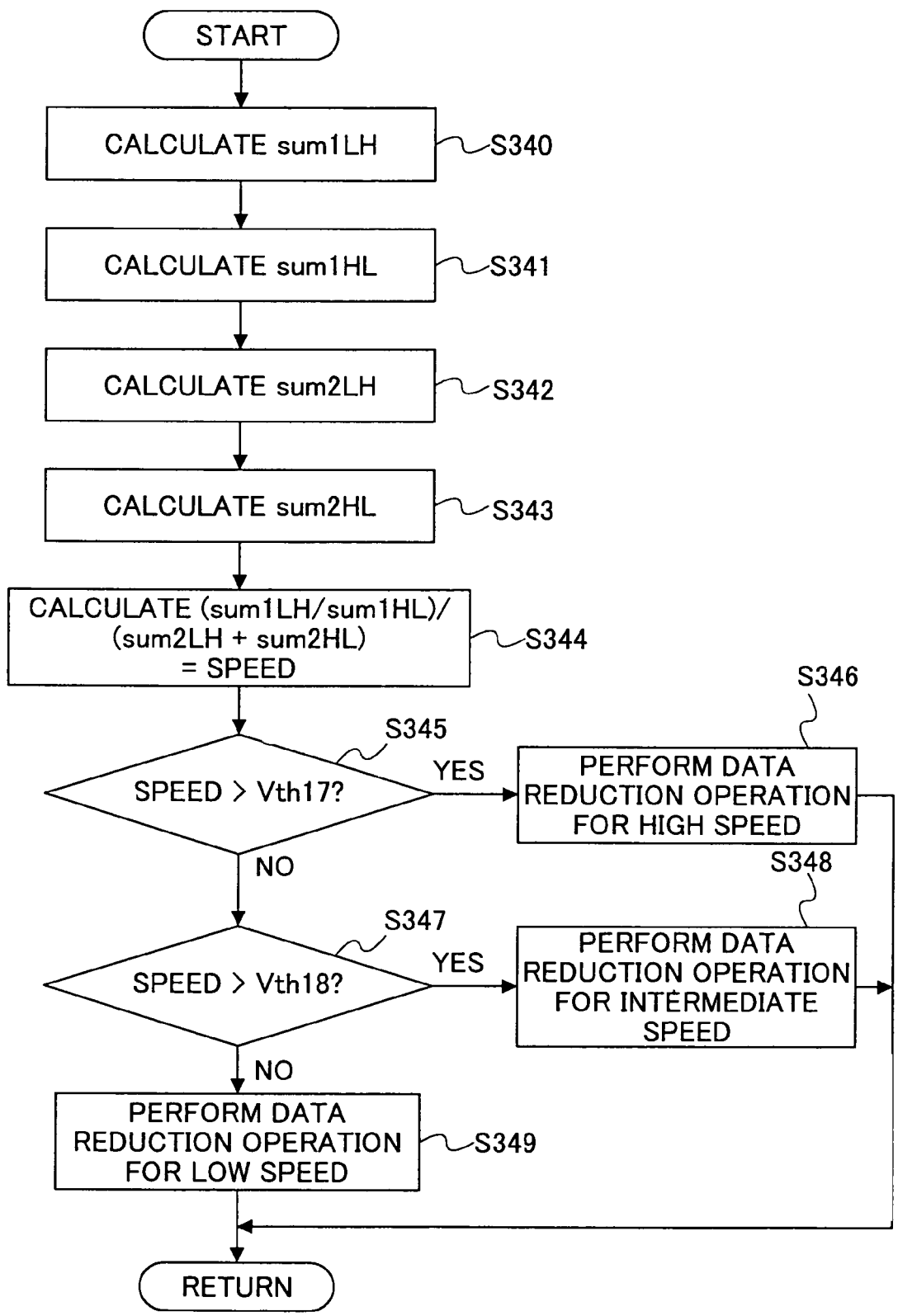
FIG. 43 is a flowchart of one embodiment of a speed-based data reduction according to the second mode.

FIG. 43 is a flowchart of the speed-based data reduction of step S334 of FIG. 42. Referring to FIG. 43, first, in step S340, the sum of the absolute values of the wavelet coefficients of the 1LH sub-band is calculated. This sum is referred to as sum1LH. Next, in step S341, the sum of the absolute values of the wavelet coefficients of the 1HL sub-band is obtained. This sum is referred to as sum1HL. Next, in step S342, the sum of the absolute values of the wavelet coefficients of the 2LH sub-band is obtained. This sum is referred to as sum2LH. Next, in step S343, the sum of the absolute values of the wavelet coefficients of the 2HL sub-band is obtained. This sum is referred to as sum2HL. Then, in step S344, the value of (sum1LH/sum1HL)/(sum2LH/sum2HL) is obtained as a variable SPEED.

Figure 44:
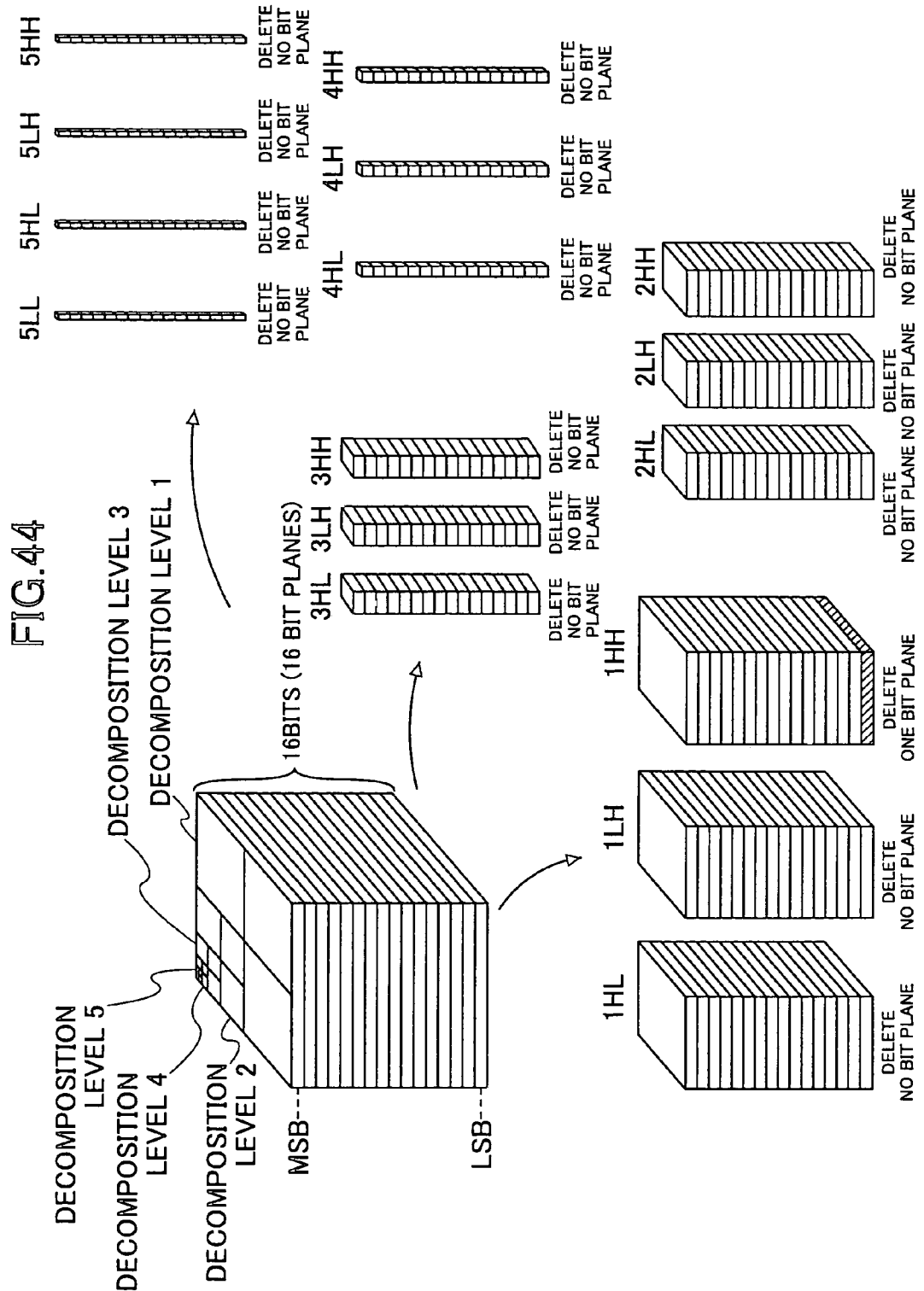
FIG. 44 is a diagram of one embodiment of a process for high speed bit truncation of the Y (luminance) component.

As previously described in the first mode, the variable SPEED calculated in step S344 is understood to be a value proportional to the in-frame object movement speed. Therefore, in step S345, a determination is made as to whether the variable SPEED is greater than an experimentally determined threshold Vth17. If SPEED is greater than Vth17 (that is, "YES" in step S345), the in-frame object movement speed is determined to be HIGH, and in step S346, a data reduction operation for high speed is performed. FIG. 44 is a diagram showing the bit truncation for high speed of the Y (luminance) component. Specifically, as shown in FIG. 44, the quantized wavelet coefficients of each of the Y, Cb, and Cr components are decomposed sub-band by sub-band into bit planes, and in each sub-band of each decomposition level, the data of as many lowest-order or least-significant bit planes including the LSB bit plane as the corresponding number of bit planes shown in FIGS. 45A through 45C is discarded (that is, the data of the target bit planes is replaced with 0s). For instance, for the wavelet coefficients of the Y component, the data of the LSB bit plane of the HH component of Decomposition Level 1, that is, the 1HH sub-band, is discarded. FIGS. 45A through 45C are tables showing bit plane truncation numbers ($\log_2(1/\text{weight})$) for high speed for the Y, Cb, and Cr components, respectively.

On the other hand, if SPEED is less than or equal to Vth17 (that is, "NO" in step S345), in step S347, a determination is made as to whether SPEED is greater than an experimentally determined value Vth18. If SPEED is greater than Vth18 (that is, "YES" in step S347), the in-frame object movement speed is determined to be INTERMEDIATE, and in step S348, a data reduction operation for intermediate speed is performed. Specifically, the quantized wavelet coefficients of each of the Y, Cb, and Cr components are decomposed sub-band by sub-band into bit planes, and in each sub-band of each decomposition level, the data of as many lowest-order or least-significant bit planes including the LSB bit plane as the corresponding number of bit planes shown in FIGS. 46A through 46C is discarded. For instance, for the wavelet coefficients of the Y component, the data of the LSB bit plane and the next bit plane (the lowest-order or least-significant two bit planes) of the HL component of Decomposition Level 1, that is, the 1HL sub-band, the data of the LSB bit plane and the next bit plane (the lowest-order or least-significant two bit planes) of the LH component of Decomposition Level 1, that is, the 1LH sub-band, and the data of the LSB bit plane and the next two bit planes (the lowest-order or least-significant three bit planes) of the HL component of Decomposition Level 1, that is, the 1HL sub-band, are discarded. FIGS. 46A through 46C are tables showing bit plane truncation numbers ($\log_2(1/\text{weight})$) for intermediate speed for the Y, Cb, and Cr components, respectively.

On the other hand, if SPEED is less than or equal to Vth18 (that is, "NO": in step S347), in step S349, a data reduction operation for low speed is performed. Specifically, the quantized wavelet coefficients of each of the Y, Cb, and Cr components are decomposed sub-band by sub-band into bit planes, and in each sub-band of each decomposition level, the data of as many lowest-order or least-significant bit planes including the LSB bit plane as the corresponding number of bit planes shown in FIGS. 47A through 47C is discarded. For instance, for the wavelet coefficients of the Y component, the data of the LSB bit plane and the next four bit planes (the lowest-order or least-significant five bit planes) of the HL component of Decomposition Level 1, that is, the 1HL sub-band, the data of the LSB bit plane and the next four bit planes (the lowest-order or least-significant five bit planes) of the LH component of Decomposition Level 1, that is, the 1LH sub-band, and the data of the LSB bit plane and the next seven bit planes (the lowest-order or least-significant eight bit planes) of the HL component of Decomposition Level 1, that is, the 1HL sub-band, are discarded. In addition, the data of the LSB bit plane of the HL component of Decomposition Level 2, that is, the 2HL sub-band, the data of the LSB bit plane of the LH component of Decomposition Level 2, that is, the 2LH sub-band, and the data of the LSB bit plane and the next bit plane (the lowest-order or least-significant two bit planes) of the HL component of Decomposition Level 2, that is, the 2HL sub-band, are discarded. FIGS. 47A through 47C are tables showing bit plane truncation numbers ($\log_2(1/\text{weight})$) for low speed for the Y, Ch, and Cr components, respectively.

After any of steps S346, S348, and S349 is completed, the operation returns to the main routine of FIG. 42.

As described above, according to the image processing apparatus of the second mode, the number of bit planes to be deleted of the wavelet coefficients of each of high-frequency components such as 1HL and 1LH is reduced as the object movement speed in a non-interlaced image increases in order to maintain the reproducibility of a comb-shaped image offset appearing in the non-interlaced image. As a result, data reduction can be achieved satisfactorily while preventing the degradation of a reproduced image.

Further, the bit plane truncation numbers (the numbers of bit planes to be deleted) of FIGS. 45A through 45C, 46A through 46C, and 47A through 47C may be replaced by bit plane truncation numbers for high speed, intermediate speed, and low speed shown in FIGS. 48A through 48C, 49A through 49C, and 50A through 50c, respectively. The bit plane truncation numbers shown in FIGS. 48A through 48C, 49A through 49C, and 50A through 50C are set to suppress data reduction, putting emphasis particularly on the LH components up to Decomposition Level 2. By performing bit plane truncation according to the tables of FIGS. 48A through 48C, 49A through 49C, and 50A through 50C, the reproducibility of a comb-shaped image offset appearing particularly in an object moving at high speed can be improved while maintaining good compression rates.

Third Mode

An image processing apparatus according to the third mode has the same basic configuration as the image processing apparatus 310 of FIG. 23 of the first mode. In the following description, the same elements as those of the image processing apparatus 310 are referred to by the same numerals. The image processing apparatus according to the third mode performs data reduction by discarding entropy codes (entropy-coded data) that finally become unnecessary based on the in-frame object movement speed until the amount of entropy codes reaches a projected value (a projected code amount or data size) set through a data size (DS) setting screen 350 of FIG. 56 for setting the projected data size. The entropy codes are discarded in the order of increasing significance based on the unit of the bit plane of the coefficients of a unit of image quality control such as a sub-band or a code block in the case of JPEG2000. At this point, the significance of the entropy codes is controlled in order to decrease the amount of low-order bit data to be discarded of the entropy-coded data of the coefficients of high-frequency bands that affect the reproducibility of the edge parts of an image as the object movement speed in a non-interlaced image increases.

Figure 51:
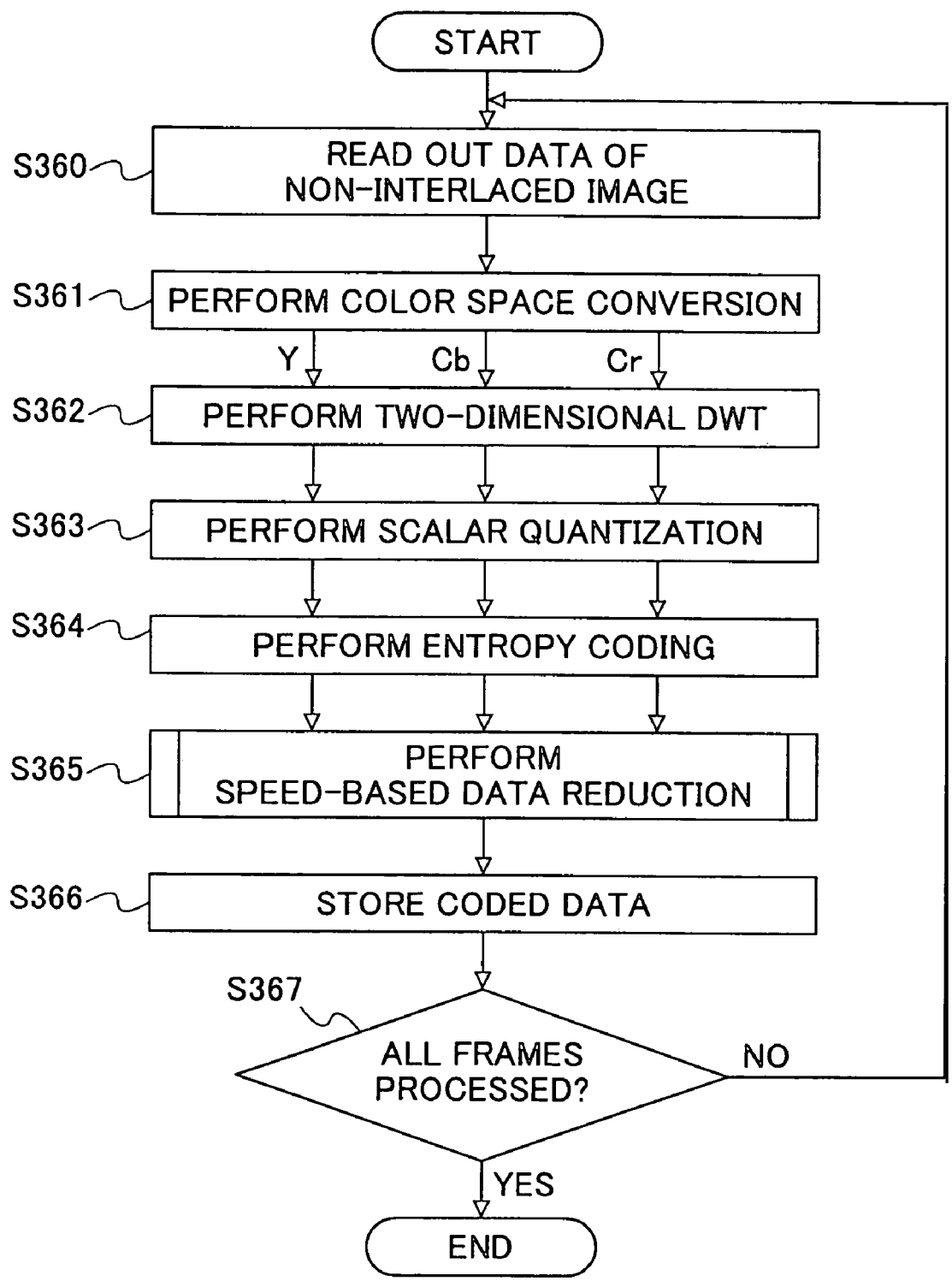
FIG. 51 is a flowchart of one embodiment of a coding operation performed by the CPU of an image processing apparatus according to a third mode.

FIG. 51 is a flowchart of the coding operation performed by the CPU 301 of the image processing apparatus according to the third mode. Referring to FIG. 51, first, in step S360, the image data of a non-interlaced image that has been written to the first or second image data region 303a or 303b of the RAM 303 is read out. Next, in step S361, the read-out image data of the non-interlaced image is converted into three signals of Y (luminance), Cb (color difference), and Cr (color difference). That is, the read-out non-interlaced image is subjected to so-called color conversion.

Next, in step S362, two-dimensional DWT is performed as frequency conversion on the three Y, Cb, and Cr signals obtained by the color conversion. Then, in step S363, scalar quantization based on JPEG2000 is performed on the wavelet coefficients of each of the Y, Cb, and Cr color components obtained by the two-dimensional DWT. In step S364, the quantized wavelet coefficients of each of the Y, Cb, and Cr components are subjected to entropy coding (having the coefficient modeling and arithmetic coding) based on JPEG2000.

Then, in step S365, the coded data obtained by the entropy coding (entropy-coded data) are subjected to data reduction. In the data reduction of step S365, the data of the bit planes of the code blocks of the entropy-coded data is discarded (that is, the data values are replaced with 0s) in ascending order of significance so that the amount of the entropy-coded data is less than a projected value. The code block, which is the unit of image quality control of the entropy-coded data, has a matrix of 32×32 pixels. An expatiation is given below of the data reduction of step S365.

After the speed-based data reduction of step S365, in step S366, the coded data written to the first or second coded data region 303c or 303d of the RAM 303 is stored on the HD 307 by the CPU 301.

Next, in step S367, a determination is made as to whether the image data of all the frames has been processed. If there still exists a frame (image data) to be processed (that is, "NO" in step S367), the operation returns to step S360, and the image data of a non-interlaced image that is written to the other one of the first and second image data regions 303a and 303b (that is, the first or second data region 303a or 303b different from the one from which the image data of the non-interlaced image was read out last time in step S360) is read out. If the image capturing by the video camera 308 is stopped, and the encoding of the image data of the non-interlaced image of the last frame (having the fields n−1 and n shown in FIG. 24) is completed, that is, the encoding of the image data of the non-interlaced images of all the frames is completed (that is, "YES" in step S367), the coding operation ends.

Figure 52:
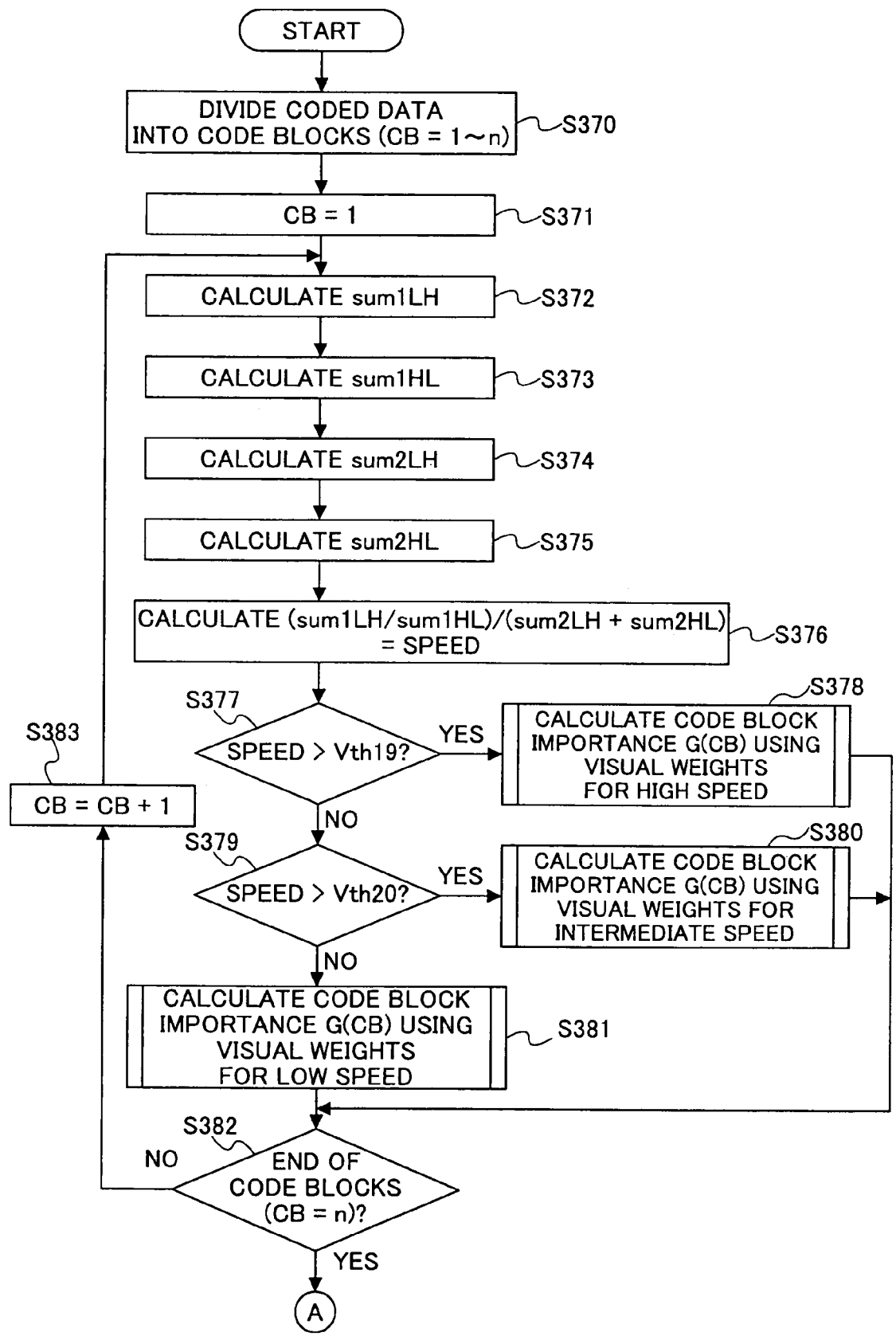
FIG. 52 is a flowchart of one embodiment of a speed-based data reduction according to the third mode.
Figure 53:
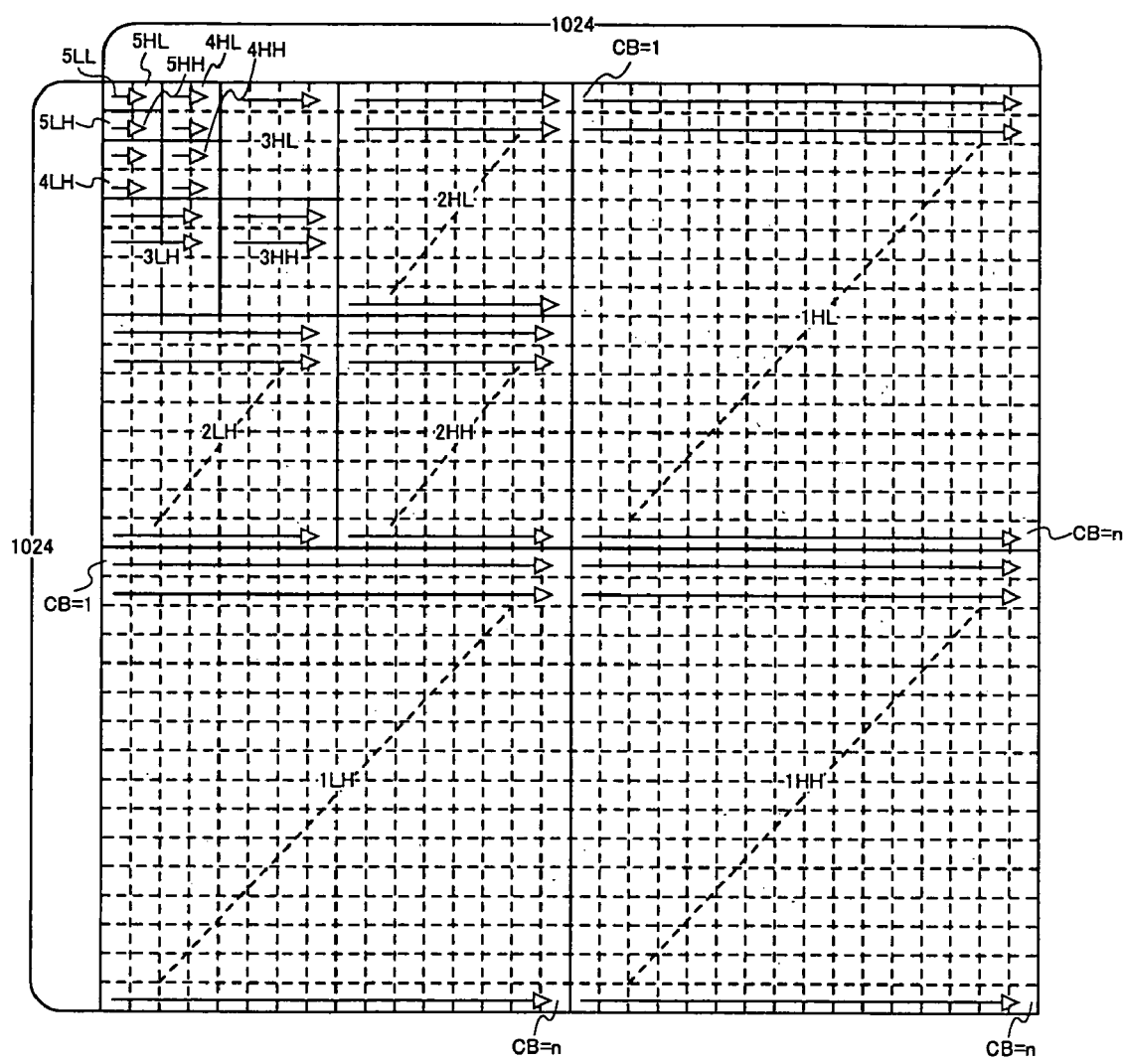
FIG. 53 is a diagram showing coded data divided into code blocks according to the third mode.

FIG. 52 is a flowchart of the speed-based data reduction of step S365 of FIG. 51. FIG. 53 is a diagram showing the coded data (entropy-coded data) divided into code blocks. Referring to FIG. 52, first, in step S370, the coded data is divided into code blocks each having a matrix of 32×32 pixels as shown in FIG. 53. Referring to FIG. 53, each of the 1LH, 1HL, and 1HH sub-bands are divided into n code blocks. For instance, in the case of image data of 1024×1024 pixels, the image data is divided into 1024 code blocks. In step S371, a variable CB specifying a code block is set to 1. In step S372, the sum of the absolute values of the coded data of the code block CB in the 1LH sub-band is calculated. This sum is referred to as sum1LH. Next, in step S373, the sum of the absolute values of the coded data of the code block CB in the 1HL sub-band is calculated. This sum is referred to as sum1HL. In step S374, the sum of the absolute values of the coded data of the code block CB in the 2LH sub-band is calculated. This sum is referred to as sum2LH. Next, in step S375, the sum of the absolute values of the coded data of the code block CB in the 2HL sub-band is calculated. This sum is referred to as sum2HL. Then, in step S376, the value of (sum1LH/sum1HL)/(sum2LH/sum2HL)=SPEED is calculated.

Figure 54:
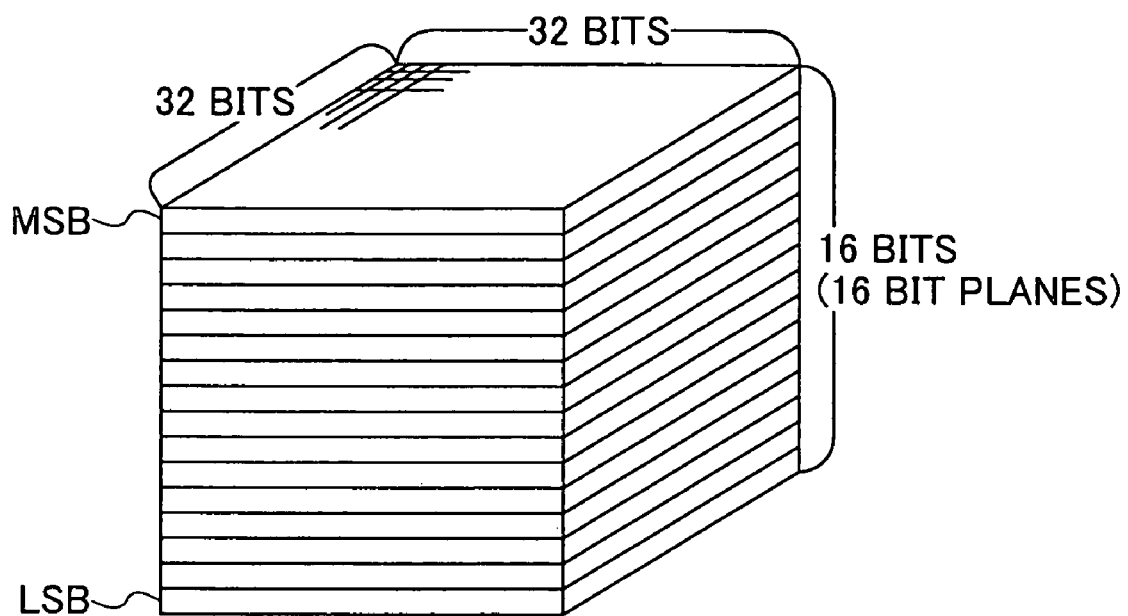
FIG. 54 is a diagram showing a code block decomposed into bit planes according to the third mode.

As previously described in the first mode, the variable SPEED calculated in step S376 is understood to be a value proportional to the in-frame object movement speed. Therefore, in step S377, a determination is made as to whether the variable SPEED is greater than an experimentally determined threshold Vth19. If SPEED is greater than Vth19 (that is, "YES" in step S377), the in-frame object movement speed is determined to be HIGH, and in step S378, the significance G(CB) of the code block CB is calculated using the visual weights for high speed shown in FIGS. 30A through 30C. The significance G(CB) of the code block CB is calculated for each of the sixteen bit planes of the code block CB of 32×32 bits as shown in FIG. 54. An expatiation is given below of this operation.

On the other hand, if SPEED is less than or equal to Vth19 (that is, "NO" in step S377), then, in step S379, a determination is made as to whether SPEED is greater than an experimentally determined threshold Vth20. If SPEED is greater than Vth20 (that is, "YES" in step S379), the in-frame object movement speed is determined to be INTERMEDIATE, and in step S380, the significance G(CB) of the code block CB is calculated using the visual weights for intermediate speed shown in FIGS. 32A through 32C. The significance G (CB) of the code block CB is calculated for each of the sixteen bit planes of the code block CB of 32×32 bits.

If SPEED is less than or equal to Vth20 (that is, "NO" in step S379), in step S381, the significance G(CB) of the code block CB is calculated using the visual weights for low speed shown in FIGS. 34A through 34C. The significance G(CB) of the code block CB is calculated for each of the sixteen bit planes of the code block CB of 32×32 bits.

Figure 55:
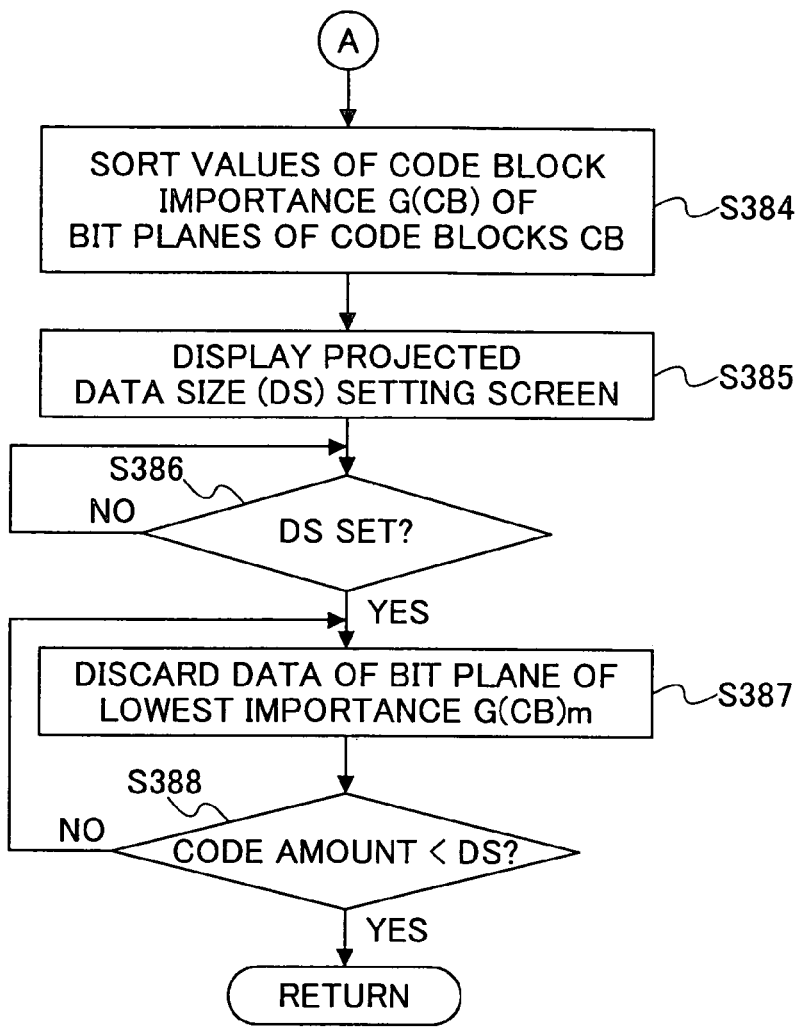
FIG. 55 is another flowchart showing the speed-based data reduction according to the third mode.

Then, in step S382, a determination is made as to whether CB=n. If CB≠D (that is, "NO" in step S382), in step S383, the variable CB is incremented by one, and the operation returns to step S372. On the other hand, if CB=n (that is, "YES" in step S382), the operation proceeds to step S384 of FIG. 55. In step S384, the values of the significance G(CB) of each code block CB which values are obtained for the sixteen bit planes of each of the n code blocks CB, that is, the values of the significance G(CB) for the n times sixteen (n×16) bit planes in total, are rearranged (sorted) in ascending order together with information indicating their respective code blocks CB and bit plane numbers m counted from the L8B bit plane as the first bit plane. The value of the significance G(CB) of the mth bit plane of each code block CB may be referred to as the significance G(CB) m.

Figure 56:
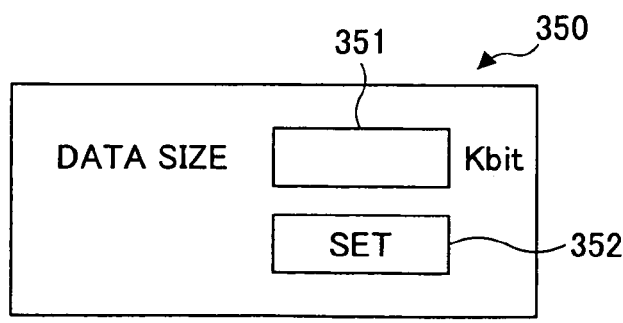
FIG. 56 is a diagram showing a projected data size (DS) setting screen displayed on a display according to the third mode.

After the sorting of step S384, in step S385, the projected data size (DS) setting screen 350 of FIG. 56 is displayed on the display 306.

Referring to FIG. 56, the projected data size, for instance, 150 (kbit), is set in a field 351 for setting the value of the projected data size DS provided in the setting screen 50 using the keyboard 304. Then, in step S386, a determination is made as to whether the projected data size DS is set. When a SET key 352 is clicked by the mouse 305 (that is, "YES" in step S386), in step S387, of the data of all the bit planes currently positioned furthest on the LSB side, the data of a bit plane having the lowest significance G(CB)m is discarded. Then, in step S388, a determination is made as to whether the amount of coded data obtained after discarding the bit plane data in step S387 is less than the projected data size DS set on the setting screen 350. If the amount of coded data obtained after discarding the bit plane data in step S387 is greater than or equal to the projected data size DS (that is, "NO" in step S388), the operation returns to step S387, and of the data of all the bit planes currently positioned furthest on the LSB side, the data of a bit plane having the lowest significance G(CB)m is discarded. If the amount of coded data obtained after discarding the bit plane data in step S387 is less than the projected data size DS (that is, "YES" in step S388), the speed-based data reduction operation ends, and the operation returns to the main routine of FIG. 51.

Figure 57:
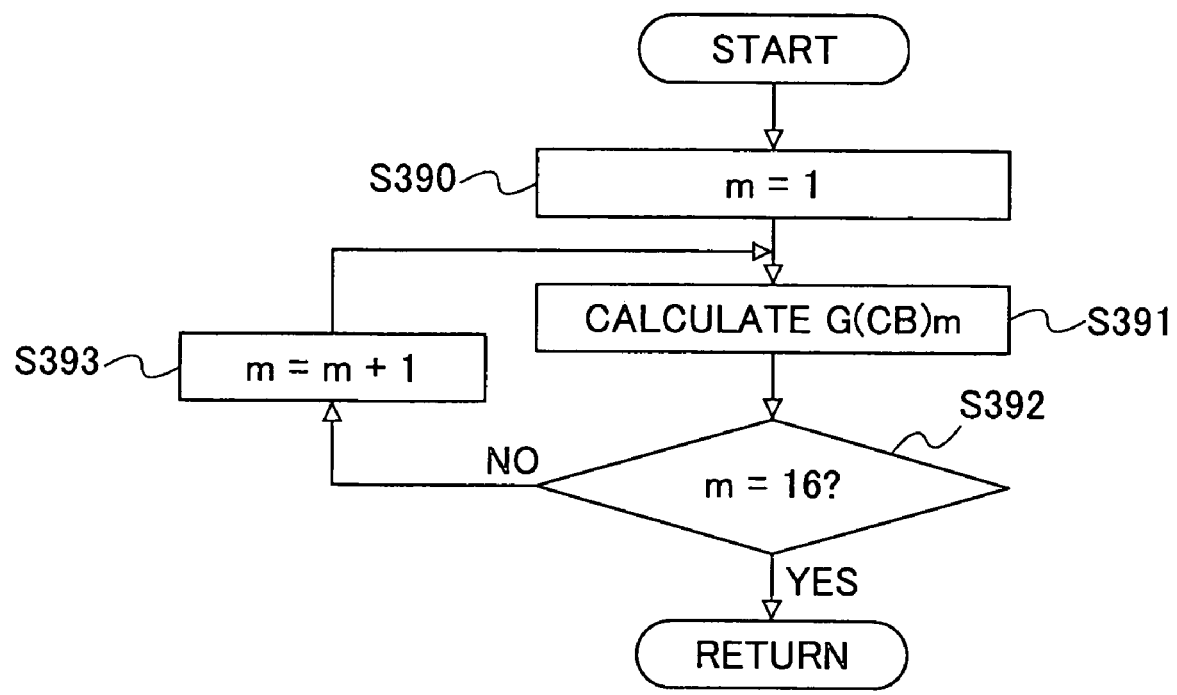
FIG. 57 is a flowchart of one embodiment of an operation for calculating code block significance using the visual weights for high speed according to the third mode.

FIG. 57 is a flowchart of the operation of step S378 of FIG. 52 for calculating the significance G(CB) of the code block CB using the visual weights for high speed. Referring to FIG. 57, first, in step S390, the variable m indicating the number of each of the bit planes (sixteen bit planes in this case) composing the code block CB which number is counted from the LSB bit plane as the first bit plane is set to 1. Then, in step S391, the significance G(CB)m of the data of the mth bit plane counted from the LSB bit plane as the first bit plane is obtained for the code block CB (CB=1n).

The significance G(CB)m may be obtained from the following arithmetic expression:

(an increase in quantization error in the case of discarding all the data of the mth bit plane of the code block CB×visual weight)/(the total amount of significant codes in the bit planes)

That is, the significance G(CB)m may be obtained from the following arithmetic expression:

[$\{2^{(m-1)}-2^{(m-2)}\}$×(the number of significant codes or coefficients included in the mth bit plane counted from the LSB bit plane as the first bit plane)× visual weight]/(the sum of the significant codes in the bit planes)

A description is given below of the reason the significance G(CB) may be approximated by the above-described arithmetic expressions. The increase in quantization error in the case of discarding al the data of the mth bit plane of the code block CE may be calculated by a variety of methods. For instance, one of such methods, which is mathematically strict, is disclosed in "JPEG2000: Image Compression Fundamentals, Standards and Practice," by D. S. Taubman and M. W. Marcellin, Kluwer Academic Publishers, 2002. However, according to the image processing apparatus 310 of this embodiment, quantization error per wavelet coefficient in the case of discarding the codes of the mth bit plane counted from the LSB bit plane as the first bit plane is approximated by $2^{(m-1)}$. This is because the discarding of the mth bit plane counted from the LSB bit plane as the first bit plane is equivalent to the dividing of the coefficients of the discarded bit plane by two in terms of error and the error per wavelet coefficient is $2^{(m-1)}$ in terms of probability.

Accordingly, "the increase in quantization error in the case of discarding the codes of the mth bit plane (counted from the LSB bit plane as the first bit plane) of the code block CB" may be approximated by $\{2^{(m-1)}-2^{(m-2)}\}$×(the number of significant coefficients included in the mth bit plane counted from the LSB bit plane as the first bit plane). Accordingly, the significance G(CB)m of the mth bit plane counted from the LSB bit plane as the first bit plane of the code block CB can be approximated by the arithmetic expression of [$\{2^{(m-1)}-2^{(m-2)}\}$×(the number of significant codes or coefficients included in the mth bit plane counted from the LSB bit plane as the first bit plane)×visual weight]/(the sum of the significant codes in the bit planes).

After calculating the significance G(CB), in step S391, in step S392, a determination is made as to whether the variable m=16. If m≠16 (that is, "NO" in step S392), in step S393, the variable m is incremented by one, and the operation returns to step S391, where the significance G(CB) of the next bit plane of the code block CB is obtained. If m=16 (that is, "YES" in step S392), that the values of the significance G(CB) of all the sixteen bit planes of the code block CB are determined to have been calculated, and the operation ends. Then, the operation returns to step S382 of. FIG. 52.

In the above-described case, the data of the bit planes of the code blocks CB is discarded in ascending order of the significance G(CB) from the data of the significant bit plane that is positioned furthest on the LSB side and has the lowest significance G(CB). Alternatively, the order of discarding bit plane data may be determined using Lagrange's method of undetermined multipliers, which is described in detail in "JPEG2000: Image Compression Fundamentals, Standards and Practice."

The operation of step S380 of FIG. 52 for calculating the significance G(CB)m of the code block CB using the visual weights for intermediate speed and the operation of step S382 of FIG. 52 for calculating the significance G(CB)m of the code block CB using the visual weights for low speed are equal to the operation of step S378 except that the visual weights of FIGS. 30A through 30C employed for the operation of step S378 are replaced by the visual weights of FIGS. 32A through 32C and the visual weights of FIGS. 34A through 34C in the operation of step S380 and the operation of step S382, respectively. Accordingly, a description of the overlapping part thereof is omitted.

The visual weights for high speed of FIGS. 30A through 30C, the visual weights for intermediate speed of FIGS. 32A through 32C, and the visual weights for low speed of FIGS. 34A through 34C may be replaced by the visual weights of FIGS. 36A through 36C, 38A through 38C, and 40A through 40C, respectively, which visual weights are set to suppress quantization, putting emphasis particularly on the LH components up to Decomposition Level 2. As a result, the reproducibility of the comb-shaped offset part can be further improved.

The expression of step S391 of FIG. 57 may be replaced by the expression of (an increase in quantization error in the case of discarding all the data of the mth bit plane of the code block CB×visual weight/masking factor)/(the total amount of significant codes in the bit planes). The masking factor is defined by (the sum of the absolute values of coefficients included in the code block CB/the number of coefficients included in the code block CB)$^\alpha$, where $\alpha$ satisfies $0<\alpha\leq1$ as a result of experiments. In this case, $\alpha=1$ may be employed.

Further, instead of the above-described masking factor, a factor obtained by the arithmetic expression of (the sum of the absolute values of the coefficients of the 1LH sub-band of the code block CB)/(the sum of the absolute values of the coefficients of the 1HL sub-band of the code block CB) or (the amount of codes of the 1LH sub-band of the code block CB)/(the amount of codes of the 1HL sub-band of the code block CB) may be employed as the index value of a comb-shaped offset appearing in (non-interlaced image.

As previously described, according to the image processing apparatus of the third mode, the significance of each bit plane of a code block as a unit of image quality control is determined after entropy coding, and bit plane data is discarded in ascending order of the significance (values) of the bit planes until the amount of entropy-coded data becomes less than the projected data size DS. At this point, the significance of the bit planes is controlled in order to decrease the amount of low-order bit data to be discarded of the entropy-coded data the coefficients of high-frequency bands that may degrade the reproducibility of the edge parts of an image as the object movement speed in a non-interlaced image increases. As a result, image compression can be realized satisfactorily with the least effect on a reproduced image.

Thus, the image processing apparatus and method of the fourth embodiment, which process a non-interlaced image (frame) generated from the interlaced images of two successive fields, can realize data reduction (including data reduction through quantization) in order to increase the reproducibility of a comb-shaped image offset appearing in the non-interlaced image in consideration of the human visual characteristics as the in-frame object movement speed increases.

FIFTH EMBODIMENT

Next, before a description is given of a fifth embodiment, a description will be given schematically of the "hierarchical coding algorithm" and the "JPEG2000 algorithm," which are the premises of the embodiments of the present invention.

Figure 58:
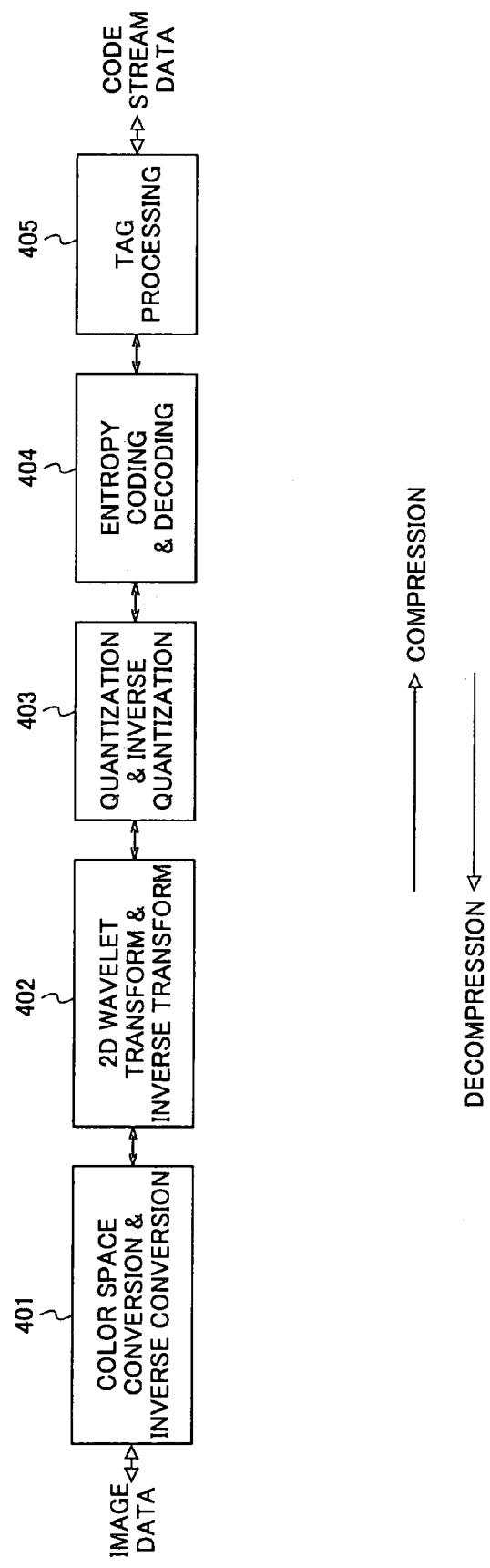
FIG. 58 is a functional block diagram of a system realizing one embodiment of a hierarchical coding algorithm that forms the basis of JPEG2000.

FIG. 58 is a functional block diagram of a system realizing the hierarchical coding algorithm that forms the basis of JPEG2000. This system includes a color space conversion and inverse conversion unit 401, a two-dimensional (2D) wavelet transform and inverse transform unit 402, a quantization and inverse quantization unit 403, an entropy coding and decoding unit 404, and a tag processing unit 405.

One of the major differences between this system and the conventional JPEG algorithm is the transform method. JPEG employs discrete cosine transform (OCT) while the hierarchical coding algorithm employs DWT in the 20 wavelet transform and inverse transform unit 402. Compared with OCT, DWT enjoys the advantage of excellent image quality in a highly compressed region. This advantage is one of the major reasons DWT is employed in JPEG2000, which is a successor algorithm to JPEG.

Another major difference is that the hierarchical coding algorithm additionally includes a functional block called the tag processing unit 405 at the final stage of the system in order to form codes. The tag processing unit 405 generates compressed data as code stream data at the time of compression and interprets code stream data necessary for decompression at the time of decompression. The code stream data allows JPEG2000 to realize a variety of convenient functions. For instance, as shown in FIG. 60, the compression and decompression of a still image can be stopped at discretion at any of the hierarchies (decomposition levels) corresponding to the octave division in block-based DWT.

The unit for inputting and outputting an original image is often connected to the color space conversion and inverse conversion unit 401 of FIG. 58. For instance, the color space conversion and inverse conversion unit 401 converts the RGB calorimetric system made up of primary color system components of red (R), green (G), and blue (B) or the YMC colorimetric system made up of complementary color system components of yellow (Y), magenta (M), and cyan (C) to the YUV or YCbCr calorimetric system, or performs the inverse conversion thereof.

Next, a description will be given of the JPEG2000 algorithm.

Figure 59:
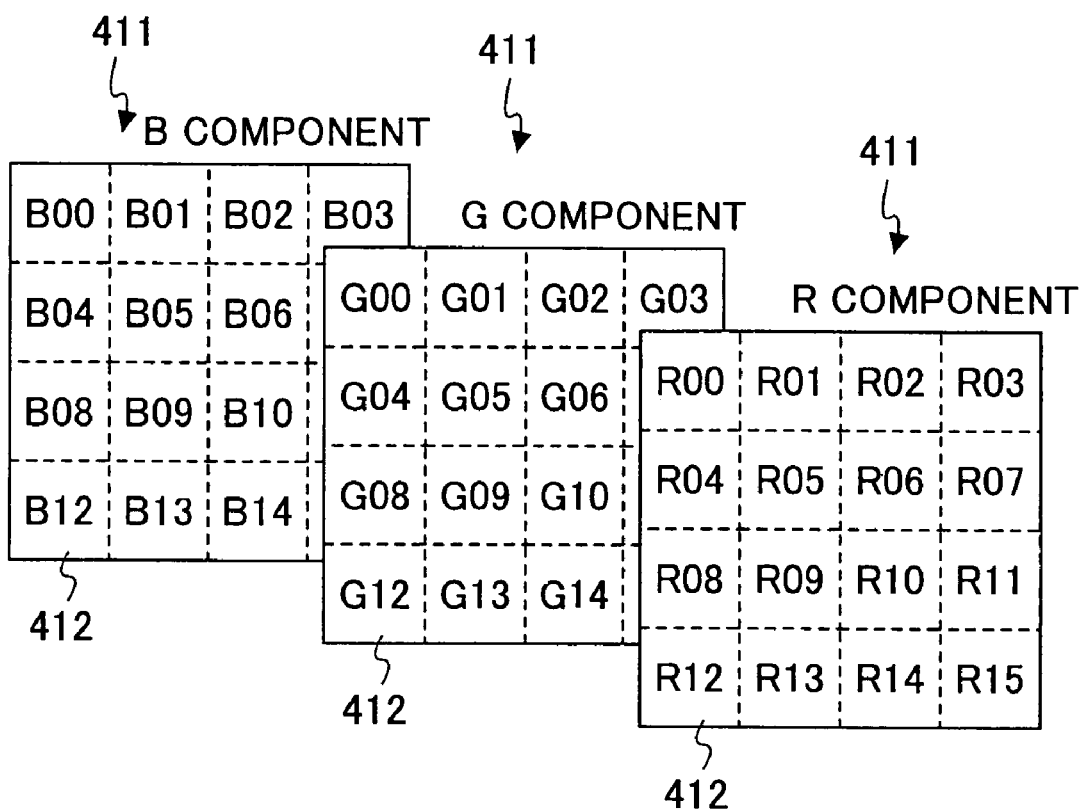
FIG. 59 is a diagram for illustrating rectangular regions of each component of an original image according to JPEG2000.

Referring to FIG. 59, generally, in a color image, each component 411 (RGB primary color system in this case) of the original image is divided into rectangular regions 412. Generally, the rectangular regions 412 are referred to as blocks or tiles. Since the rectangular regions 412 are generally referred to as tiles in JPEG2000, the rectangular regions 412 are hereinafter referred to as tiles. In the case of FIG. 59, each component 411 is divided into 16(4×4) rectangular tiles 412. Each of the tiles 412 (R00, R01, ..., R15, G00, G01, ..., GIS, B00, B01, ..., B15 in FIG. 59) becomes a basic unit in the image data compression and decompression process. Accordingly, the compression and decompression of image data is performed independently for each component 411 and each tile 412.

At the time of encoding the image data, the data of each tile 412 of each component 411 is input to the color space conversion and inverse conversion unit 401 and subjected to color space conversion. Thereafter, the data is subjected to 2D wavelet transform (forward transform) in the 2D wavelet transform and inverse transform unit 402 and spatially divided into frequency bands.

FIG. 60 is a diagram showing the sub-bands of each decomposition level in the case where the number of decomposition levels is three. That is, the 2D wavelet transform is performed on the tile original image (OLL) of Decomposition Level 0 obtained by dividing the original image into tiles, so that the sub-bands (1LL, 1HL, 1LH, and 1HH) shown at Decomposition Level 1 are separated. Successively thereafter, the 2D wavelet transform is performed on the low-frequency component of 1LL at this level so that the sub-bands (2LL, 2HL, 2LH, and 2HH) shown at Decomposition Level 2 are separated. Similarly, the 2D wavelet transform is performed on the low-frequency component of 2LL so that the sub-bands (3LL, 3HL, 3LH, and 3HH) shown at Decomposition Level 3 are separated. In FIG. 60, the sub-bands to be subjected to encoding are indicated by hatching at each decomposition level. For instance, when the number of decomposition levels is three, the hatched sub-bands (3HL, 3LH, 3HH, 2HL, 2LH, 2HH, 1HL, 1LH, and 1HH) are to be subjected to encoding and the 3LL sub-band is not to be encoded.

Next, the target bits to be encoded are determined in a specified order of encoding, and context is generated from the peripheral bits of each target bit in the quantization and inverse quantization unit 403.

Figure 61:
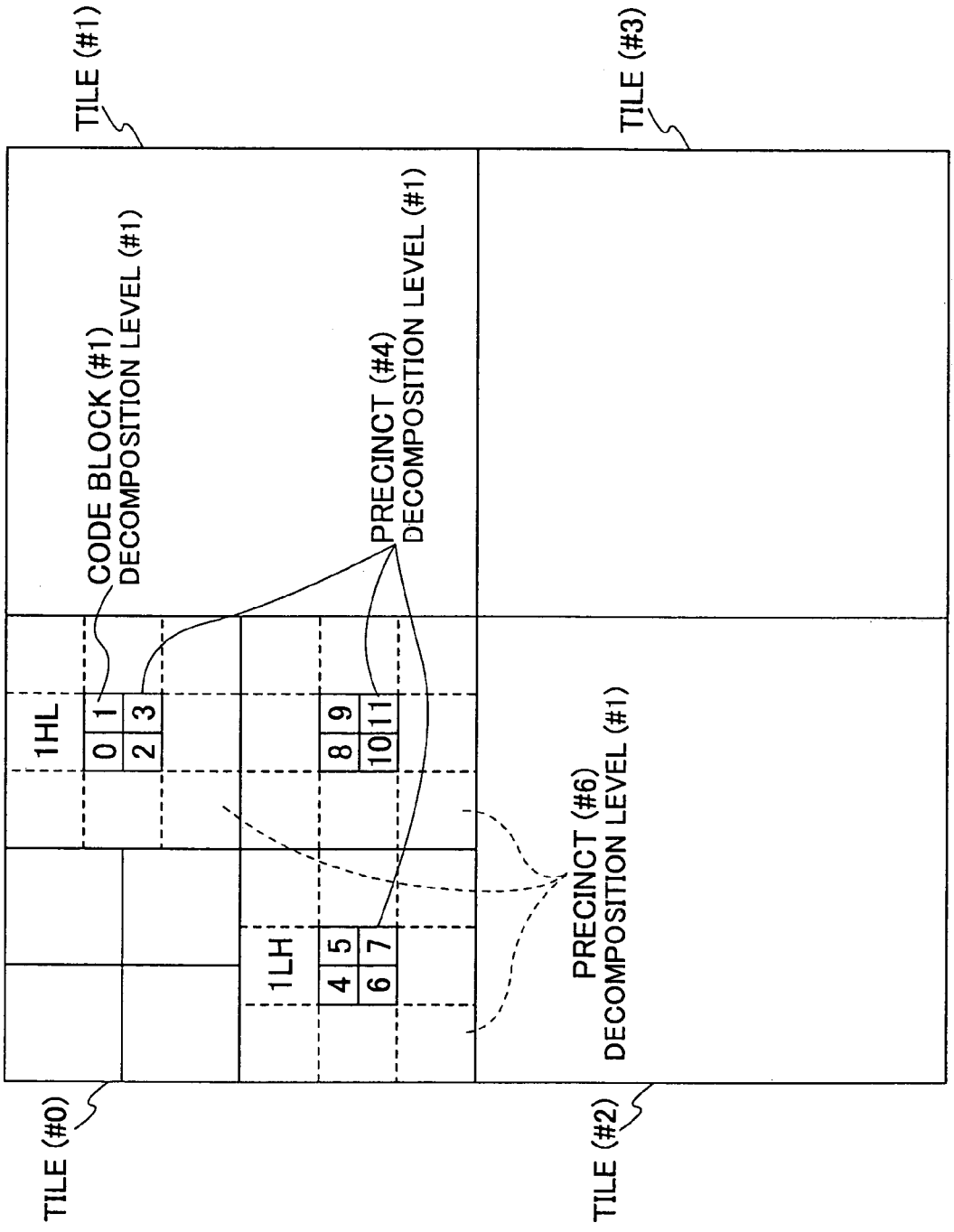
FIG. 61 is a diagram for illustrating a precinct according to JPEG2000.

The quantized wavelet coefficients are divided into non-overlapping rectangles called "precincts" sub-band by sub-band. The precincts are introduced to effectively utilize memory upon implementation. As shown in FIG. 61, each precinct is composed of three spatially matching rectangular regions. Further, each precinct is divided into non-overlapping rectangular "code blocks." Each code block becomes a basic unit in performing entropy coding.

The coefficient values after the wavelet transform may directly be quantized and encoded. In order to improve encoding efficiency, however, JPEG2000 decomposes the coefficient values into units called "bit planes," which may be placed in order in each pixel or code block.

Figure 62:
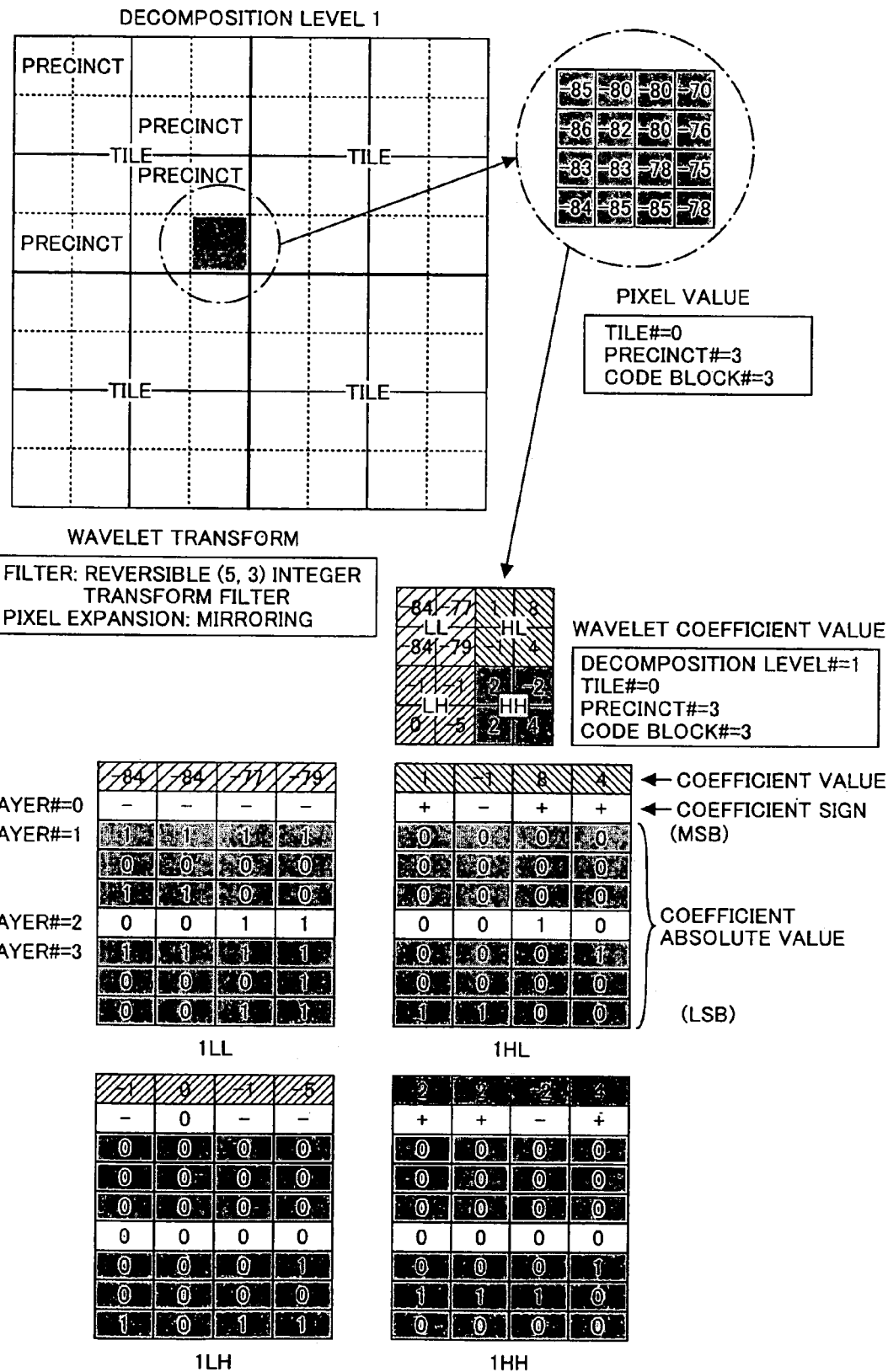
FIG. 62 is a diagram for illustrating a process for placing bit planes in order according to JPEG2000.

FIG. 62 is a diagram for illustrating a process for placing the bit planes in order. Referring to FIG. 62, an original image of 32×32 pixels is divided into four tiles each of 16×16 pixels in this case. The sizes of each precinct and each code block at Decomposition Level 1 are 8×8 and 4×4 pixels, respectively. The precincts and the code blocks are respectively numbered according to raster scan order. In this case, numbers 0 to 3 are assigned to the precincts and numbers 0 to 3 are assigned to the code blocks. A mirroring method is employed in pixel expansion beyond a tile boundary, and wavelet transform is performed with a reversible (5, 3) integer transform filter so that the wavelet coefficients of Decomposition Level 1 are obtained.

Further, FIG. 62 also shows a conceptual typical "layer" structure with respect to Tile 0, Precinct 3, and Code Block 3. The transformed code block 3 is divided into sub-bands (1LL, 1HL, 1LH, and 1HH), and the sub-bands are allocated their respective wavelet coefficient values.

The layer structure is easier to understand when the wavelet coefficient values are viewed horizontally along each bit plane. One layer is composed of an arbitrary number of bit planes. In this case, the layers 0, 1, 2, and 3 are composed respectively of one, three, one, and three bit planes. A layer including a bit plane closer to the LSB (least significant bit) bit plane is subjected to the quantization earlier, and a layer including a bit plane closer to the MSB (most significant bit) bit plane is subjected to the quantization later. The method of discarding layers in the order of closeness to the LSB bit plane is called truncation, by which the rate of quantization can be finely controlled.

The entropy coding and decoding unit 404 of FIG. 58 performs encoding on the tiles 412 of each component 411 by probability estimation from the context and the target bits. Thus, the encoding is performed based on the unit of the tile 412 for each component 411 of the original image. Finally, the tag processing unit 405 connects all the coded data supplied from the entropy coding and decoding unit 404 into a single coded data stream (code stream data), and adds a tag thereto.

Figure 63:
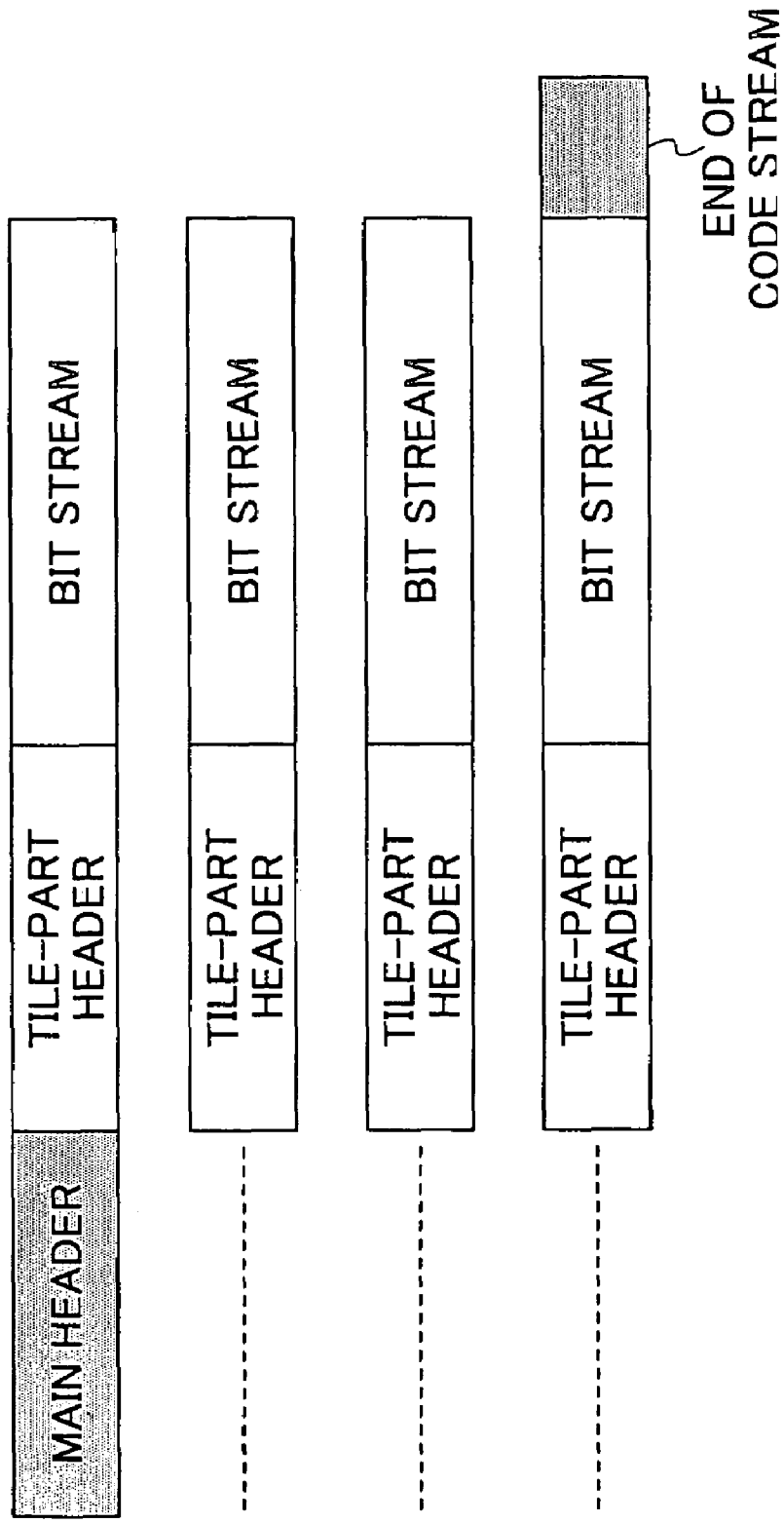
FIG. 63 is a schematic diagram showing a frame structure of code stream data according to JPEG2000.

FIG. 63 is a schematic diagram showing a frame structure of the code stream data. Tag information called a main header is added to the head of the code stream data, and tag information called a tile-part header is added to the head of each of the coded data (bit stream) of each tile 412. The tile-part header indicates a tile boundary position and a tile boundary direction and is followed by the coded data of the corresponding tile 412. Coding and quantization parameters are written to the main header. Another tag (end of code stream) is added to the terminal end of the code stream data.

On the other hand, the coded data is decoded in the opposite order to that the coded data is encoded, being generated from the code stream data of the tiles 412 of each component 411. In this case, the tag processing unit 405 interprets the tag information added to the code stream data input from the outside. Then, the tag processing unit 405 decomposes the input code stream data into the code stream data of the tiles 412 of each component 411, and decodes (decompresses) the code stream data based on the unit of the tile 412 for each component 411. At this point, the positions of the target bits to be subjected to the decoding are determined according to the order based on the tag information within the code stream data, and the quantization and inverse quantization unit 403 generates context from the arrangement of the peripheral bits (already decoded) of the position of each target bit. The entropy coding and decoding unit 404 performs decoding based on probability estimation from the context and the code stream data in order to generate the target bits, and writes the target bits to their respective positions. The thus decoded data is spatially divided in every frequency band. Therefore, each tile 412 of each component 411 of the image data can be restored by subjecting the decoded data to 2D wavelet inverse transform in the 20 wavelet transform and inverse transform unit 402. The color space conversion and inverse conversion unit 401 converts the restored data to the image data of the original calorimetric system.

Figure 64:
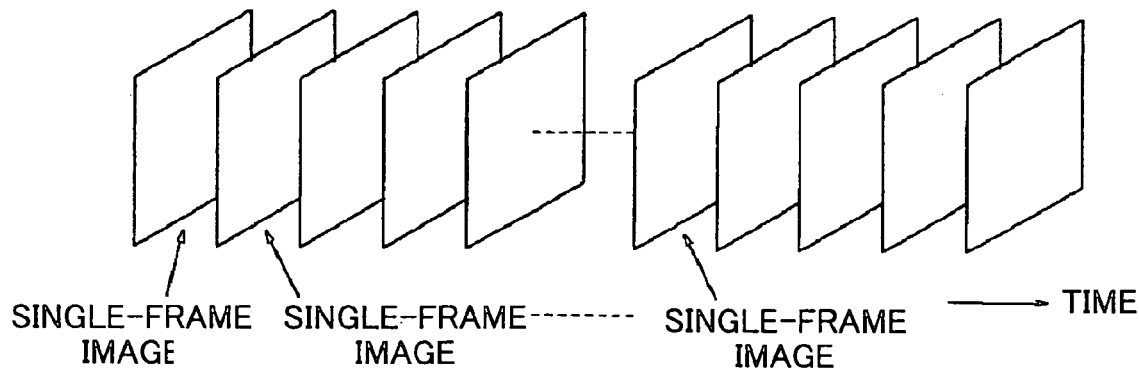
FIG. 64 is a diagram for illustrating the concept of Motion JPEG2000.

The outline of the "JPEG2000 algorithm" is thus described. In the "Motion JPEG2000 algorithm" the "JPEG2000 algorithm," which is applied to a still image, or a single frame, is extended to be applied to a plurality of frames. That is, as shown in FIG. 64, "Motion JPEG2000" successively displays single-frame JPEG2000 images at a predetermined frame rate as a moving image.

A description is given below of the fifth embodiment according to the present invention. The following description relates to the moving image compression and decompression technique represented by Motion JPEG2000. However, the present invention is not limited to the contents of the following description.

Figure 65:
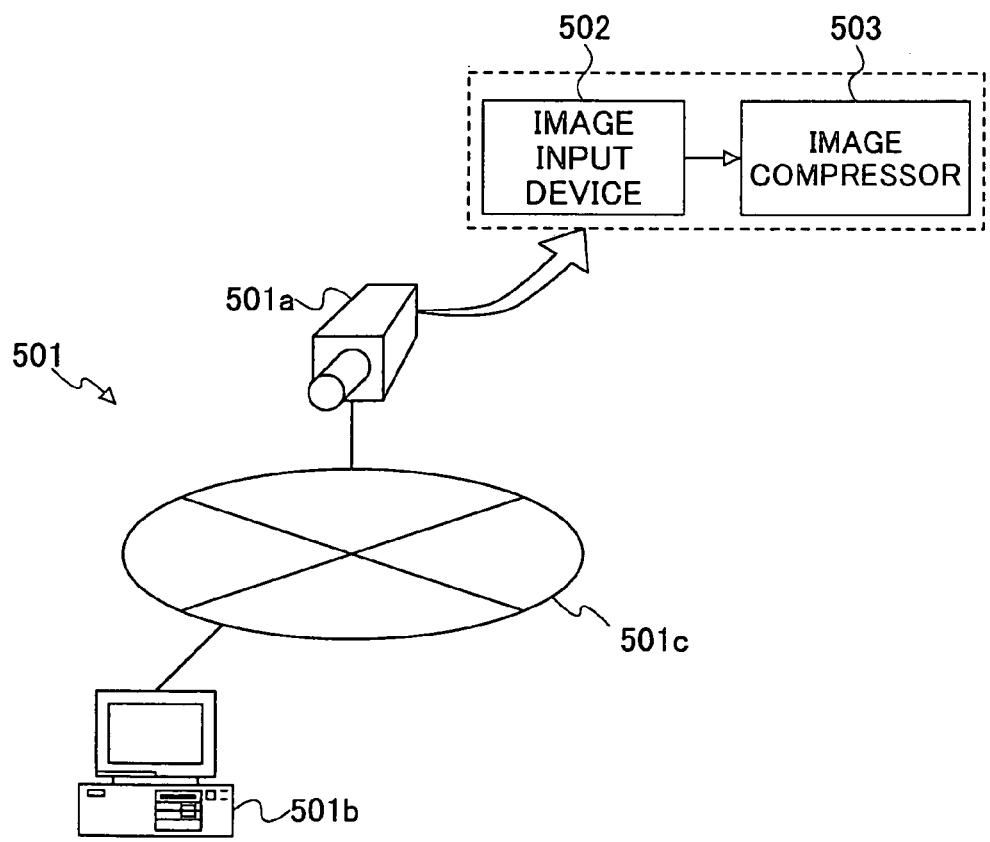
FIG. 65 is a block diagram of one embodiment of a movie camera system.

FIG. 65 is a block diagram showing a configuration of a movie camera system 501 to which the present invention is applied. Referring to FIG. 65, the movie camera system 501, to which a moving image display system of the present invention is applied, includes an image recorder 501a such as a movie camera and a moving image reproducer 501b such as a personal computer, the image recorder 501a and the moving image reproducer 501b being connected by a network 501c such as the Internet.

A description is given below of the image recorder 501a. The moving image reproducer 501b may be of a standard system that can decompress code stream data compressed according to Motion JPEG2000. Therefore, a detailed description thereof is omitted.

Referring to FIG. 65, the image recorder 501a includes an image input device 502 that captures a moving image and an image compressor 503 that compresses and encodes the captured image data. The image compressor 503 realizes an image processing apparatus that compresses moving image data according to the present invention.

Figure 66:
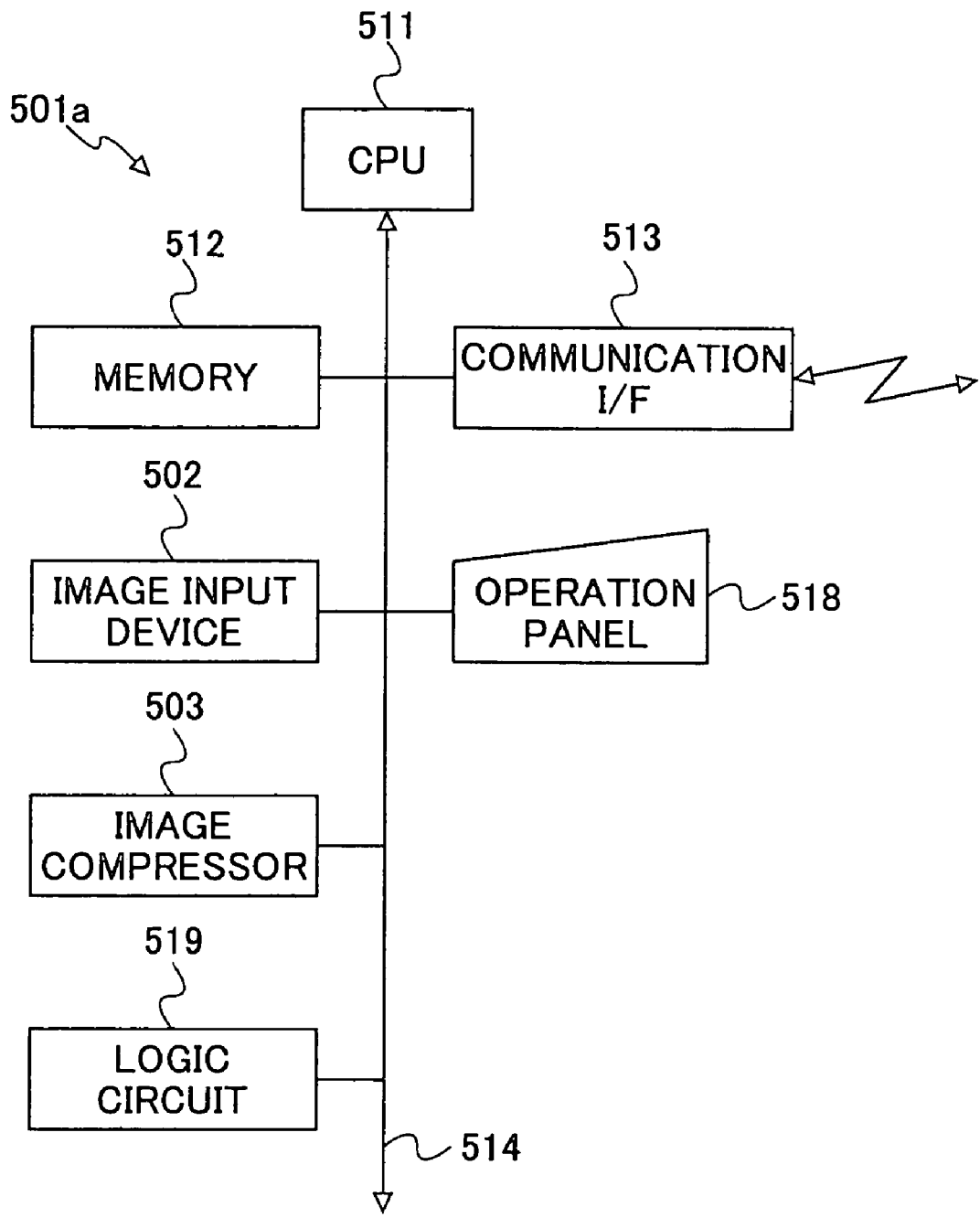
FIG. 66 is a block diagram showing a hardware configuration of one embodiment of an image recorder of the movie camera system.

FIG. 66 is a block diagram showing a hardware configuration of the image recorder 501a. Referring to FIG. 66, the image recorder 501a includes a CPU (central processing unit) 511, a memory 512, a predetermined communication interface (I/F) 513, an operation panel 518, the image input device 502, the image compressor 503, and a logic circuit 519. The CPU 511 performs centralized control of each unit of the image recorder 501a. The memory 512 has a variety of ROMs (read-only memories) and RAMs (random access memories). The communication I/F 513 performs communication with the network 501c. The operation panel 518 receives a variety of operations by a user. The memory 512, the communication I/F 513, the operation panel 518, the image input device 502, the image compressor 503, and the logic circuit 519 are connected to the CPU 511 via a bus 514.

Control programs including a moving image processing program for processing a moving image are stored in (a ROM) of the memory 512 of the image recorder 501a. The moving image processing program realizes a program according to the present invention The function of a code stream conversion apparatus according to the present invention is realized by the processing performed based on the moving image processing program by the CPU 511.

Any of media of a variety of types, such as optical disks including CDs and DVDs, magneto-optical disks, magnetic disks including flexible disks, and semiconductor memory devices, may be employed as the memory 512 according to the present invention. Alternatively, the moving image processing program may be downloaded from the network 501c to be installed in the memory 512. In this case, the storage device that stores the moving image processing program on the transmitter-side server is also a storage medium according to the present invention. The moving image processing program may operate on a predetermined OS (operating system). In this case, part of later-described operations may be executed by the OS. Alternatively, the moving image processing program may be included in a group of program files composing a predetermined application software program or OS.

Next, a brief description is given of the operation of each unit of the image recorder 501a. First, the image input device 502 of the image recorder 501a captures a moving image based on the unit of a frame using a photoelectric transducer device such as a CCD or a MOS image sensor, and outputs the digital pixel value signal of the moving image to the image compressor 503.

Figure 67:
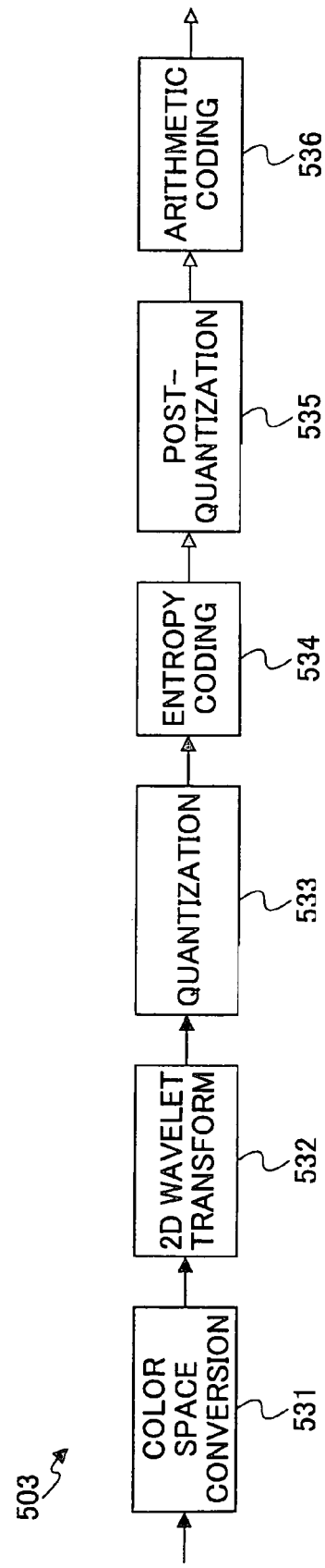
FIG. 67 is a block diagram showing a configuration of one embodiment of an image compressor of the image recorder.

The image compressor 503 compresses and encodes the digital pixel value signal of the moving image in accordance with the Motion JPEG2000 algorithm. FIG. 67 is a block diagram showing a configuration of the image compressor 503. Referring to FIG. 67, the image compressor 503 includes a color space conversion unit 531, a 2D wavelet transform unit 532, a quantization unit 533, an entropy coding unit 534, a post-quantization unit 535, and an arithmetic coding unit 536. The functions of each of these units 531 through 536 are realized by the processing performed based on the moving image processing program by the CPU 511. In the case of putting emphasis on being real-time, it is necessary to perform the processing at higher speed. Therefore, it is desirable that the functions of each unit be realized by the operation of the logic circuit 519.

Next, a brief description is given of the operation of each unit of the image compressor 503. In the color space conversion unit 531, the components of the digital pixel value signal of the moving image input from the image input device 502 is converted from R, G, and B to Y, U, and V or Y, Cb, and Cr. Then, the 2D wavelet transform unit 532 performs 2D wavelet transform on each of the color components. Then, the quantization unit 533 divides the wavelet coefficients by appropriate quantization denominators and the entropy coding unit 534 generates lossless codes. Then, the post-quantization unit 535 performs bit truncation (the discarding of code data), and the arithmetic coding unit 536 generates codes in the code format of JPEG2000. Through this series of operations, the image data of each of the R, G, and B components of the original moving image is divided into one or more tiles (normally a plurality of tiles) frame by frame, and is hierarchically compressed and coded into coded data tile by tile.

Figure 68:
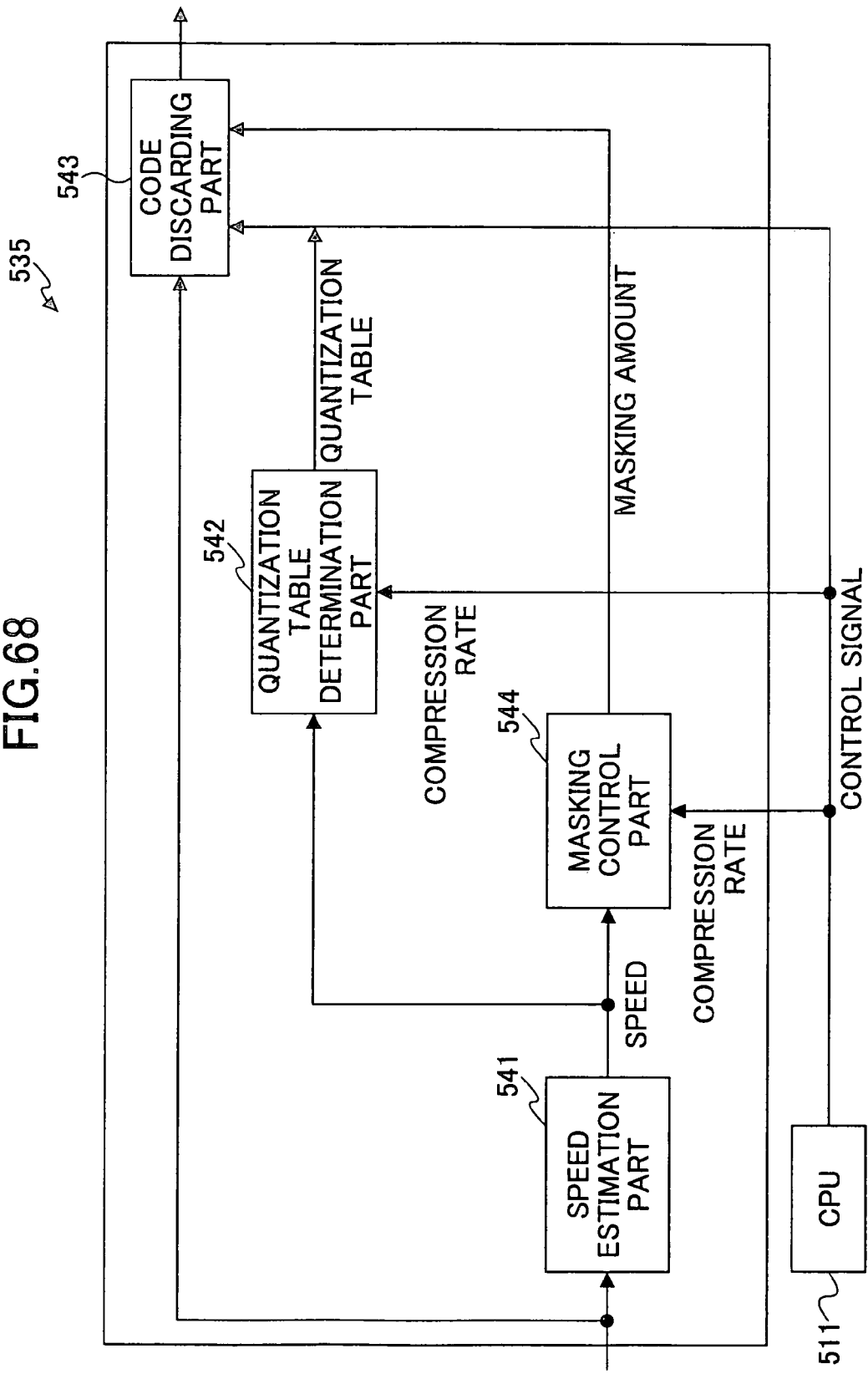
FIG. 68 is a block diagram showing a configuration of one embodiment of a post-quantization unit of the image compressor.

An expatiation is given of the post-quantization unit 535. FIG. 68 is a block diagram showing a configuration of the post-quantization unit 535. Referring to FIG. 68, the post-quantization unit 535 includes a speed estimation unit 541, a quantization table determination unit 542, a code discarding unit 543, and a masking control unit 544.

The speed estimation unit 541, which functions as a motion estimation apparatus, estimates the motion (speed) of an image from information included in the code blocks generated in the entropy coding unit 534, and transmits the estimated motion (speed) of the image to the masking control unit 544.

The masking control unit 544 controls a truncation (the number of bit planes to be deleted) for each code block in a quantization table.

The quantization table determination unit 542 determines the quantization table based on a compression rate supplied from the CPU 511 and the estimated image motion (speed) supplied from the speed estimation unit 541, and supplies the determined quantization table to the code discarding unit 543.

The code discarding unit 543, using the quantization table determined by the quantization table determination unit 542 and the truncation for each code block controlled by the masking control unit 544, discards code data from the codes from which no bit plane (or sub bit plane) has been deleted until a predetermined compression rate is reached.

A description is given of a method of estimating an image motion (speed) by the speed estimation unit 541. FIG. 69 is a diagram for illustrating the basic idea of the method of estimating an image motion (speed) by the speed estimation unit 541. Generally, when a motion Occurs in an interlaced image, the edge of an object that has moved takes the form of comb teeth based on the unit of a line in the corresponding frame data. Hereinafter, this edge is referred to as a comb shape of interlacing. Referring to FIG. 69, an object that is moving at high speed in an interlaced image has a comb shape of interlacing that has a large length horizontally. Meanwhile, an object that is moving at low speed in an interlaced image has a comb shape of interlacing that has a small length horizontally. Further, it is well know that the horizontal edge of an image is reflected strongly in the 1LH component of the wavelet transform coefficients. That is, an image moving at higher speed has a longer horizontal edge of a high frequency. Accordingly, a code block of higher speed has a greater sum of the absolute values of the 1LH coefficients and a greater amount of the 1LH lossless codes. The speed estimation unit 541 estimates an image motion (speed) independently in each frame using this characteristic.

Figures 70, 71:
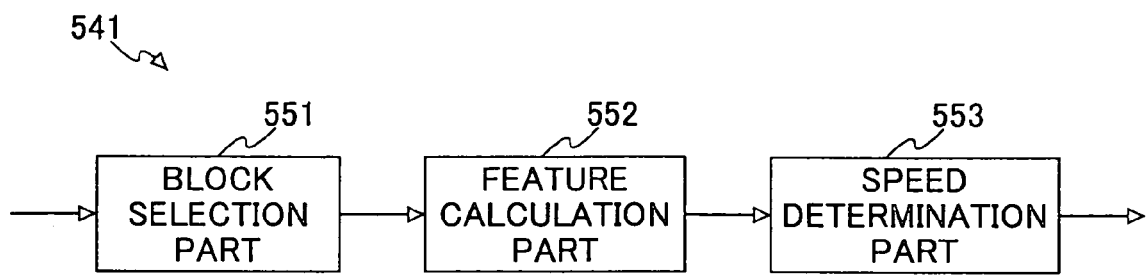
FIG. 70 is a block diagram showing a configuration of one embodiment of the speed estimation unit.
FIG. 71 is a diagram showing sub-bands of one hierarchy (Decomposition level 1) each having four code blocks.

FIG. 70 is a block diagram showing a configuration of the speed estimation unit 541. Referring to FIG. 70, the speed estimation unit 541 includes a block selection unit 551, a feature calculation unit 552, and a speed determination unit 553. The block selection unit 551 selects a code block whose coefficients or amount of codes is to be calculated. For instance, the block selection unit 551 selects the code blocks of the 1LH sub-band in raster scan order. Alternatively, the block selection unit 551 may select all the code blocks of the 1LH sub-band. The feature calculation unit 552 performs the operation of the coefficients or the amount of codes of each code block selected by the block selection unit 551 in order to calculate a feature. The speed determination unit 553 estimates the image motion (speed) in each code block using the feature obtained by the feature calculation unit 552.

A description is given below of the estimation of the image motion (speed) in each code block. As previously described, a sub-band is divided into smaller blocks called code blocks. That is, the code blocks are sub-blocks. In this embodiment, the motion (speed) of an interlaced image is estimated by comparing the 1LH component of the wavelet coefficients in which the horizontal edge of the image is strongly reflected and the 1HL component of the wavelet coefficients in which the vertical edge of the image is strongly reflected. Further, the motion (speed) of the interlaced image is estimated code block by code block by comparing the code blocks that are decoded into the same position. FIG. 71 is a diagram showing the sub-bands of one hierarchy (Decomposition level 1) each having four code blocks. That is, referring to FIG. 71, a code block 1HL_1 and a code block 1LH_1 that are decoded into the same position are compared. Likewise, a code block 1HL_2 and a code block 1LH_2, a code block 1HL_3 and a code block 1LH_3, and a code block 1HL_4 and a code block 1LH_4 are compared respectively. If a code block is a sub-band, this comparison is performed between the sub-bands instead of the code blocks. The image motion (speed) is estimated based on the unit of a code block in accordance with the comparison results.

Figure 72:
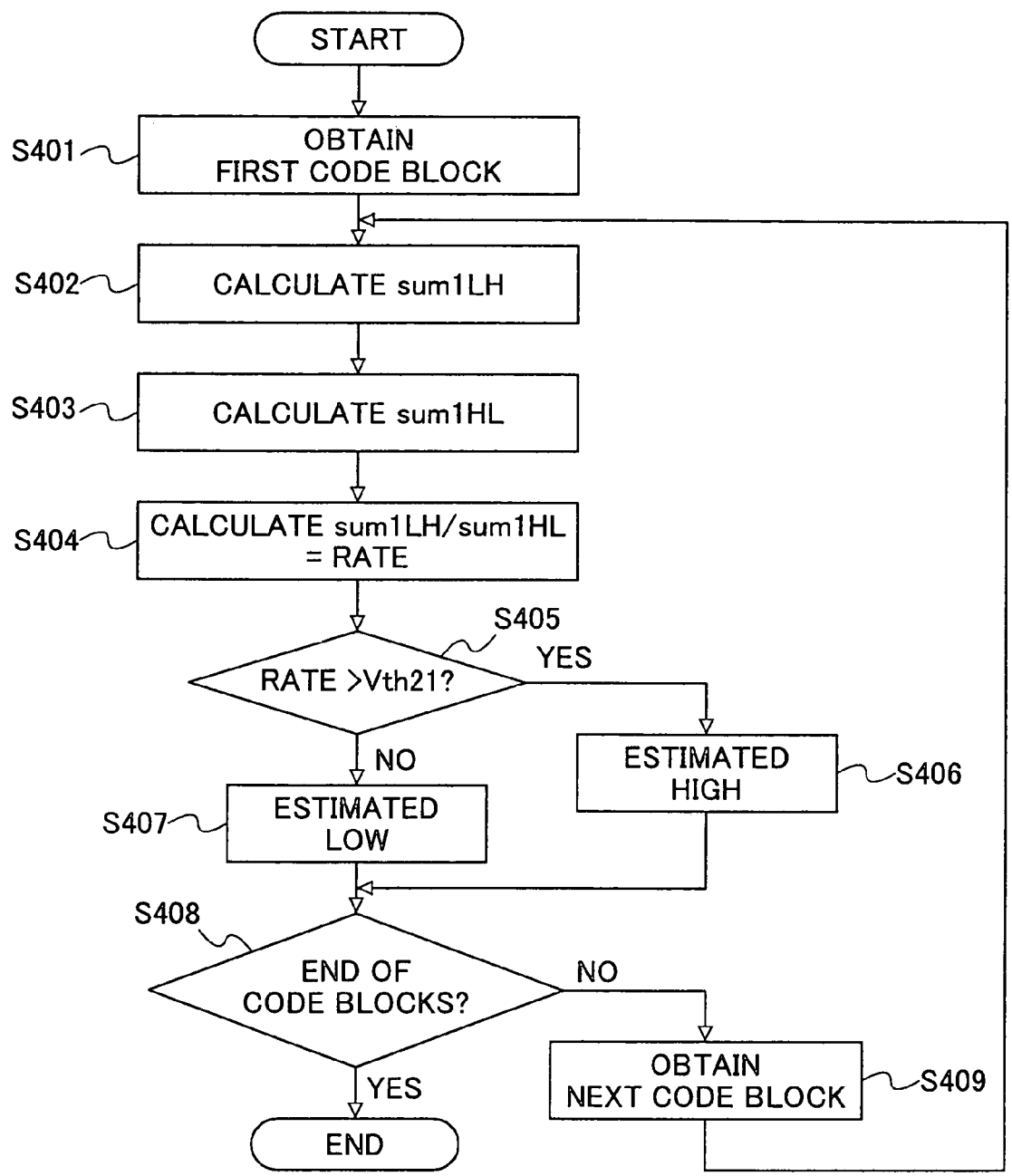
FIG. 72 is a flowchart of one embodiment of an operation of estimating an image motion (speed) in each code block.

A description is given, with reference to the flowchart of FIG. 72, of the above-described estimation of the image motion (speed) in each code block. Referring to FIG. 72, in step S401, a first one of the code blocks selected by the block selection unit 551 is acquired. This step corresponds to a sub-block acquisition unit according to this embodiment. Next, in step S402, the amount of codes of the code block in the 1LH sub-band before deleting bit planes is calculated. This amount is referred to as sum1LR. Next, in step S403, the amount of codes of the corresponding code block in the 1HL sub-band before deleting bit planes is, calculated. This amount is referred to as sum1HL. These steps correspond to a code amount calculation unit according to this embodiment. Then, in step S404, sum1LH/sum1HL is calculated, and the calculated rate is employed as a feature (RATE) for motion estimation. The operations of steps S401 through S404 are performed by the feature calculation unit 552.

In step S405, the result (RATE) of the division (sum1LH/sum1HL) is compared with a threshold value (Vth21). If RATE>Vth21 (that is, "YES" in step S405), the horizontal edge of the image is determined to appear strongly, and in step S406, it is estimated that the image motion (speed) in the code block is HIGH (that is, the image is moving at high speed). On the other hand, if RATE≦Vth21 (that is, "NO" in step S405), the vertical edge of the image is determined to appear strongly, and in step S407, it is estimated that the image motion (speed) in the code block is LOW (that is, the image is moving at low speed). The operations of steps S405 through S407 are performed by the speed determination unit 553. Thus, the function of a sub-block motion estimation unit according to this embodiment is performed.

The operations of steps S402 through S407 are repeated until all of the code blocks selected by the block selection unit 551 are processed. That is, in step S408, a determination is made as to whether the code block currently processed is the last one of the selected code blocks. If "NO" in step S408, in step S409, the next code block is obtained. If "YES" in step S408, the operation ends.

That is, in the case where each sub-band of one hierarchy has four code blocks as shown in FIG. 71, the above-described operations is repeated as many times as the number of code blocks of each sub-band of one hierarchy. Therefore, the speed estimation is performed with respect to the four code blocks. If each code block has a size of 32×32 and the size of the 1LH coefficients is 256×128, the number of code blocks of One hierarchy is (256/32)×(128/32)=8×4=32.

Thus, the amount of codes of the sub-blocks included in the high-frequency sub-bands is calculated block by block, and the image motion (speed) is estimated code block by code block based on the amount of sub-blocks. As a result, there is no need to calculate the difference between frames so that memory consumption can be controlled and processing time can be reduced. Accordingly, the image motion (speed) in each code block can be estimated at high speed with high accuracy. Further, this estimation is based on the losslessly compressed codes before bit truncation. Accordingly, the accuracy of estimation can be improved.

The estimated image motion (speed) in each code block is transmitted from the speed estimation unit 541 to the masking control unit 544. As a result, processing such as masking can be optimally performed on each of an object moving at high speed and an object moving at a low speed in the same image.

SIXTH EMBODIMENT

Figures 73, 74:
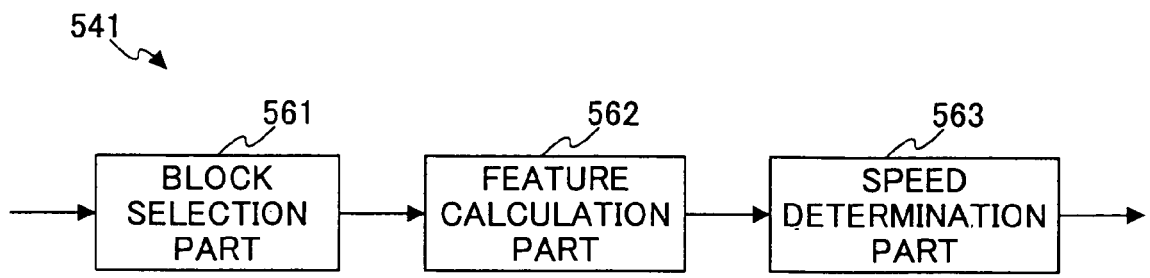
FIG. 73 is a block diagram showing a configuration of one embodiment of the speed estimation unit.
FIG. 74 is a diagram showing a result of estimation of an image motion (speed) in each code block.
Figure 75:
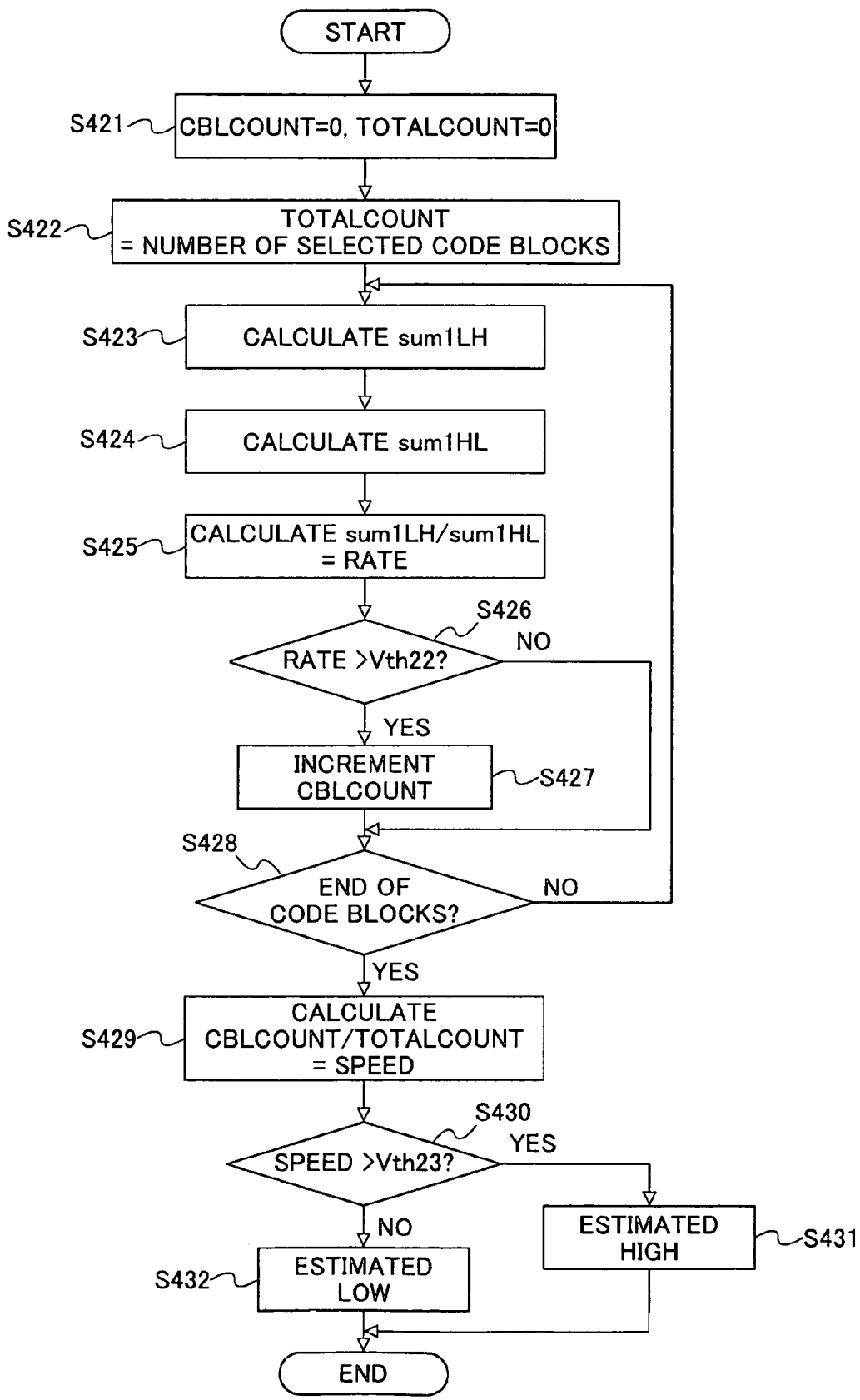
FIG. 75 is a flowchart of one embodiment of an operation of estimating the image motion (speed) in each code block and an image motion (speed) of the entire frame image.

A description is given, with reference to FIGS. 73 through 75, of a sixth embodiment of the present invention. The same elements as those of the fifth embodiment are referred to by the same numerals, and a description thereof is omitted. In the fifth embodiment, the image motion (speed) is estimated code block by code block, while in the sixth embodiment, the image motion (speed) in each code block and the image motion (speed) of the entire frame image are estimated.

FIG. 73 is a block diagram showing a configuration of the speed estimation unit 541 according to the sixth embodiment. Referring to FIG. 73, the speed estimation unit 541 includes a block selection unit 561, a feature calculation unit 562, and a speed determination unit 563. The block selection unit 561 selects a code block whose coefficients or amount of codes is to be calculated. For instance, the block selection unit 561 selects the code blocks of the 1LH sub-band in raster scan order. Alternatively, the block selection unit 561 may select all the code blocks of the 1LH sub-band. The feature calculation unit 562 performs the operation of the coefficients or the amount of codes of each code block selected by the block selection unit 551 in order to calculate a feature. The speed determination unit 563 estimates the image motion (speed) in each code block and the image motion (speed) of the entire frame image using the feature obtained by the feature calculation unit 562.

The estimation of the image motion (speed) in each code block is described in the fifth embodiment, and a description thereof is omitted.

Next, a description is given of the estimation of the entire frame image using the result of the estimation of the image motion (speed) in each code block. As in the fifth embodiment, the image motion (speed) is estimated code block by code block with respect to the four code blocks in the sixth embodiment.

In this embodiment, the image motion (speed) of the entire frame image is estimated based on the ratio of code blocks whose image motion (speed) is estimated to be HIGH (high speed) to code blocks whose image motion (speed) is estimated to be LOW (low speed). More specifically, as shown in FIG. 74, if the above-described ratio of high-speed code blocks to low-speed code blocks is 3:1 with respect to the four code blocks, the ratio of high-speed code blocks is high. Accordingly, the image motion (speed) of the entire frame image is estimated to be HIGH (high speed).

The above-described estimation criterion is a mere example. It may be freely set whether the image motion (speed) of the entire frame image is more likely to be estimated to be HIGH or LOW (low speed) using the result of the estimation of the image motion (speed) in each code block. By employing such a ratio, the image motion (speed) of the entire frame image can be estimated simply.

A description is given, with reference to the flowchart of FIG. 75, of the estimation of the image motion (speed) in each code block and the image motion (speed) of the entire frame image. Referring to FIG. 75, in step S421, a counter CBLCOUNT for counting the number of code blocks whose image motion (speed) is estimated to be HIGH and a counter TOTALCOUNT for counting the number of code blocks selected by the block selection unit 551 are initialized to zero. Next, in step S422, the number of code blocks selected by the block selection unit 561 is set. Then, in step S423, the amount of codes of the code block in the 1LH sub-band before deleting bit planes is calculated. This amount is referred to as sum1LH. Next, in step S424, the amount of codes of the corresponding code block in the 1HL sub-band before deleting bit planes is calculated. This amount is referred to as sum1HL. Then, in step S425, sum1LH/sum1HL is calculated, and the calculated rate is employed as a feature (RATE) for motion estimation In step S426, the result (RATE) of the division (sum1LH/sum1HL) is compared with a threshold value (Vth22). If RATE>Vth22 (that is, "YES" in step S426), in step S427, the code block, whose RATE is greater than Vth22, is counted (CBLCOUNT is incremented). The operations of steps S423 through S427 are repeated with respect to all the code blocks selected by the block selection unit 561.

In step S428, a determination is made as to whether the operations of steps S423 through 5427 are repeated with respect to all the code blocks selected by the block selection unit 561, that is, the currently processed code block is the last one of the selected code blocks. If the operations of steps S423 through S427 are determined to have been repeated with respect to all the code blocks selected by the block selection unit 561 (that is, "YES" in step S428), in step S429, the number of code blocks whose RATE is greater than Vth22 is divided by the number of selected code blocks (CBLCOUNT/ TOTALCOUNT), and the calculated ratio is employed as a feature (SPEED) for motion estimation. The operations of steps S421 through S429 are performed by the feature calculation unit 562.

Then, in step S430, the feature (SPEED) obtained by the feature calculation unit 562 is compared with a threshold value (Vth23), and a determination is made as to whether the image motion (speed) of the entire frame image is HIGH or LOW based on the obtained result of the comparison. That is, if SPEED>Vth20 (that is, "YES" in step S430), the ratio of high-speed code blocks is determined to be high, and in step S431, it is estimated that the image motion (speed) of the entire frame image is HIGH. On the other hand, if SPEED≦Vth22 (that is, "NO" in step S430), the ratio of low-speed code blocks is determined to be high, and in step S431, it is estimated that the image motion (speed) of the entire frame image is LOW. The operations of steps S430 through S432 are performed by the speed determination unit 563. Thus, the function of a frame motion estimation unit according to this embodiment is performed.

Thus, the amount of codes of the sub-blocks included in high-frequency sub-bands is calculated block by block so that the image motion (speed) in each code block is estimated based on the amount of codes of the sub-blocks. Further, the image motion (speed) of the entire frame is estimated based on the estimated image motion (speed) of each sub-block. The image motion (speed) of the entire frame is transmitted from the speed estimation unit 541 to the quantization table determination unit 542 so that the quantization table determination unit 542 can select a quantization table suitable for the image motion (speed). That is, it is possible to adjust image quality coarsely based on the image motion (speed) of the entire frame and then finely based on the image motion (speed) in each code block. Accordingly, it is possible to control image quality with efficiency.

In the above-described fifth and sixth embodiments, the image recorder 501a is applied to a movie camera. Alternatively, the image recorder 501a is also applicable to information terminal apparatuses such as a personal digital assistant (PDA) and a cellular phone.

The present invention is not limited to the specifically disclosed embodiments, and variations and modifications may be made without departing from the scope of the present invention.

The present application is based on Japanese priority applications No. 2002-289867, filed on Oct. 2, 2002, No. 2002-300468, filed on Oct. 15, 2002, No. 2002-300476, filed on Oct. 15, 2002, No. 2002-329553, filed on Nov. 13, 2002, and No. 2002-360809, filed on Dec. 12, 2002, the entire contents of which are hereby incorporated by reference.

What is claimed is:

1. A motion estimation apparatus, comprising:
a first unit configured to select one of a plurality of sub-blocks in high-frequency sub-bands of each of one or more blocks into which each of frames of interlaced images forming a moving image is divided, the frames being hierarchically compressed and encoded into code stream data by performing discrete wavelet transform on pixel values of each of the blocks;
a second unit configured to calculate an amount of codes of each of 1LH and 1HL components of the selected one of the sub-blocks and to calculate the ratio of the amount of codes of the 1LH component to the amount of codes of the 1HL component;
a third unit configured to compare the calculated ratio with a threshold and to estimate that motion in the selected one of the sub-blocks is high-speed if the calculated ratio is greater than the threshold and that the motion in the selected one of the sub-blocks is low-speed if the calculated ratio is less than or equal to the threshold;
a fourth unit configured to calculate a number of the sub-blocks in which the motion is estimated to be high-speed and a total number of the sub-blocks in each of the frames, and to calculate a ratio of the number of the sub-blocks of the high-speed motion to the total number of the sub-blocks with respect to each of the frames; and
a fifth unit configured to compare the calculated ratio with a threshold and to estimate that motion in the corresponding frame is high-speed if the calculated ratio is greater than the threshold and that the motion in the corresponding frame is low-speed if the calculated ratio is less than or equal to the threshold.

2. The motion estimation apparatus as claimed in claim 1, wherein the amounts of codes of the selected one of the sub-blocks are amounts of losslessly compressed codes.

3. The motion estimation apparatus as claimed in claim 1, wherein the amounts of codes of the selected one of the sub-blocks are amounts of codes before bit truncation.

4. A motion estimation method, comprising:
selecting one of a plurality of sub-blocks in high-frequency sub-bands of each of one or more blocks into which each of frames of interlaced images forming a moving image is divided, the frames being hierarchically compressed and encoded into code stream data by performing discrete wavelet transform on pixel values of each of the blocks;
calculating an amount of codes of each of 1 LH and 1 HL components of the selected on of the sub-blocks;
calculating the ratio of the amount of codes of the 1LH component to the amount of codes of the 1HL component;
comparing the calculated ratio with a threshold and estimating that motion in the selected one of the sub-blocks is high-speed if the calculated ratio is greater than the threshold and that the motion in the selected one of the sub-blocks is low-speed if the calculated ratio is less than or equal to the threshold;
calculating a number of the sub-blocks in which the motion is estimated to be high-speed and a total number of the sub-blocks in each of the frames;
calculating a ratio of the number of the sub-blocks of the high-speed motion to the total number of the sub-blocks with respect to each of the frames; comparing the calculated ratio with a threshold;
estimating that motion in the corresponding frame is high-speed if the calculated ratio is greater than the threshold; and
estimating that the motion in the corresponding frame is low-speed if the calculated ratio is less than or equal to the threshold.

5. The method of claim 4, wherein the amounts of codes of the selected one of the sub-blocks are amounts of losslessly compressed codes.

6. The method of claim 4, wherein the amounts of codes of the selected one of the sub-blocks are amounts of codes before bit truncation.

7. A computer-readable recording medium storing a program for causing a computer to execute a motion estimation method, comprising:

selecting one of a plurality of sub-blocks in high-frequency sub-bands of each of one or more blocks into which each of frames of interlaced images forming a moving image is divided, the frames being hierarchically compressed and encoded into code stream data by performing discrete wavelet transform on pixel values of each of the blocks; calculating an amount of codes of each of 1LH and 1HL components of the selected on of the sub-blocks;

calculating the ratio of the amount of codes of the 1LH component to the amount of codes of the 1HL component;

comparing the calculated ratio with a threshold and estimating that motion in the selected one of the sub-blocks is high-speed if the calculated ratio is greater than the threshold and that the motion in the selected one of the sub-blocks is low-speed if the calculated ratio is less than or equal to the threshold;

calculating a number of the sub-blocks in which the motion is estimated to be high-speed and a total number of the sub-blocks in each of the frames;

calculating a ratio of the number of the sub-blocks of the high-speed motion to the total number of the sub-blocks with respect to each of the frames; comparing the calculated ratio with a threshold;

estimating that motion in the corresponding frame is high-speed if the calculated ratio is greater than the threshold; and estimating that the motion in the corresponding frame is low-speed if the calculated ratio is less than or equal to the threshold.

8. The computer-readable recording medium as claimed in claim 7, wherein the amounts of codes of the selected one of the sub-blocks are amounts of losslessly compressed codes.

9. The computer-readable recording medium as claimed in claim 7, wherein the amounts of codes of the selected one of the sub-blocks of codes before bit truncation.

* * * * *

UNITED STATES PATENT AND TRADEMARK OFFICE
CERTIFICATE OF CORRECTION

PATENT NO.        : 7,450,768 B2
APPLICATION NO.  : 10/678696
DATED            : November 11, 2008
INVENTOR(S)      : Tooru Suino Page 1 of 1

It is certified that error appears in the above-identified patent and that said Letters Patent is hereby corrected as shown below:

Title page, item (75) delete inventor: "Hiroyuki Sakuyama".

Signed and Sealed this

Eleventh Day of August, 2009

David J. Kappos
*Director of the United States Patent and Trademark Office*